(12) United States Patent
Drame

(10) Patent No.: US 10,860,946 B2
(45) Date of Patent: *Dec. 8, 2020

(54) DYNAMIC DATA STRUCTURES FOR DATA-DRIVEN MODELING

(71) Applicant: Konlanbi, Paris (FR)

(72) Inventor: Cyril Drame, Richmond, CA (US)

(73) Assignee: Konlanbi, Paris (FR)

( * ) Notice: Subject to any disclaimer, the term of this patent is extended or adjusted under 35 U.S.C. 154(b) by 1044 days.

This patent is subject to a terminal disclaimer.

(21) Appl. No.: 14/868,175

(22) Filed: Sep. 28, 2015

(65) Prior Publication Data

US 2016/0155066 A1      Jun. 2, 2016

Related U.S. Application Data

(63) Continuation-in-part of application No. 13/572,352, filed on Aug. 10, 2012, now Pat. No. 9,147,166.

(60) Provisional application No. 61/522,067, filed on Aug. 10, 2011.

(51) Int. Cl.
*G06N 20/00* (2019.01)

(52) U.S. Cl.
CPC .................................. *G06N 20/00* (2019.01)

(58) Field of Classification Search
CPC ........ G06F 19/24; G06F 17/27; G06N 99/005
See application file for complete search history.

(56) References Cited

U.S. PATENT DOCUMENTS

| | | | |
|---|---|---|---|
| 5,029,509 A | 7/1991 | Serra | |
| 5,536,902 A | 7/1996 | Serra et al. | |
| 5,880,392 A | 3/1999 | Wessel et al. | |
| 5,886,276 A | 3/1999 | Levine et al. | |
| 6,316,710 B1 | 11/2001 | Lindemann | |
| 6,463,438 B1 * | 10/2002 | Veltri | G06K 9/0014 706/15 |
| 7,379,873 B2 | 5/2008 | Kemmochi | |

(Continued)

FOREIGN PATENT DOCUMENTS

WO    2017058145    4/2017

OTHER PUBLICATIONS

Srinivas Desai, Alan W. Black, B. Yegnanarayana, and Kishore Prahallad, "Spectral Mapping Using Artificial Neural Networks for Voice Conversion", Jul. 2010, IEEE Transactions on Audio, Speech, and Language Processing, vol. 18, No. 5, pp. 954-964. (Year: 2010).*

(Continued)

*Primary Examiner* — Kamran Afshar
*Assistant Examiner* — Ying Yu Chen
(74) *Attorney, Agent, or Firm* — Schwegman Lundberg & Woessner, P.A.

(57) ABSTRACT

A method of producing dynamic controllable data composites from two or more data segments includes: building or training one or more function mappers to map between one or more extracted feature envelopes sets from the original data and one or more general parametric representations of the data; combining the extracted feature envelopes or the function mappers using two or more audio segments; and feeding the extracted feature envelopes or combined feature envelopes to the function mappers to obtain synthesis parameters to drive a synthesis process.

19 Claims, 40 Drawing Sheets

(56) References Cited

U.S. PATENT DOCUMENTS

| | | | | |
|---|---|---|---|---|
| 8,126,717 | B1* | 2/2012 | Strom | G10L 13/10 |
| | | | | 704/260 |
| 8,706,496 | B2 | 4/2014 | Sanjaume | |
| 9,147,166 | B1 | 9/2015 | Drame | |
| 2005/0182629 | A1* | 8/2005 | Coorman | G10L 13/06 |
| | | | | 704/266 |
| 2007/0036467 | A1* | 2/2007 | Coleman | G06T 3/4061 |
| | | | | 382/294 |
| 2009/0258333 | A1* | 10/2009 | Yu | G09B 5/04 |
| | | | | 434/157 |
| 2009/0299747 | A1* | 12/2009 | Raitio | G10L 13/04 |
| | | | | 704/264 |
| 2010/0164862 | A1* | 7/2010 | Sullivan | G06K 9/3216 |
| | | | | 345/156 |
| 2016/0155065 | A1 | 6/2016 | Drame | |

OTHER PUBLICATIONS

"International Application Serial No. PCT US2015 052705, International Preliminary Report on Patentability dated Apr. 12, 2018", 13 pgs.

Amatriain, X., et al., "Content-based Transformations", Journal of New Music Research, 32(1), (2003), 95-114.

Bonada, J., et al., "Synthesis of the singing voice by performance sampling and spectral models", IEEE Signal Processing Magazine, 24(2), (2007), 67-79.

Caetano, M., et al., "Sound Morphing by Feature Interpolation", 2011 IEEE International Conference on Acoustics, Speech and Signal Processing (ICASSP), May 22-27, 2011, Piscataway, NJ, USA, (2011), 161-164.

Haken, L., et al., "3. Beyond Traditional Sampling Synthesis: Real-Time Timbre Morphing Using Additive Synthesis", In: Analysis, Synthesis, and Perception of Musical Sounds, (2007), 122-144.

Hoffman, M., et al., "Real-Time Feature-Based Synthesis for Live Musical Performance", Proceedings of the 7th International Conference on New Interfaces for Musical Expression (NIME97), New York, NY, (2007), 309-312.

Klingbeil, Michael Kateley, "Spectral Analysis, Editing, and Resynthesis: Methods and Applications", Graduate School of Arts and Sciences, (2009), 1-157.

Kreutzer, Cornelia, et al., "Time Domain Attack and Release Modeling—Applied to Spectral Domain Sound Synthesis", Proceedings of International Conference on Signal Processing and Multimedia Applications, (2008), 119-124.

Le Groux, S., "Perceptsynth: mapping perceptual musical features to sound synthesis parameters", Acoustics, Speech and Signal Processing, (2008), 125-128.

Le Groux, S., "Perceptsynth: Mapping Perceptual Musical Features to Sound Synthesis Parameters", IEEE International Conference on Acoustics, Speech and Signal Processing, ICASSP 2008, (2008), 4 pgs.

Masri, Paul, "Computer Modelling of Sound for Transformation and Synthesis of Musical Signals", Department of Electrical and Electronic Engineering, (1996), 1-229.

Serra, X., "Sound Transformations Based on the SMS High Level Attributes", Proceedings of the Digital Audio Effects Workshop, (1998), 5 pgs.

Slaney, M., et al., "Automatic Audio Monitoring", 1996 IEEE International Conference on Acoustics, Speech, and Signal Processing Conference Proceedings, May 7-10, 1996, New York, NY, USA, (1996), 1001-1004.

Verfaille, V., et al., "Adaptive Digital Audio Effects (A-DAFx): A New Class of Sound Transformations", IEEE Transactions on Audio, Speech, and Language Processing, 14(5), (2006), 1817-1831.

Verfaille, V., et al., "Mapping strategies for gestural and adaptive control of digital audio effects", Journal of New Music Research, 35(1), 71-93, (2006), 24 pgs.

Wessel, D., et al., "Removing the Time Axis from Spectral Model Analysis-Based Additive Synthesis: Neural Networks versus Memory-Based Machine Learning", International Computer Music Conference, ICMC '98, Ann Arbor, Michigan, (1998), 4 pgs.

"International Application Serial No. PCT/US2015/052705, Invitation to Pay Additional Fees and Partial Search Report dated Feb. 24, 2016", 8 pgs.

"Complex Cepstrum Based Voice Conversion Using Radial Basis Function", 14 pgs.

"International Application Serial No. PCT/US2015/052705, International Search Report dated May 3, 2016", 7 pgs.

"International Application Serial No. PCT/US2015/052705, Written Opinion dated May 3, 2016", 11 pgs.

"U.S. Appl. No. 14/868,149, Preliminary Amendment filed Feb. 12, 2016", 9 pgs.

"U.S. Appl. No. 14/868,149, Non Final Office Action dated Oct. 18, 2018", 15 pgs.

"U.S. Appl. No. 14/868,149, Final Office Action dated Mar. 11, 2019", 6 pgs.

"U.S. Appl. No. 14/868,149, Notice of Allowance dated Jun. 12, 2019", 5 pgs.

"U.S. Appl. No. 14/868,149, Response filed Jan. 18, 2019 to Non Final Office Action dated Oct. 18, 2018", 12 pgs.

"U.S. Appl. No. 14/868,149, Response filed May 31, 2019 to Final Office Action dated Mar. 11, 2019", 10 pgs.

U.S. Appl. No. 13/572,352, filed Aug. 10, 2012, Generating Dynamically Controllable Composite Data Structures From a Plurality of Data Segments, U.S. Pat. No. 9,147,166.

U.S. Appl. No. 14/868,149, filed Sep. 28, 2015, Generating Dynamically Controllable Composite Data Structures From a Plurality of Data Segments.

* cited by examiner

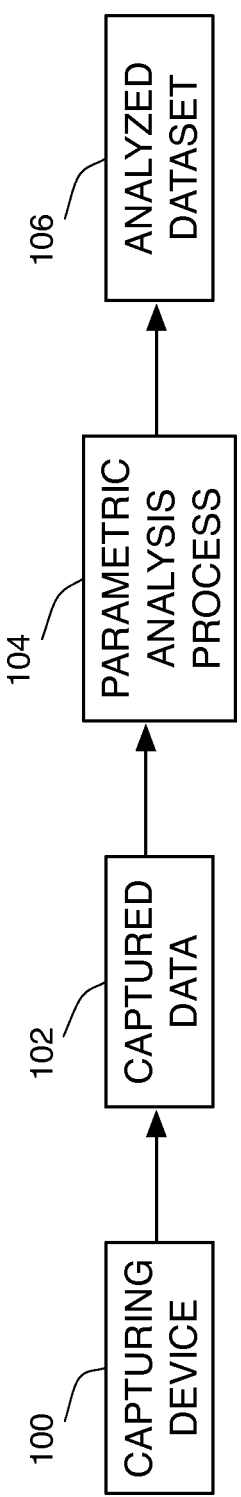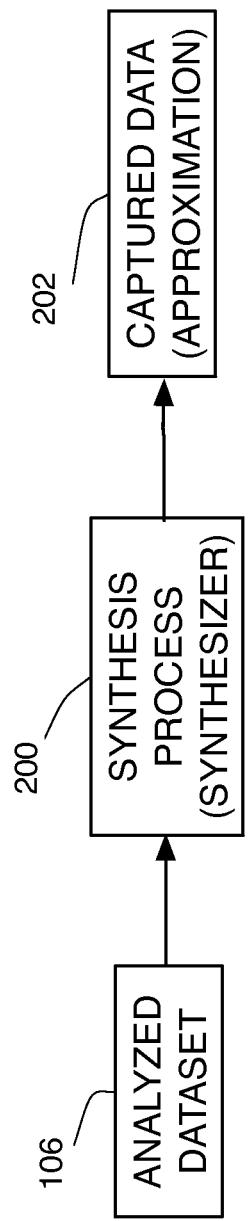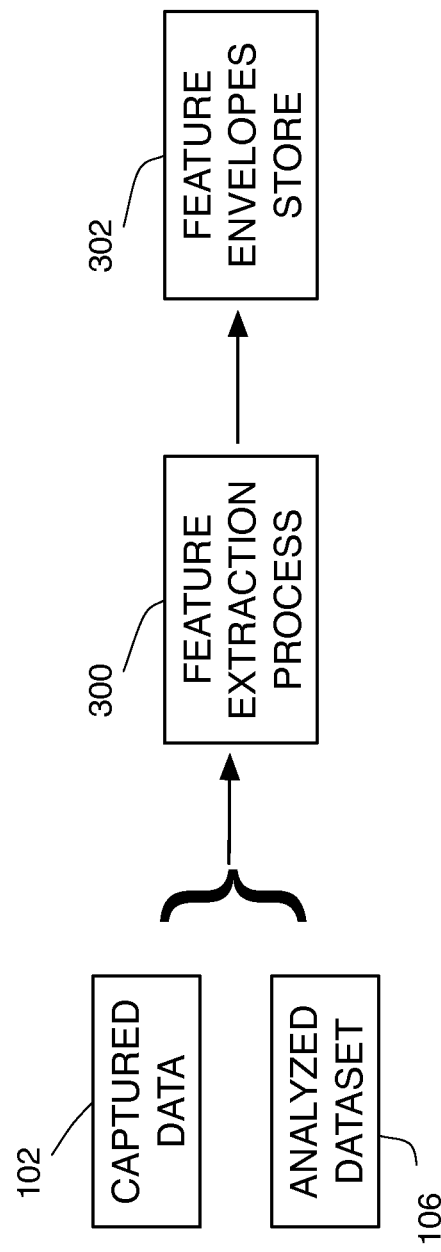
FIG. 1
FIG. 2
FIG. 3

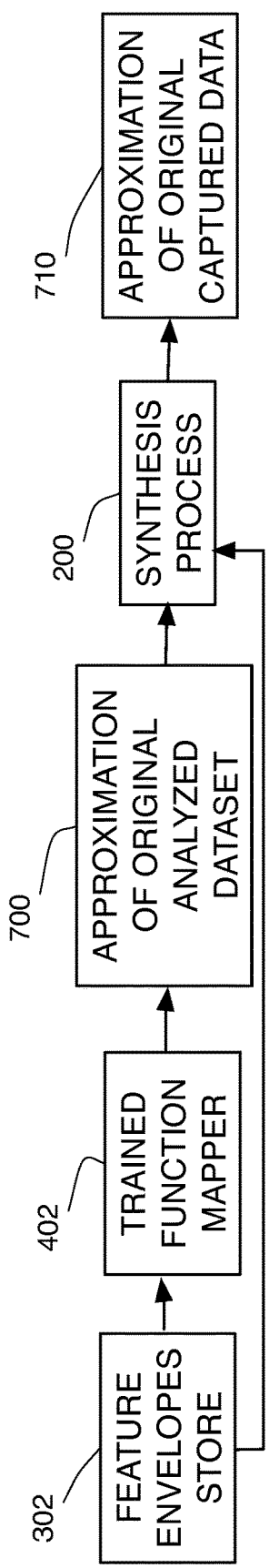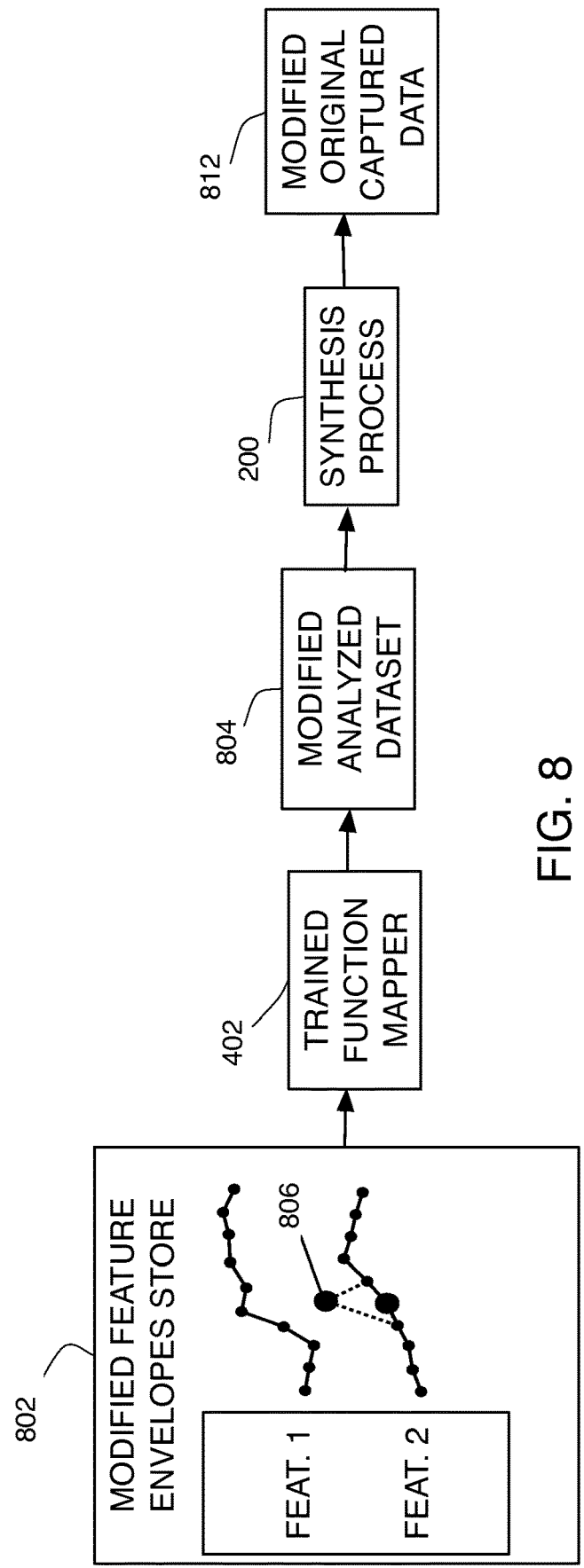

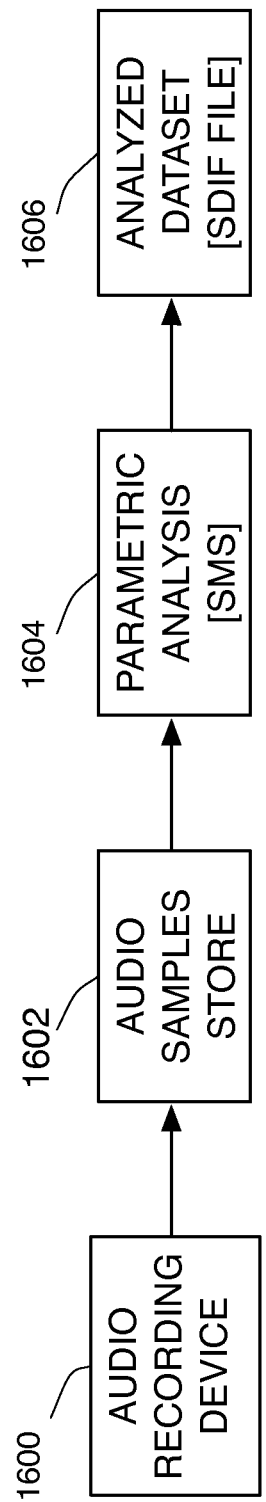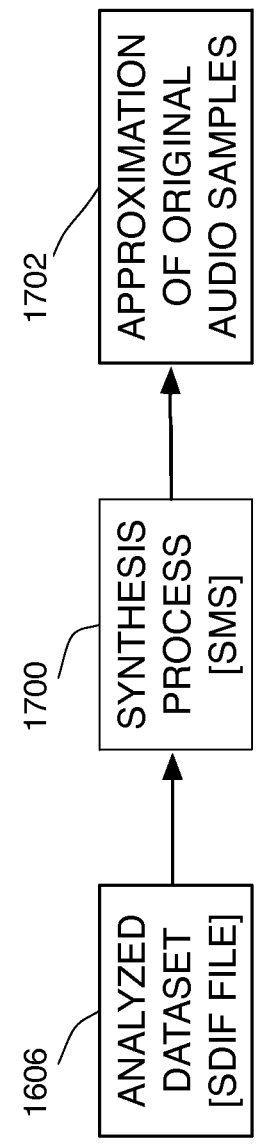

DYNAMIC DATA STRUCTURES FOR DATA-DRIVEN MODELING

RELATED APPLICATION

This application is a continuation-in-part of U.S. patent Ser. No. 13/572,352 filed Aug. 10, 2012, which claims priority to U.S. Provisional Ser. No. 61/522,067, filed Aug. 10, 2011, and which are incorporated herein by reference in their entirety.

BACKGROUND

Technical Field

The present disclosure relates generally to computing and more particularly to combining related data segments in a computer modeling environment.

Description of Related Art

A variety of models relate to a full or partial representation of an object or of a process. Ideally such a representation would allow one to (1) perfectly reproduce the modeled object or process (or some of its attributes) and (2), to generate (synthesize) realistic variations of it in a controlled manner.

A plethora of objects and processes have been and are being modeled on computers every day. Some examples are real world objects (like humans, animals, smoke, wind, stones, clouds, etc.) specific properties (such as color textures, elasticity etc.), specific behavior (such as physical motion, body motions, deformations by collisions etc.), signals (such as audio, image, video signals etc.), actual sound producing objects (like trumpet, car engines etc.), processes (like highway traffic, crowd movements, weather, stock market, lightening and shadowing.) The list is almost endless.

One common issue relating to the use of most models is that of realism. Content generated by many models is often perceived as "unnatural", "unrealistic" or "produced by a computer" to various degrees. Thus, there is a need for improved modeling techniques especially when generating variations or modifications of the original data from which a model was derived.

BRIEF DESCRIPTION OF THE DRAWINGS

FIG. 1 is a block diagram illustrating a parametric analysis process to obtain an analyzed dataset from captured data.

FIG. 2 is a block diagram illustrating a re-synthesis process from the analyzed dataset.

FIG. 3 is a block diagram illustrating a feature envelopes extraction process.

FIG. 7 is a block diagram illustrating the process of feeding feature envelopes to a trained function mapper to obtain an approximation of the original data.

FIG. 8 is a block diagram illustrating the process of feeding modified feature envelopes, where exemplars are modified independently, to a trained function mapper to obtain modification of the original data.

FIG. 16 is a block diagram illustrating a parametric analysis process of recorded audio sample to obtain an analyzed dataset.

FIG. 17 is a block diagram illustrating a re-synthesis process from the analyzed dataset.

DETAILED DESCRIPTION OF EXAMPLE EMBODIMENTS

Overview

Figure 4:
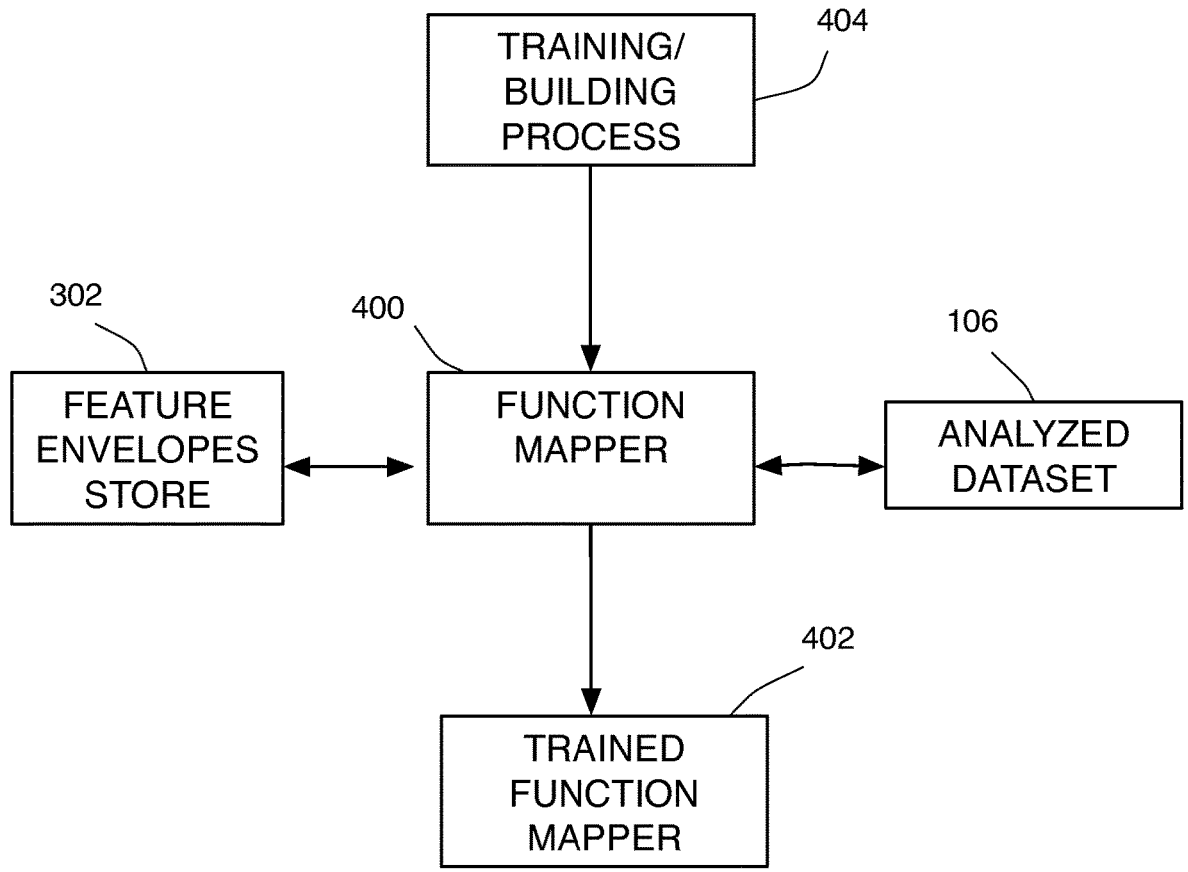
FIG. 4 is a block diagram illustrating a process of building a function mapper between extracted feature envelopes and analyzed dataset for an example embodiment.

Certain embodiments provide methods for generating dynamically controllable data composites from two or more data segments comprising the steps of: (1) building or training one or more function mappers to map between one or more extracted feature envelopes datasets from the original data and one or more analyzed dataset (e.g., also described as analysis-synthesis dataset) fitting one or more general parametric representation of the original data; (2) combining the extracted feature envelopes, and/or the function mappers using two or more data segments; and (3) feeding the feature envelopes or combining feature envelopes to function mapper or combination of function mappers.

Certain embodiments provide methods for combining extracted feature envelopes from one or more data segments (e.g., also described as regions) thus ensuring more realistic features parameters correlations across exemplars.

Certain embodiments include data segments (e.g., also described as regions) that are of dimension 2 or higher such as texture data segments.

Certain embodiments include feature envelope segments (e.g., also described as regions) that are of dimension 2 or higher such as texture segments.

Certain embodiments provide methods for training a single function mapper with a discriminant input on two or more data segments thus in effect combining the functionalities of two separate function mappers trained on two different data segments and thus obtaining a combined function mapper.

Certain embodiments provide methods for combining two or more function mappers in parallel where function mappers are fed with two or more matched feature envelopes segments, extracted from two or more data segments, and further combining the function mappers at their outputs levels.

Certain embodiments provide certain methods described above where the data to be modeled is captured audio data.

Certain embodiments provide certain methods described above where the general representation is a succession of Short Term Discreet Fourier Transforms such as described in SMS (Spectral Modeling Synthesis).

Certain embodiments provide certain methods described above where the function mapper is a multilayer perceptron neural network trained using a backpropagation algorithm and a magnitude-based perceptual weighting function.

Certain embodiments provide methods for combining new feature envelopes and/or function mappers outputs using information present in the original data.

Certain embodiments provide means to combine one segment or more segments with additional segments which are not extracted from the data but can be defined explicitly as mathematical functions such as a warping function.

Certain embodiments provide means to combine one or more segment with additional segments which are not extracted computationally from the data but which are extracted perceptually by a human assessing perceptual values or properties by way of a graphical editor for instance.

Certain embodiments provide means to modify label values inputs at synthesis time.

Certain embodiments provide methods to generate models that map extracted feature envelopes to analyzed datasets (e.g., also described as analysis-synthesis datasets) using a function mapper, and a magnitude based weighting function for training the function mapper.

Certain embodiments provide certain methods described herein where the data to be modeled is captured body motion data.

Certain embodiments provide certain methods described herein where the data to be modeled is captured image texture data.

Certain embodiments provide a client-server architecture where analysis-synthesis values are transmitted remotely from the server with the analysis-synthesis values including values for one or more of the feature envelopes, the control parameters, the parameters to generate new envelopes, or actual synthesis parameters.

Certain embodiments provide ways of applying a subset of this modeling technique to fields other than audio and texture (for instance to body motion synthesis).

Certain embodiments provide various improvements of a subset of this modeling technique as applied to audio synthesis.

Certain embodiments include spectral and temporal 3-dimensional audio manipulations.

Certain embodiments provide timbre-space control structure which includes not only the spectral but also temporal characteristics of timbre.

Certain embodiments provide methods for using yet other function mapper(s) to further reduce control parameter space dimensionality.

Certain embodiments apply to the field of computer graphics.

Certain embodiments apply to the field of statistical modeling.

Certain embodiments provide ways to apply certain methods described herein to shaders in the field of computer graphics.

Certain embodiments applied to the field of computer graphics may include control over pixel position, pixel saturation, pixel brightness and pixel contrast.

Certain embodiments relate to image textures or pixel shaders. In such embodiments the extracted features and the analyzed datasets may relate to spatial coordinates rather than time.

Certain embodiments relate to dynamic image textures or dynamic shaders that may be designed to change over time, in such embodiments the extracted features and the analyzed datasets may relate to both spatial and time coordinates.

Certain embodiments relate to a method of producing dynamically controllable texture or shaders composites, wherein the captured data is texture data and the one or more feature envelopes that are extracted from the captured data are derived from neighboring pixel intensity values.

Certain embodiments relate to a method of producing dynamically controllable image texture or computer graphics pixel shaders composites wherein the captured data is texture data and the one or more corresponding parametric representations of the captured data include pixel intensity values.

In accordance with certain embodiments, the parametric representation may model most of the characteristics of the captured data. In that case the synthesis process corresponding to the parametric representation may generate data perceptually similar to the original captured data. For example if the captured data is an audio signal then the parametric representation may be general enough to generate audio signal perceptually equivalent to the original captured audio.

In accordance with certain embodiments the parametric representation may model only a subset of the characteristics of the captured data. In that case the synthesis process corresponding to the parametric representation may synthesize only a subset of the characteristics of the original captured data. For example if the captured data is an audio signal, then the parametric representation may only include the stochastic aspect of audio or may only include pitch information.

Certain embodiments relate to a method of producing dynamically controllable body motion composites, the one or more feature envelopes sets that are extracted from the captured data being derived from at least one of position, rotation angle, or velocity for one or more of the body joints or for one or more end effectors.

Certain embodiments relate to a method of producing dynamically controllable body motion composites, the one or more corresponding parametric representation of the captured data including at least one of position, rotation angle, or velocity for one or more of the body joints or for one or more end effectors.

Certain embodiments preserve correlations to various degrees, thus providing better realism in synthesis processes.

Certain embodiments provide dynamically controllable structures, thus providing enhanced creative tools to users.

One embodiment relates to a method of producing dynamically controllable data composites from two or more data segments of captured data (e.g., captured by a data sensor or measurement device). A first operation includes training one or more function mappers to map between one or more feature envelopes sets that are extracted from the data segments of the captured data and one or more parametric representations of the captured data by using at least one training parameter to discriminate between the data segments in a training process for the one or more function mappers, the one or more feature envelope sets corresponding to one or more perceptual characteristics of the captured data, and the one or more parametric representations of the captured data corresponding to an analysis-synthesis process that fits the one or more parametric representations to the captured data. A second operation includes forming a composite data structure by using at least one control parameter to combine values for a plurality of the data segments, each of the plurality of data segments being associated with a corresponding feature envelope set and a corresponding function mapper. A third operation includes generating synthesis parameters for the composite data structure by feeding the feature envelopes sets corresponding to the composite data structure to the corresponding one or more function mappers and combining outputs of the one or more function mappers in accordance with the composite data structure, the synthesis parameters being used to drive a synthesis process.

According to one aspect of this embodiment, the captured data may correspond to perceptual data and the one or more parametric representations of the captured data may include spectral characteristics of the captured data. According to another aspect, training the one or more function mappers may include performing an analysis-synthesis process that fits the one or more parametric representations to the captured data.

According to another aspect, an output of the synthesis process may include output characteristics that are based on the one or more perceptual characteristics of the captured data. According to another aspect, the captured data may be received as an output of a measurement device.

According to another aspect, training the one or more function mappers may include combining two or more feature envelope sets at an input level of a first function mapper. According to another aspect, training the one or more function mappers may include combining two or more feature envelope sets at a body level of a first function mapper by training the first function mapper with a first training parameter that operates as a discriminant input on the two or more feature envelope sets. According to another aspect, generating the synthesis parameters may include combining values at output levels of a first function mapper and a second function mapper, each of the first and second function mappers being fed with two or more feature envelope sets.

According to another aspect, the captured data may include audio data and the one or more feature envelope sets that are extracted from the data segments of the captured data may include at least one of a pitch envelope, a loudness envelope, or a brightness envelope for the audio data. According to another aspect, the captured data may include audio data and the one or more parametric representations of the audio data may include values for spectral peaks in one or more of the data segments.

According to another aspect, the captured data may include body-motion data and the one or more feature envelope sets that are extracted from the data segments of the captured data are based on at least one of position, rotation angle, or velocity for a body joint or an end effector. According to another aspect, the captured data may include body-motion data and the one or more parametric representations of the captured data include values for at least one of position, rotation angle, or velocity for a body joint or an end effector.

According to another aspect, the captured data may include texture data, and the data segments include two-dimensional arrays corresponding to portions of the texture data. According to another aspect, the captured data may include texture data and the one or more feature envelope sets that are extracted from the data segments of the captured data are based on pixel intensities of neighboring pixels for a given location. According to another aspect, the captured data may include texture data and the one or more parametric representations of the captured data include values for pixel intensities of neighbouring pixels for a given location.

According to another aspect, generating the synthesis parameters may include: using a first control parameter to interpolate values between output levels of a first function mapper and a second function mapper, or using the first control parameter to extrapolate values from the output levels of the first function mapper and the second function mapper.

According to another aspect, generating the synthesis parameters may include using a first control parameter to compute a linear combination of values from the output levels of a first function mapper and a second function mapper. According to another aspect, the one or more function mappers may include at least one neural network that is trained adaptively in the training process for the one or more function mappers. According to another aspect, the at least one training parameter may include a discriminant input that is used to combine two or more of the data segments in a first function mapper.

According to another aspect, a fourth operation includes determining boundaries of the data segments in the captured data from changes in the one or more feature envelope sets that are extracted from the captured data; a fifth operation includes associating one or more categories with the data segments, each category corresponding to a perceptual descriptor for a corresponding data segment; and a sixth operation includes training the one or more function mappers by using the one or more categories in association with the at least one training parameter to discriminate between the data segments.

According to another aspect, a fourth operation includes providing values for a first segment of the captured data to a user interface; a fifth operation includes receiving from the user interface values for a first perceptual descriptor for the first segment; a sixth operation includes associating the first perceptual descriptor with the first data segment; and a seventh operation includes training a first function mapper by using the first perceptual descriptor in association with a first training parameter to discriminate between the first data segment and other data segments.

Another embodiment relates to a method for remotely generating synthesis parameters based on captured data. A first operation includes training one or more function mappers to map between one or more feature envelopes that are extracted from captured data and one or more corresponding parametric representations of the captured data, the one or more feature envelopes corresponding to one or more characteristics of the captured data, and the one or more parametric representations corresponding to an analysis-synthesis process that fits the one or more parametric representations to the captured data. A second operation includes generating synthesis parameters for a synthesizer corresponding to the one or more parametric representation, by remotely feeding the feature envelopes to the corresponding function mappers in a client-server architecture, the outputs of the function mapper being used as synthesis parameters to drive a synthesis process. Aspects of this embodiment include the above-described aspects of other described embodiments.

Another embodiment relates to a method for using a magnitude-based error function to train a function mapper to generate synthesis parameters based on captured data. A first operation includes performing an analysis-synthesis process in accordance with a parametric representation of captured data to obtain an analyzed dataset corresponding to the captured data. A second operation includes extracting one or more feature envelopes corresponding to one or more perceptual characteristics of the captured data. A third operation includes applying a weighting function to the analyzed dataset values based on their magnitudes with weighted analyzed dataset values being used in an error function used to train the function mapper. A fourth operation includes training the function mapper to map between the one or more feature envelopes and the one or more corresponding parametric representations of the captured data, the function mapper being used to generate synthesis parameters for a synthesizer corresponding to the one or more parametric representations. Aspects of this embodiment include the above-described aspects of other described embodiments.

Additional embodiments relate to computer-implemented apparatuses and computer programs that implement the above-described embodiments.

INTRODUCTION

Modeling techniques are numerous and the same technique can often be found to apply across different application fields. For instance one can find concatenative models in fields including audio modeling, texture modeling, or body-motion modeling. Concatenative modeling consists in storing a database of captured data and using a search algorithm to pick the appropriate pieces of data to concatenate at synthesis time. As another example, physical modeling which consists in using the underlying physical laws governing the object or process to be modeled, can be found in many application fields as well. In general modeling techniques exhibit the same advantages and disadvantages across all application fields. For instance with concatenative techniques, transitions at a junction of two pieces of data to concatenate are usually problematic and sources of artifacts.

Data driven parametric modeling is one common type of data modeling technique. It consists in estimating a set of parameters from some captured original data in accordance with a predetermined general representation. The estimated set of parameters obtained at this analysis stage, can be stored as a new dataset (analyzed dataset) on which modifications can then be performed.

In order to reproduce the original data, the analyzed dataset (or analysis-synthesis dataset) is fed back to a synthesizer that performs the inverse operation corresponding to the analysis. In order to produce variations or modifications of the original data, the analyzed dataset (or analysis-synthesis dataset) is first modified before being fed to the synthesizer.

Analyzed datasets obtained in traditional parametric techniques are usually of high dimensionality. This means that the number of parameters on which modifications have to be applied to obtain variations is usually high. This makes it difficult at modification time to preserve natural correlations between the numerous parameters and hence those modeling techniques often produce perceptually non-natural data at synthesis time especially for complex modifications. The high dimensionality of the analyzed dataset also means that traditional parametric techniques often need to store lots of data. This makes such techniques difficult to use in environments where low footprint is required or desired such as mobile phones or video games for instance. Efforts to both reduce dimensionality and preserve correlations in the modified analyzed dataset (or analysis-synthesis dataset), have occurred in the art especially in the audio field for instance or texture synthesis field.

These techniques reduce the dimensionality of the analyzed dataset by building or training a function mapper to map feature envelopes extracted from the original data to its corresponding analyzed dataset. They address the correlation issue exemplar by exemplar but the modification methods that they provide usually modify exemplars independently from each other and values that are part of an exemplar independently from each other as well. They usually do not provide methods to modify exemplars by using other exemplars. Thus the modification methods provided by these techniques usually only allow simple perceptually natural modifications (such as loudness, brightness control or pitch/time extrapolations in audio applications for instance). However, the problem of preserving natural correlations between different exemplars and across feature envelopes remains unaddressed and hence these techniques do not provide mechanisms to generate complex modifications such as generating perceptually natural new data based on two or more data segments (or regions).

Another effort to address the correlation issue in data-driven parametric modeling includes blending or interpolating analyzed parameters (e.g. also described as analysis-synthesis parameters) from two different analyzed datasets. This technique is typically encountered in body motion modeling or audio morphing for instance. These techniques however do not typically use a function mapper between extracted feature envelopes and analyzed dataset. They typically keep a stored version of the analyzed dataset and thus are often difficult to use at synthesis time in low footprint environments.

Yet other techniques in audio use extracted features envelopes or combination of feature envelopes to control known audio effects such as time stretching or reverbs. These methods aim to control traditional audio effects in a dynamic way. They usually use explicit mapping schemes.

Generally Applicable Embodiments

FIG. 1 illustrates a parametric analysis process performed on captured data 102 to obtain an analyzed dataset (or analysis-synthesis dataset) 106. The captured data 102 may come from a capturing device 100 (e.g., data sensor or measurement device) or from any other source such as another synthesis process. Examples of captured data to be modeled include audio samples, motion capture samples, texture bitmaps, statistic distributions, and other processes. The data is then passed to a parametric analysis process 104 (or analysis for synthesis process), which includes estimating a set of parameters from the original captured data 102 in accordance with a predetermined general representation. The estimated set of parameters (or synthesis parameters) obtained at this analysis stage, are stored as an analyzed dataset 106.

One example of such parametric analysis and general representation is Spectral Modeling Synthesis (SMS), where the chosen general representation is a succession of Short Term Fourier Transform of the signal. Other examples of parametric analysis include wavelet-based analysis, LPC (Linear Predictive Coding (LPC) analysis, Perlin noise modeling, and the like. Examples of other general representations often used in parametric analysis/synthesis techniques include wavelet transforms as used in image synthesis or motion synthesis, for example, Hidden Markov Models (HMMs), and rigid-body skeleton analysis.

Examples of synthesis parameters extracted from the data to fit a general description include: Fourier transform coefficients or approximations such as spectral peaks, wavelets coefficients, transition probability densities, articulation joints positions and angles etc. The process of estimating or directly acquiring parameters to fit a general representation (like in body motion data capture and skeleton general representation) can also be referred to as parametric analysis.

The analyzed dataset 106 contains the synthesis parameters necessary to re-synthesize the original data or an approximation of the original data. Analyzed datasets are typically organized according to analyzed parameter exemplars (or synthesis parameter frames, or analysis-synthesis exemplars) that capture evolutions or variations of the synthesis parameters (e.g., analyzed dataset exemplar 504 in FIG. 5). Such evolutions are not necessarily temporal, they can relate to time, to space or to other types of relevant dimensions. Analyzed dataset exemplars (or synthesis parameter frames, or analysis-synthesis frames) can be one-dimensional or multi-dimensional depending on the particular data type and general representation chosen.

FIG. 2 Illustrates a re-synthesis process performed by feeding the analyzed dataset 106 as synthesis parameters to a synthesis process 200 (or synthesizer) that performs the inverse operation of analysis process 104. The result of this synthesis process is an approximation 202 of the original captured data 102. If the original data to be modeled is audio data then the approximation 202 is an approximation of the original audio, if the original data is body motion captured data then the approximation 202 is an approximation of the body motion captured data, if the original data is a texture image then the approximation 202 is an approximation of the texture image, etc.

FIG. 3 illustrates a feature extraction process 300. Feature envelopes can be computed from the analyzed dataset 106 (or synthesis parameters), or directly from the captured data 102 or both, or manually assigned using a graphical editor for instance. Examples of feature extraction processes include: Pitch detection, loudness estimation, Mel-Frequency Cepstral Coefficient (MFCC) estimation, Root joint position movements direction estimation or acquisition, global velocity estimation or acquisition. The output of the feature extraction process 300 is saved in a feature envelope store 302.

FIG. 4 is a block diagram illustrating a training or building process 404 for a function mapper 400 based on extracted feature envelopes stored in a features envelope store 302 (FIG. 3) and an analyzed dataset (or analysis-synthesis dataset) 106 (FIG. 1) to produce a trained function mapper 402 according to an example embodiment. Any transform can be applied to extracted features to derive even more features envelopes. For example N-order derivatives and or delay lines can be applied to a specific feature envelope to obtain yet another feature envelope to present to the function mapper 400 shown in FIG. 4. Such transforms can also be applied to analyzed datasets. Feature envelopes are organized as successions of feature envelopes exemplars (or feature envelopes frames, or feature vectors). Feature envelopes exemplars may include one-dimensional or multi-dimensional sets of values. They can be computed from analyzed dataset exemplars and/or directly from the data to be modeled. Successions can relate to time, space or other relevant dimensions according to the data to be modeled and to the specific application.

The function mapper establishes a correspondence (or mapping) between the extracted features envelopes in the feature envelopes store 302 (FIG. 3) and the analyzed dataset 106 (FIG. 1) or a subset of the analyzed dataset 106. The function mapper 400 typically has extrapolation and/or interpolation capabilities. Such a function mapping can be achieved by many techniques including neural networks (NN), support vector machines (SVM), memory-based techniques, and a wide variety of other techniques common in the field of modeling. Techniques can be parametric like neural networks or SVMs where a fixed number of parameters are fit to the original data during a training or building process 404, or non-parametric like in-memory-based techniques where the number of parameters varies with the amount of data. These techniques can be adaptive or not, feeding some or all outputs back into the inputs or not.

Certain embodiments disclosed herein include a Multi-layer Feedforward Perceptron (MLP) neural network as a function mapper 400. Those skilled in the art will appreciate that alternative function mapping techniques may be used.

In accordance with one embodiment, a multilayer feedforward perceptron neural network is used as a function mapper 400. Neural networks can be considered as representatives of a broad class of adaptive function mappers and have been shown to be universal function approximators. Moreover, neural networks are known for their interpolation and extrapolation properties. Another advantage is that neural networks can be very compact in term of memory usage and very fast in terms of Central Processing Unit (CPU) usage and are therefore suitable for embedded applications.

Figure 5:
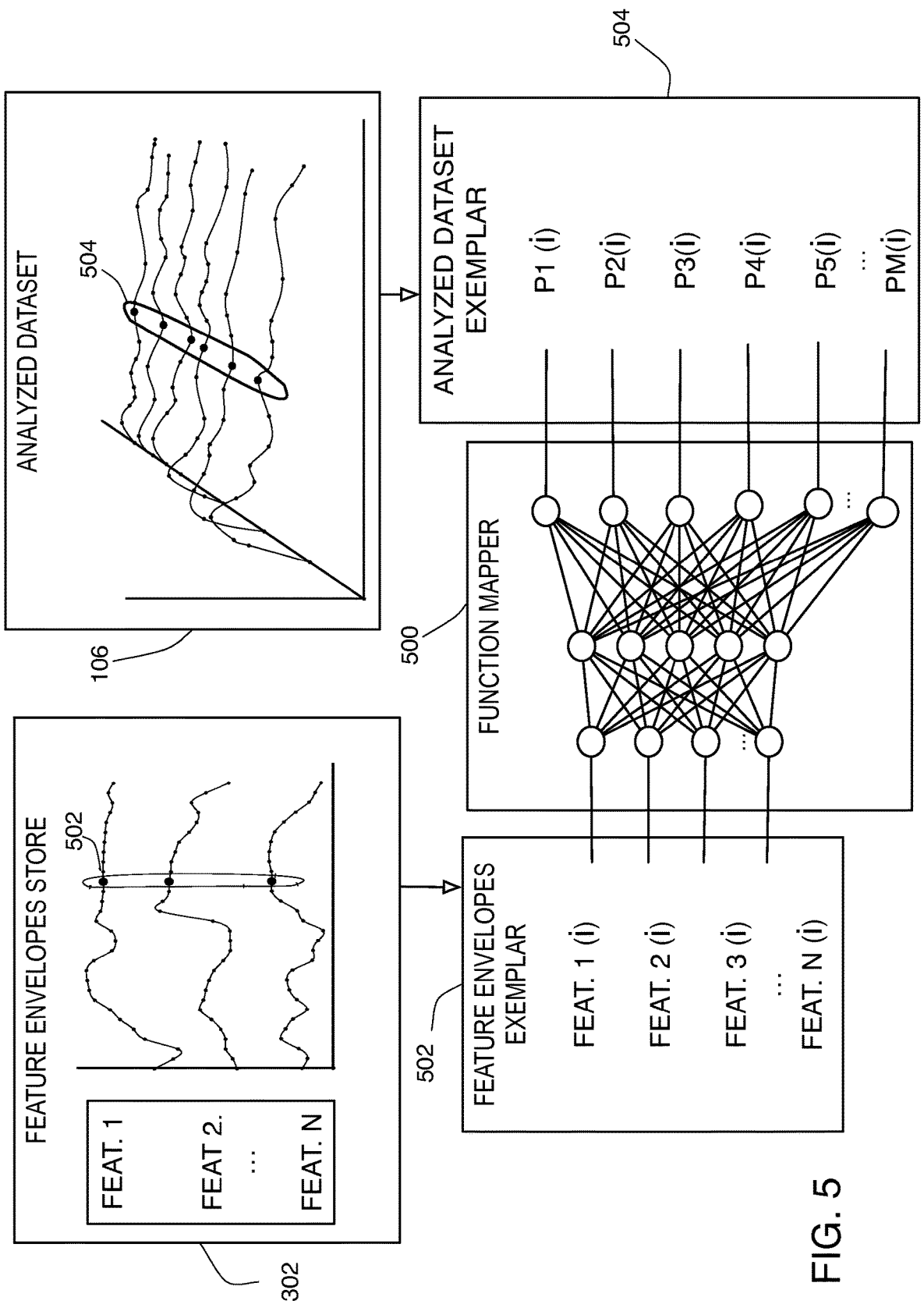
FIG. 5 further illustrate the process of building a function mapper between extracted feature envelopes and analyzed dataset, where the function mapper is a Multi-layer perceptron neural network (MLP) for an embodiment related to the embodiment of FIG. 4.

FIG. 5 shows a feed-forward Multilayer Perceptron (MLP) neural network used as a function mapper 500 according to one embodiment. In this embodiment the neural network is trained with a standard backpropagation-type algorithm. The input patterns are feature envelope exemplars 502 (or feature envelope frames that are taken from the feature envelope store 302 (FIG. 3) and the output patterns are analyzed dataset exemplars (or analysis-synthesis frames, or synthesis parameters frames) 504 that are taken from the analysed dataset 106 (FIG. 1). Both the feature envelope exemplars 502 (or frames) and the analyzed dataset exemplars 504 (or frames) can be one-dimensional or multi-dimensional depending on the application. Input patterns for an index i may include input frames at i-1, i-2, ... i-n and/or i+1, i+2, ... i+n.

During this training (or design) stage, feature envelope exemplars 502 are presented at the input of the function mapper 500 and the corresponding analyzed data exemplars 504 are presented at the output of the MLP as the desired outputs to be learned. Dataset normalizing techniques common in the neural network field, are applied at training time to the feature envelope dataset and the analyzed dataset. As noted in FIG. 5, the feature envelope exemplars 502 may also correspond to the previously discussed feature envelopes store 302 (FIG. 3), and the analyzed data exemplars 504 may also correspond to the previously discussed analyzed dataset 106 (FIG. 1).

Figure 6:
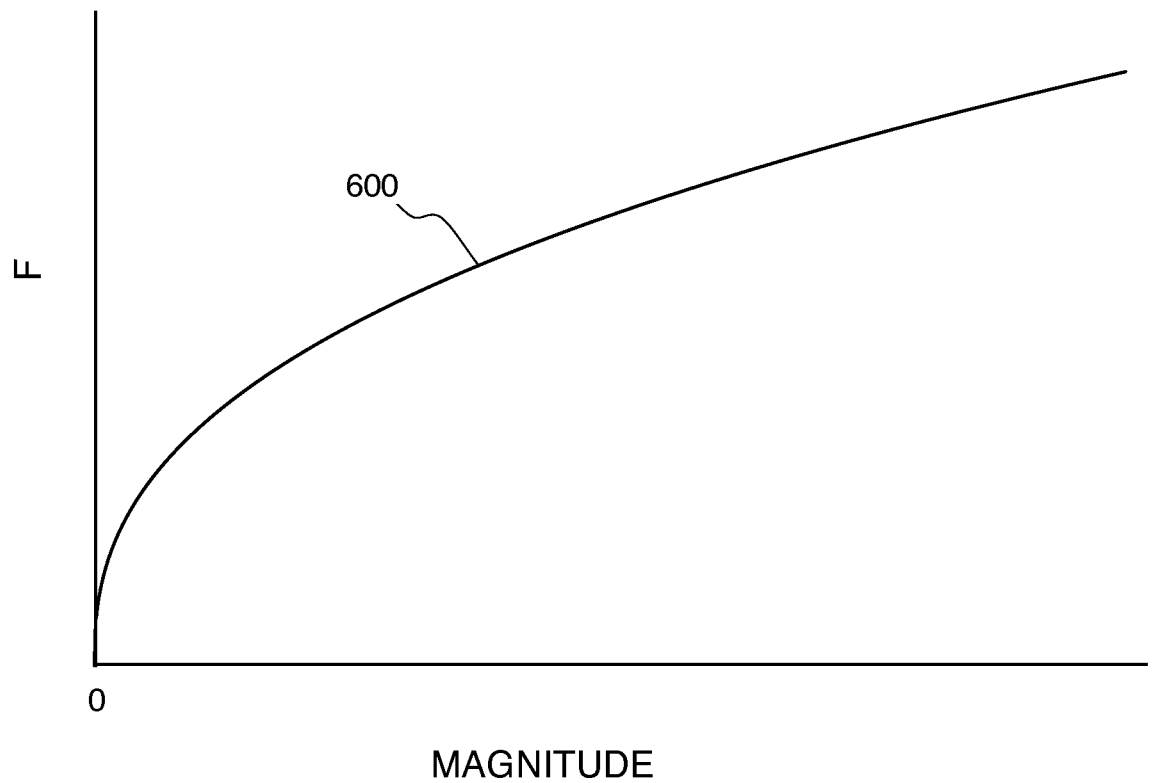
FIG. 6 is an example of a magnitude dependent weighting function that can be used for function mapper training.

FIG. 6 is an example of a magnitude dependent weighting function 600 that can be used for function mapper training. At this training (or design) stage and depending on the modeled data, the target application, and the type of function mapper used, a magnitude weighting (or normalizing) function F such as the one shown in FIG. 6 can be applied to analyzed dataset or feature envelopes or both during learning to ensure that all parts of the data are given an equivalent weight (i.e., values of same order of magnitude at the outputs of the function mapper). When such a function is used at training stage as a normalization function, the inverse function is then applied at synthesis stage to the outputs (or inputs or both) of the function mapper.

FIG. 7 is a block diagram illustrating the process of feeding feature envelopes from the feature envelope store 302 (FIG. 3) to a trained function mapper 402 (FIG. 4) to obtain an approximation of the original captured data 710 through an approximation of the original analyzed dataset 700 and a synthesis process 200 (FIG. 2). Once the function mapper 400 (FIG. 4) has been built or trained, re-synthesis is achieved by feeding the original feature envelopes 302 as inputs to the trained function mapper 402 to obtain an approximation of the original analyzed dataset 710 (or synthesis parameters). The generated approximation of the original analyzed dataset 700 (or approximation of synthesis parameters) is fed to the synthesizer 200 (FIG. 2) to perform synthesis process and obtain an approximation of the original data.

The function mapper's outputs can represent all the synthesis parameters needed for synthesis process 200, or only a subset of these parameters. If the function mapper's outputs represent only a subset of the parameters needed for synthesis then other information such as information from the feature envelope store 302 might be needed at synthesis time to produce the full synthesis parameter frames needed by the synthesizer. In that case, the synthesis process 200 includes a pre-processing stage where the missing parameters are generated. Related aspects will be described below with reference to certain embodiments.

FIG. 8 is a block diagram illustrating the process of feeding modified feature envelopes from a modified feature envelope store 802, where exemplars are modified independently, to a trained function mapper to obtain modification of the original data. As shown in FIG. 8, a trained function mapper 402 (FIG. 4) is used to produce a modified analyzed dataset 804, which is fed to a synthesis process 200 (FIG. 2) to produce modified original captured data 812. One advantage of using a function mapper is using its interpolation and extrapolation capabilities to perform synthesis of new data by using feature envelopes that are different from the original extracted ones. When new envelopes are fed as inputs, the function mapper interpolates and or extrapolates new synthesis parameters while preserving some degree of original correlation amongst the synthesis parameters exemplar by exemplar.

In FIG. 8, Feature envelope #2 is modified independently of feature envelope #1. This modification thus is not respecting natural relationships (or cross-correlations) between feature envelope #1 and feature envelope #2. Also the only modified value 806 is modified independently from the neighbouring values in feature envelope #2. This modification thus is not respecting natural relationships between values in the same feature envelope (or auto-correlations). Therefore, this type of modification may produce a perceptually non-natural result especially if the modification is important and if many exemplars are modified in this manner. For example, if the data being modeled is audio data, the produced variation will likely sound unnatural as if "coming from a computer", and if the data to be modeled is body motion, then the modified motion will likely look unnatural, and so on.

Figure 9:
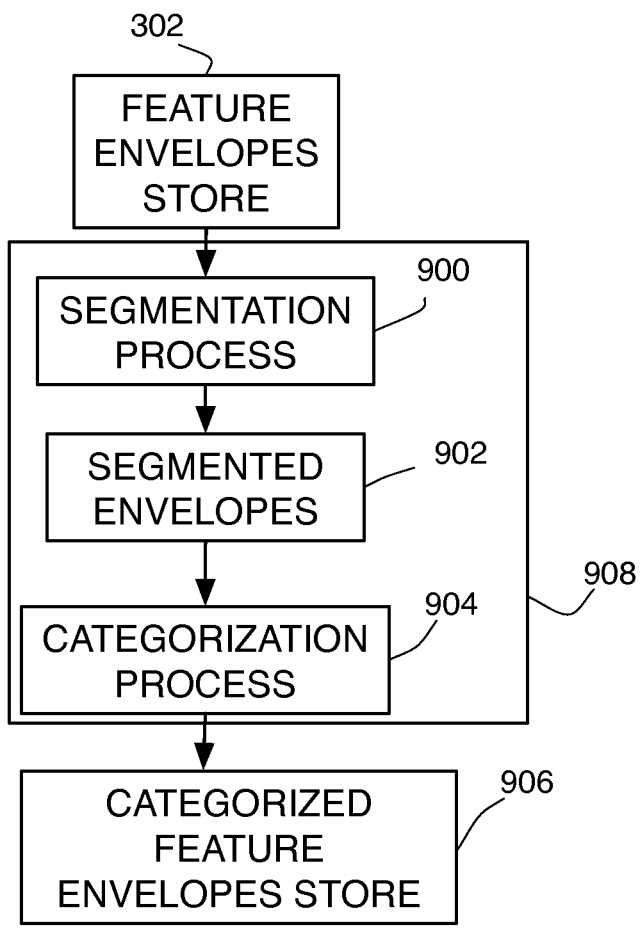
FIG. 9 is a block diagram illustrating a process of segmenting and categorizing feature envelopes.

FIG. 9 is a block diagram illustrating a process 908 of segmenting and categorizing feature envelopes from a feature envelopes store 302 (FIG. 3) including a segmentation process 900 to produce segmented envelopes 902 and a categorization process 904 to produce a categorized feature envelopes store 906. The segmentation process 900 consists in manually or automatically finding or assigning boundaries to the feature envelopes and or the original dataset so as to identify segments (or regions). Depending on the type of data to be modeled, segmentation can be performed automatically when segmentation algorithms are available in the field (ex: audio segmentation or image segmentation) or manually using a graphical editor like in body motion for instance. The categorization process 904 consists in automatically or manually assigning categories or labels to different segments (or regions). Categories can be integers or names corresponding to specific characteristics of the segment.

The results of the segmentation/categorization processes 908 of FIG. 9 in the categorized feature envelopes store 906 include information defining the boundaries of the segment, and one or more labels to assign one or more categories to the segment. Boundaries can relate to time if the data to be modeled are timed (e.g., for audio, or body motion) or space (e.g., for image texture) or to other dimensions relevant to the specific type of data being modeled and to the specific application. This information can be stored together with the corresponding feature envelope in the categorized feature envelopes store 906.

Figure 10:
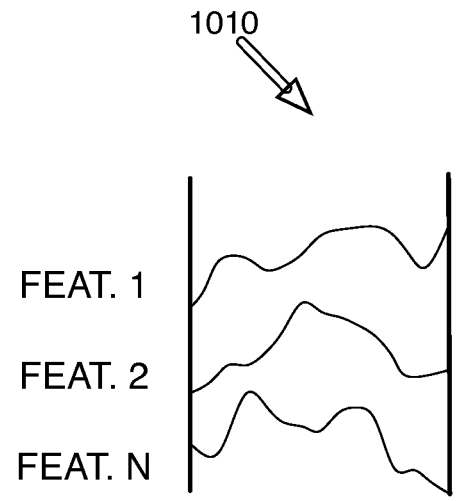
FIG. 10 shows an example of a feature envelope segment.

FIG. 10 shows an example of a feature envelope segment 1010.

Figure 11:
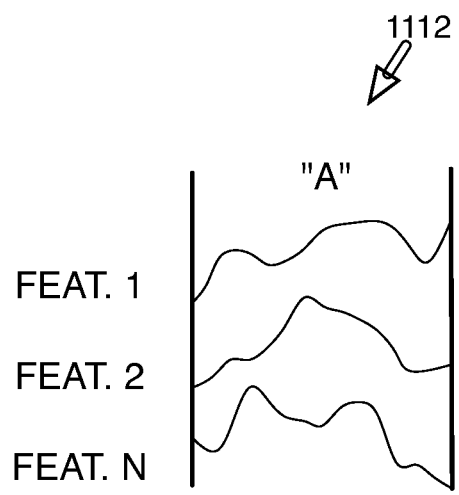
FIG. 11 shows an example of a categorized feature envelope segment.

Feature envelopes can be multi-dimensional or one-dimensional. In this particular case, the feature envelopes segment 1010 includes three one-dimensional feature envelopes with boundaries. FIG. 11 shows an example of a categorized feature envelope segment 1112 (or annotated feature envelope store). In this particular case the categorized feature envelope segment 1112 includes a feature envelope segment and one category (or label, or annotation). The category in this particular case is simply the letter "A", but it could be a name or a number for instance. Multiple categories can be assigned to a single segment.

As discussed below in greater detail, certain embodiments include a modeling stage and a synthesis stage. The modeling stage may include operations for training and building a model including: (a) operations for parametric analysis on original data to obtain an analyzed dataset; (b) operations for Feature extraction, segmentation and categorization; (c) operations for building or training one or more function mappers to map between extracted features and analyzed dataset (e.g., function mappers can possibly be trained or built to combine properties of two or more segments using a discriminant input); and (d) operations for designing and choosing generative rules and combination processes. The synthesis stage may include: (a) operations for feeding inputs (possibly including combined inputs) to one or more function mappers (possibly including function mappers trained or built to combine properties of two or more segments); and (b) operations for feeding output of the function mappers to a synthesis process. As discussed below in greater detail, a combination of two or more segments may occur at various places including the function mapper's input level, the function mapper's body level, the function mapper's output level, or some combination of these levels.

Figure 12:
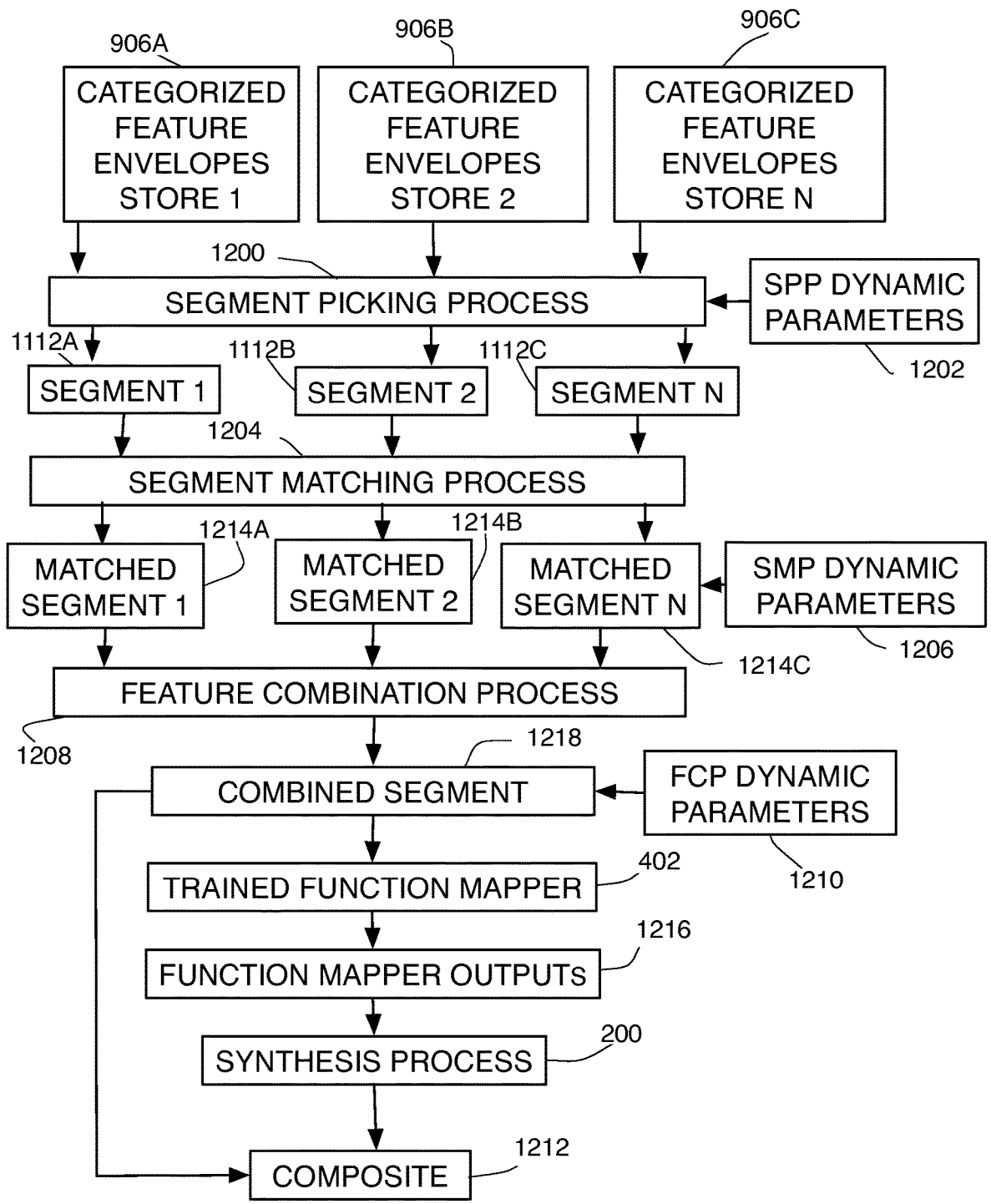
FIG. 12 illustrates a process of combining of two or more segments at the function mapper's input level.

FIG. 12 illustrates an example embodiment of a synthesis stage that combines two or more segments at the function mapper's input level. The segment picking process 1200 includes picking one or more feature envelope segments from one or more categorized feature envelopes datasets (or stores) 906A, 906B, 906C to determine segments 1112A, 1112B, 1112C. The rules and methods for segment picking including segment picking process (SPP) dynamic parameters 1202 can be chosen or designed at design time. Examples of segment picking rules include, for example, random picking, manual picking, or rules such as "pick the first segment of one dataset and the first segment of a second dataset, then pick the second segment of the first dataset and the second segment of the second dataset etc." As another example a rule can be "pick segments that fit a predetermined statistic distribution."

A segment matching process 1204 includes modifying or matching two or more feature envelope segments 1112A, 1112B, 1112C to obtain two or more matched segments 1214A, 1214B, 1214C, so that they can be further combined. The rules and methods for segment matching including segment matching process (SMP) dynamic parameters 1206 can be chosen or designed at design time. For example, if the segments 1112A, 1112B, 1112C relate to time, then one matching process may include stretching or interpolating or extrapolating the segments envelopes so that the different segments have the same chosen duration. If the segments relate to space for instance, then one matching process may include modifying the segments so that their spatial boundaries match.

A feature combination process 1208 or feature envelopes segment combination process includes generating a combined segment 1218 that provides a new feature envelopes segment based on two or more feature envelopes segments. The rules and methods for feature combination including feature combination process (FCP) dynamic parameters 1210 can be chosen or designed at design time. One example of feature combination process is linear combination of two or more feature envelope segments as will be described later in this document. Other examples are non-linear combinations of one or more segments; using statistical properties of one or more segments to generate or modify a segment etc. A feature envelopes segment can also be explicitly generated from mathematical formulas (like a warping functions for instance) to compute its envelopes and then be combined with one or more other feature envelope segments.

The segment picking process 1200, the segment matching process 1204, and the feature combination process 1208 are examples of generative rules or combining rules (or methods and rules for generating new feature entries by using the extracted features and or other information contained in the data and/or other subjective information so that the new generated features entries respect the natural correlations and/or other properties of the original extracted features.) As discussed above, these generative rules may have dynamic parameters to change and control their behavior, and these rules together with methods for changing or generating these dynamic parameters may be designed at the design stage.

As discussed above, an example of a synthesis stage that combines two or more segments at the function mapper's input level is described in FIG. 12. A corresponding synthesis method includes: performing a segment picking process 1200 to pick two or more segments from feature envelopes stores 906A, 906B, 906C; performing the segments matching process 1204 to obtain matched segments 1214A, 1214B 1214C; applying the feature combination process 1208 to the time-matched segments to obtain the combined segment 1218; feeding the combined segment 1218 to the trained function mapper 402 (FIG. 4); feeding the function mapper's outputs 1216 to the synthesis process 200. The function mapper's outputs 1216 can be a single frame (or exemplar) of outputs resulting from feeding one input feature envelope exemplar from the combined segment 1218 to the function mapper. In that case this outputs frame can be fed directly to the synthesis process without waiting for further input feature envelope exemplar to be fed to the trained function mapper 402 or for output exemplar to be produced.

If the function mapper's outputs 1216 in FIG. 12 represent only a subset of the parameters needed for synthesis then other information such as information from combined segment 1218 exemplar(s) might be needed at synthesis time to produce the full synthesis parameter frames needed by the synthesizer. In that case the synthesis process can include a pre-processing stage (or synthesis parameters reconstructive stage) that reconstructs the missing parameters for synthesis process when given necessary information. Necessary information can come for instance from the combined segment 1218 exemplar(s). In that case the combined segment 1218 exemplar(s) can be fed to the synthesis process to generate the missing parameters. This will be further described below with reference to certain embodiments.

Finally the method of FIG. 12 obtains a composite 1212 (e.g., a composite data structure) of two or more segments 112. For example, composites can be audio-composites if the data modeled is audio data. In that case an audio-composite segment will be a new audio segment inheriting some properties from two or more original audio segments. Composites can be body-motion-composites if the data modeled is body-motion data. In that case the body-motion composite segment will be a new body-motion segment inheriting some properties from two or more original body-motion-segments. Composites can be texture composites if the data modeled is image texture data. In that case the texture-composite segment will be a new texture segment inheriting some properties from the two or more original texture segments etc. Composites can also be created across different types of data where feature envelopes segments from data of one type (audio for instance) are combined to feature envelopes segments from data of another type (body motion for instance).

Figure 13:
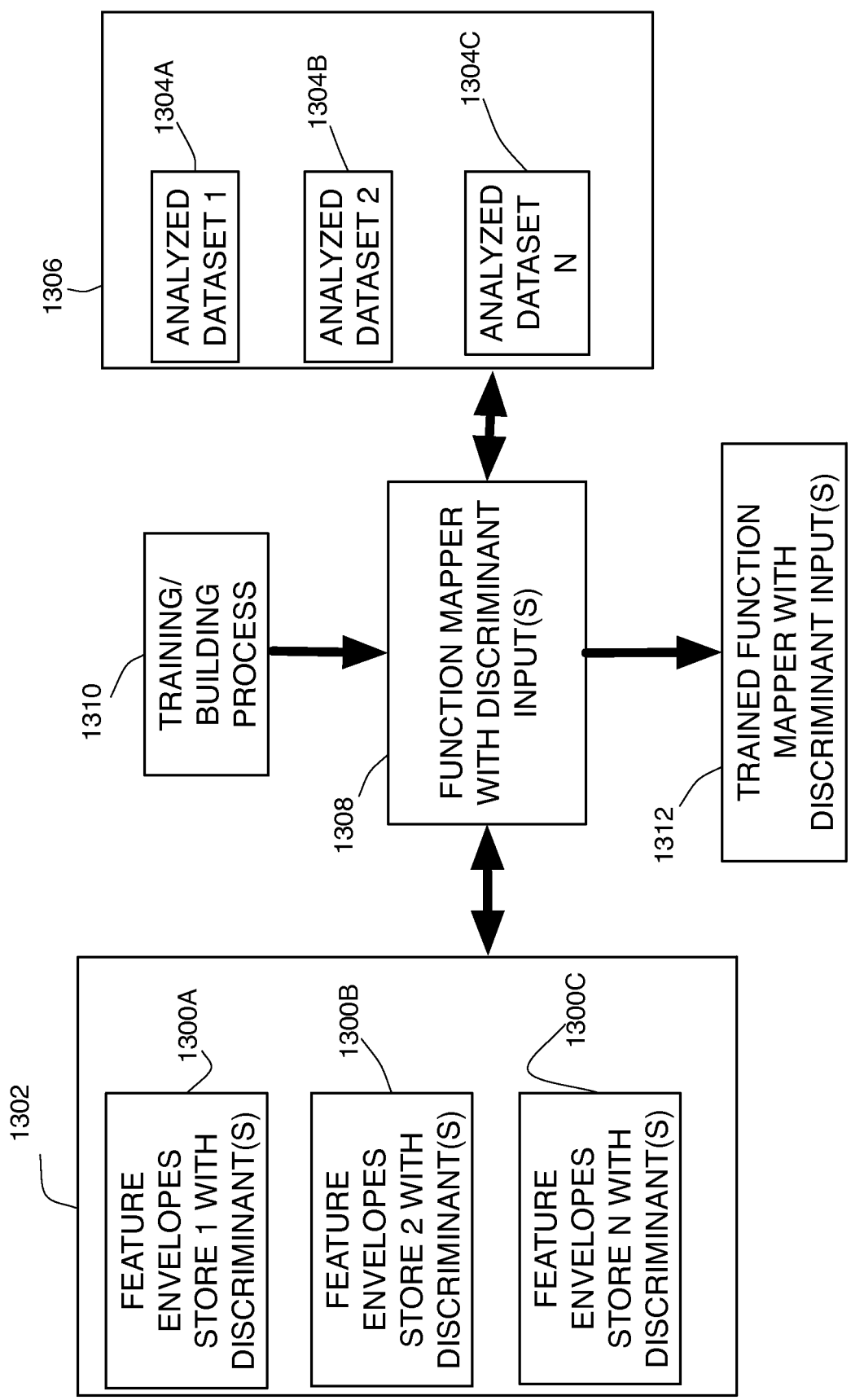
FIG. 13 illustrates the training stage of a process of combining of two or more segments at the function mapper's body level using discriminant inputs.

FIG. 13 illustrates the training (or design) stage of a process of combining of two or more segments at the function mapper's body level using discriminant inputs from a combined feature envelope store 1302 that includes a plurality of feature envelopes with discriminants 1300A, 1300B, 1300C. Discriminant inputs allow one to teach a function mapper to discriminate between specific properties of the data in different segments in order to control these properties. Using discriminant inputs can be viewed as a reverse process of traditional pattern recognition common in the art. At the training stage, the discriminant input value specifies to the function mapper what property it is learning. Then at the synthesis stage, the discriminant input value can be changed in order to cause the function mapper's interpolation/extrapolation capabilities to interpolate between the specific properties controlled by the discriminant input. This will be further described below with reference to certain embodiments.

Discriminants (or values assigned during the labeling process or values perceptually extracted manually by a human, as inputs for the function mapper both at design time and at synthesis time) can be manually assigned using a graphical editor for example. Some extracted features envelopes can be used as discriminant envelopes if these extracted features envelopes exhibit mostly different values in regions where the data is different with regards to the property to be controlled (or discriminated). This will be further described below with reference to certain embodiments.

In FIG. 13, the training process of a function mapper with discriminant inputs 1308 is illustrated. Feature envelope stores #1 1300A, #2 1300B and #N 1300C have different properties that can be discriminated by discriminant inputs in the function mapper with discriminant inputs 1308. During training/building process 1310 feature envelopes store #1 1300A, which includes one or more discriminant inputs (or values assigned during the labeling process or values perceptually extracted manually by a human, as inputs for the function mapper both at design time and at synthesis time) is mapped to analyzed dataset #1 1304A. Feature envelope store #2 1300B including one or more discriminant inputs is mapped to analyzed dataset #2 1304B and so on with feature envelope store #N 1300C being mapped to analyzed dataset #N 1304C. At training time, the feature envelope stores 1300A, 1300B, 1300C can be combined or joined together in a single feature envelopes dataset (or store) 1302 and analyzed datasets can be combined or joined as well to form a single analysed dataset 1306 including the analyzed datasets 1304A, 1304B, 1304C.

The resulting trained function mapper with discriminant inputs 1312 combines properties from all the different feature envelope stores and analyzed datasets it has been trained or built with. The discriminant inputs enable interpolation and extrapolation between the chosen properties at synthesis stage. This will be further described below with reference to certain embodiments. This process of building a function mapper with discriminant inputs is an example of combination of two or more segments at the function mapper's body level. This will be further described below with reference to certain embodiments.

Figure 14:
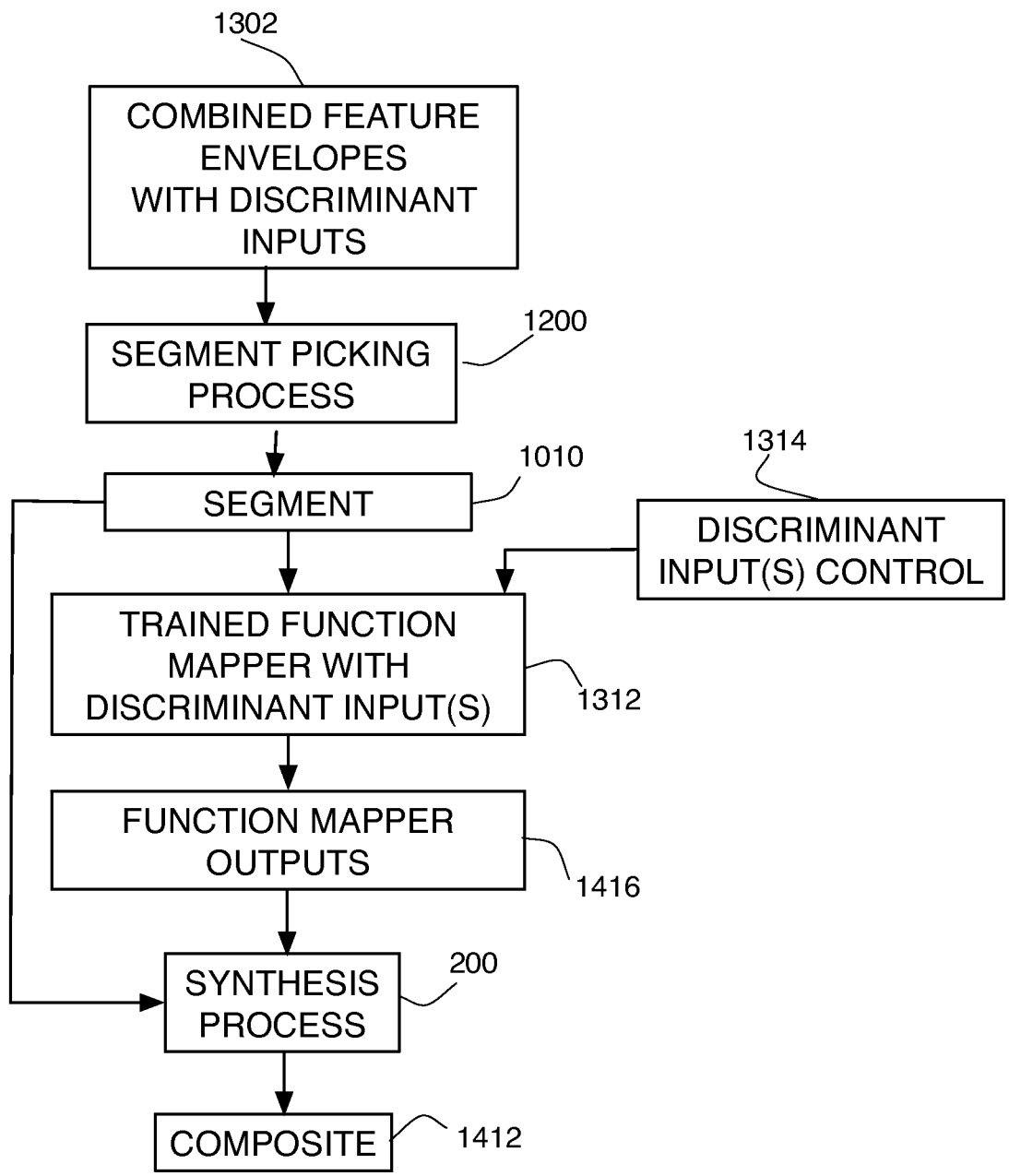
FIG. 14 illustrates the synthesis stage of a process of combining two or more segments at the function mapper's body level using discriminant inputs.

FIG. 14 illustrates the synthesis stage of a process of combining two or more segments at the function mapper's body level using discriminant inputs. With reference to FIG. 13, the trained function mapper with discriminant inputs 1312 is now able to interpolate/extrapolate according to the discriminant property. According to the segment picking process 1200 (FIG. 12), one or more segments 1010 (FIG. 10) are picked from one of the combined feature envelope stores 1302 (FIG. 13) for instance and extracted features are fed to the trained function mapper with discriminant inputs 1312 (FIG. 13). The function mapper's outputs 1416 are fed to the synthesis process 200 (FIG. 2). If the function mapper's outputs 1416 represent only a subset of the parameters needed for synthesis, then picked feature segment 1010 exemplars can be fed to the synthesis process 200 to generate the missing parameters. This will be further described below with reference to certain embodiments. As a final result in FIG. 14, composite 1412 is generated.

When varying discriminant inputs values through discriminant input control 1314, the discriminant property will also change at the outputs of the trained function mapper 1312 and hence in the composite 1412 as well. This will be further described below with reference to certain embodiments.

Figure 15:
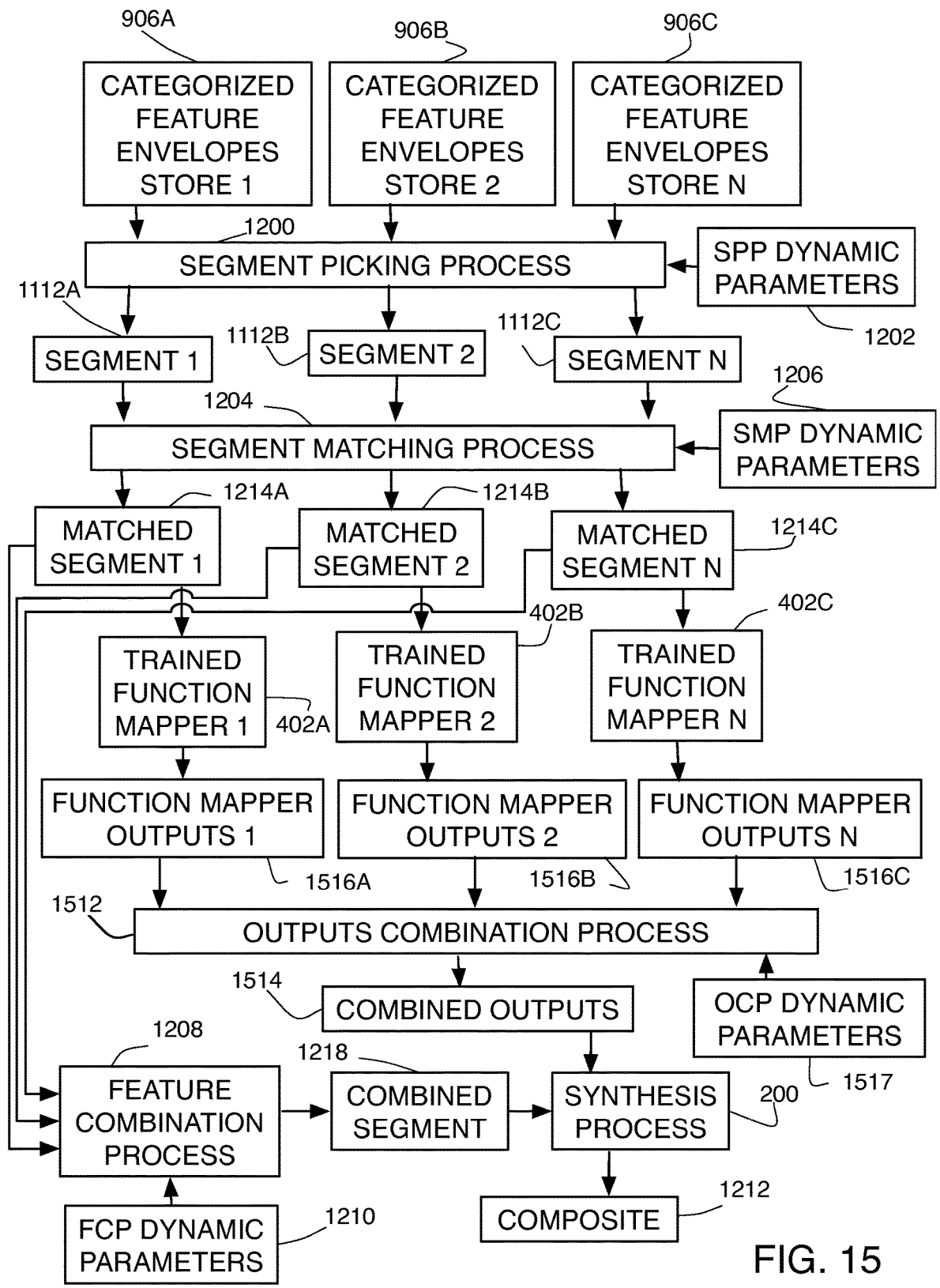
FIG. 15 illustrates a process of combining of two or more segments at the function mapper's outputs level.

FIG. 15 illustrates an example embodiment of a synthesis stage that combines two or more segments at the function mapper's output level. The segment picking process 1200 (FIG. 12) includes picking one or more feature envelope segments from one or more categorized feature envelopes datasets (or stores) 906A, 906B, 906C to determine segments 1112A, 1112B, 1112C. The rules and methods for segment picking including segment picking process (SPP) dynamic parameters 1202 can be chosen or designed at design time.

A segment matching process 1204 (FIG. 12) includes modifying or matching two or more feature envelope segments 1112A, 1112B, 1112C to obtain two or more matched segments 1214A, 1214B, 1214C, so that they can be further combined. The rules and methods for segment matching including segment matching process (SMP) dynamic parameters 1206 (FIG. 12) can be chosen or designed at design time.

An outputs combination process 1512 includes generating new function mapper outputs based on two or more function mapper outputs 1516A, 1516B, 1516C. One example of outputs combination process is linear combination of two or more function mapper outputs 1516A, 1516B, 1516C. Other examples are non-linear combinations of one or more segments; using statistical properties of one or more segments to generate or modify a segment etc. An outputs frame can also be explicitly generated from mathematical formulas (like a warping function for instance) instead of being produced by a trained function mapper then combined to one or more other outputs frames. The outputs combination process 1512 can implement a variety of combining rules such as the combination of two or more segments at the level of the function mapper's outputs 1516A, 1516B, 1516C as shown in FIG. 15.

As discussed above, an example of synthesis stage combining two or more segments at the function mapper's output level is described in FIG. 15. A corresponding synthesis method includes: performing a segment picking process 1200 (FIG. 12) to pick two or more segments from feature envelope stores 906A, 906B, 906C; performing a segment matching process 1204 (FIG. 12) between all picked segments; feeding time matched feature envelope segments 1112A, 1112B, 1112C to trained function mappers 402A, 402B, 402C in parallel; performing an output combination process 1512; feeding combined outputs 1514 to the synthesis process 200; performing a feature combination process 1208 on the matched feature envelope segments 1214A, 1214B, 1214C to obtain a combined segment 1218.

If the combined outputs 1514 represent only a subset of the parameters needed for synthesis, combined segment 1218 exemplar(s) can be fed to the synthesis process 200 to generate the missing parameters. This will be further described below with reference to certain embodiments. Finally the method of FIG. 15 obtains a composite 1212 (e.g., a composite data structure) of two or more segments 1112A, 1112B, 1122C.

With reference to FIGS. 12, 13, 14, and 15, it should be emphasized that modifications of the different parameters for the different processes involved can be changed from one exemplar to the next. For example, segment picking process (SPP) dynamic parameters 1202, segment matching process dynamic (SMP) parameters 1206, outputs combination process (OCP) dynamic parameters 1517, discriminant input control 1314, feature combination process (FCP) dynamic parameters 1210 can all be changed from one exemplar to the next thus making the resulting composite 1212 modifiable as exemplars are fed to the system. If all elements in the chain (e.g., the segment picking and matching process, the function mapper, the synthesis process, the feature and outputs combination processes, etc.) are implemented to operate in real-time, then the changes in the composite 1212 can occur in real-time making the composite dynamic or changeable in real-time.

Example Audio Embodiments

Figure 18:
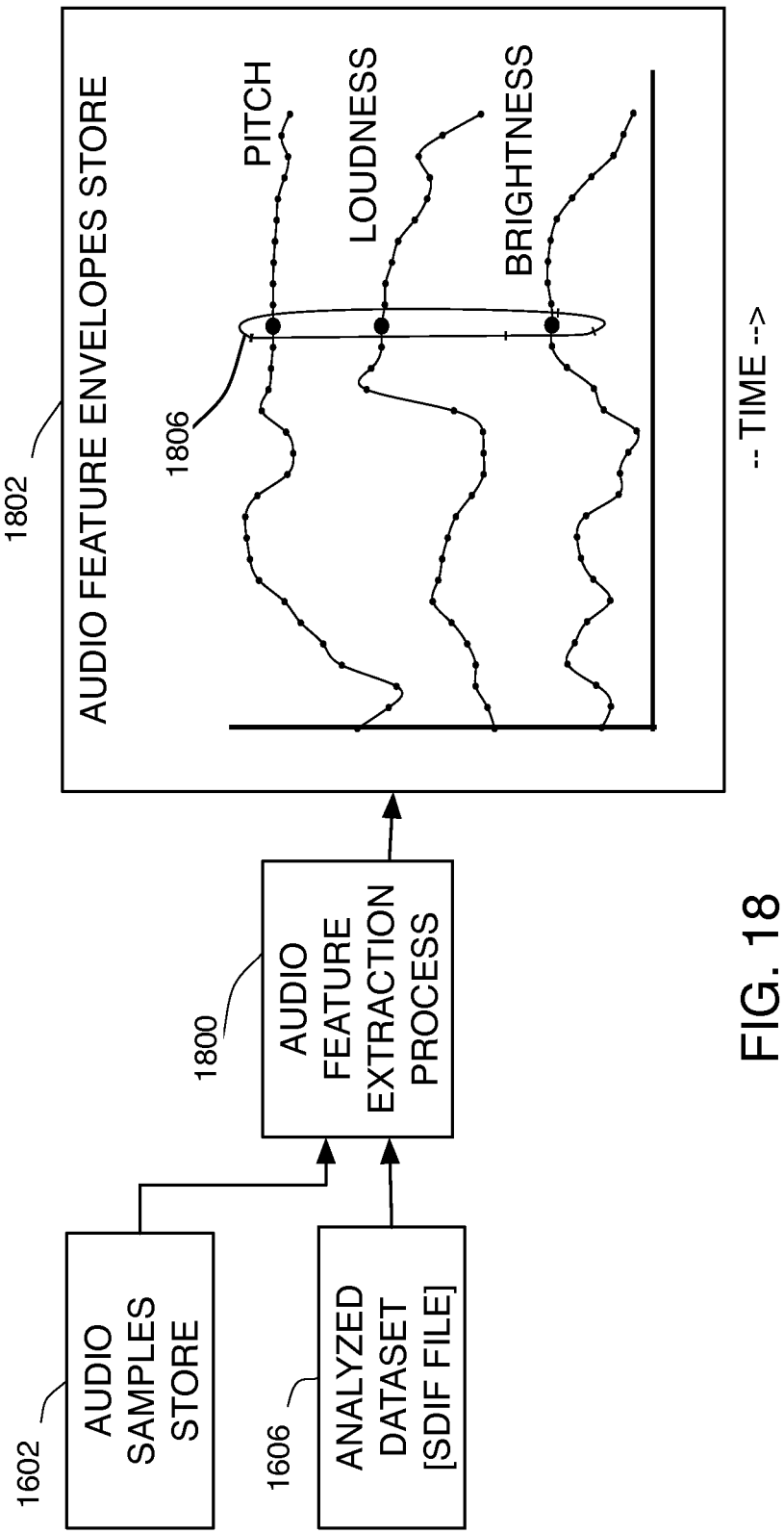
FIG. 18 is a block diagram illustrating a feature extraction process, feature envelopes dataset and feature exemplars.
Figure 19:
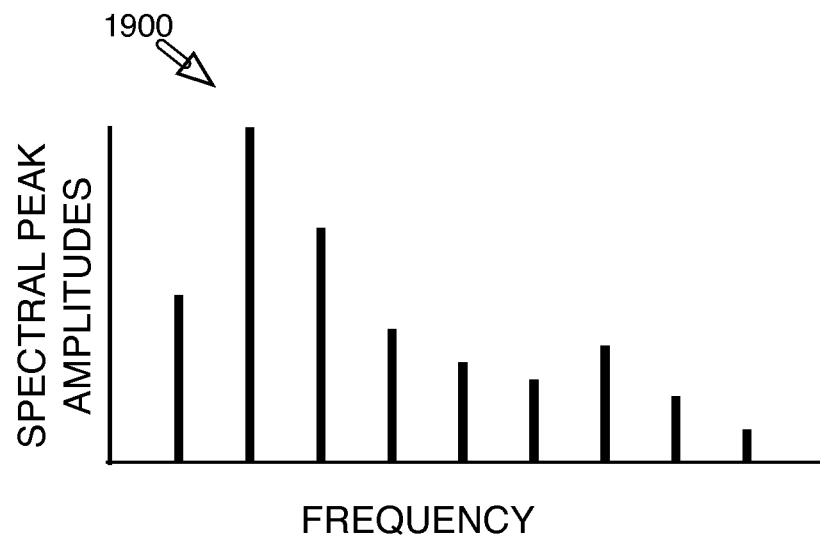
FIG. 19 shows an analyzed dataset exemplar consisting of one frame of spectral peaks.
Figure 20:
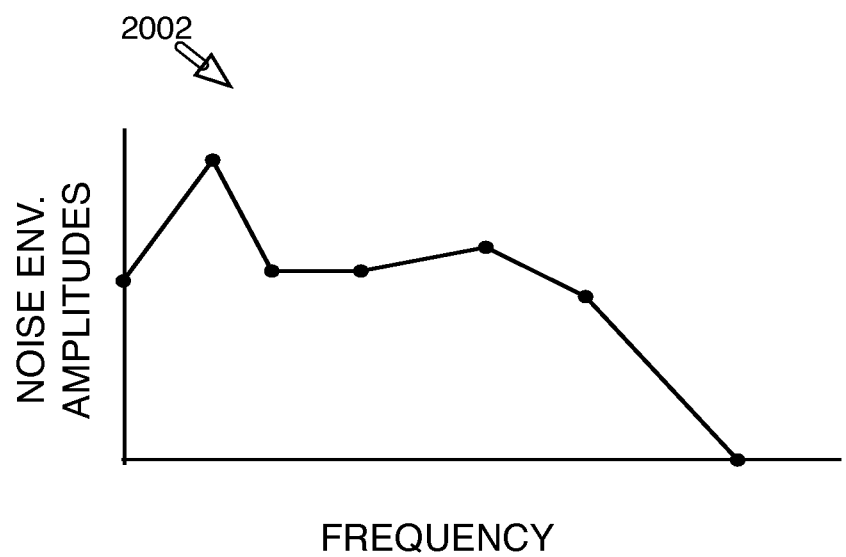
FIG. 20 is an analyzed dataset exemplar consisting of one frame of stochastic envelope.

FIGS. 16, 17 and 18 present embodiments directed to audio applications in correspondence to FIGS. 1, 2 and 3 described above for generally applicable embodiments. FIGS. 19 and 20 show characteristic analysed dataset frames amplitude plots as a function of frequency.

FIG. 16 illustrates a parametric analysis process performed on recorded audio sample from an audio sample store 1602 to obtain an analyzed dataset 1606 (or synthesis parameters set). In accordance with one embodiment, the data to be modeled are monophonic audio recordings such as instruments like flute, saxophone, singing voice or other sounds such as animal sounds, sound effects, and the like. Such samples can be captured using a microphone and an audio recording device 1600, or by any other mean such as recorded from the output of another synthesis process.

The audio samples are then passed to an SMS-type parametric analysis process 1604 based on Spectral Modeling Synthesis (SMS). The result of the SMS-type analysis is stored in a Sound Description Interchange Format (SDIF) file that contains the analyzed dataset. The analyzed dataset is typically organized in timed frames. A deterministic frame typically contains spectral peaks (frequencies, amplitudes, phases) as illustrated by the frame 1900 (FIG. 19). A typical frame contains generally from ~10 to ~1000 peaks but this number can be chosen to be more or less depending on the audio quality desired and the audio content. A non-deterministic frame typically contains a noise spectrum that can be approximated by a breakpoint function (BPF) (or line segments) 2002 (FIG. 20). The number of bins depends on the analysis window size which itself depends on the type of sound to be analyzed.

In accordance with one embodiment, operations on the synthesis frames may be further simplified as follows: In the deterministic frames, phase information is discarded. In the non-deterministic frames, linear-segment approximations are performed to obtain a stochastic noise envelope. Fixed critical bands are used for the frequencies. Alternatively, a second peak estimation on this residual spectrum may be applied and non-fixed frequency locations may be used instead.

FIG. 17 illustrates a re-synthesis process performed by using the analyzed dataset 1606 in order to obtain an approximation of the original audio samples 1702. The analyzed dataset 1606 is fed frame by frame to an SMS synthesis process 1700 which performs the inverse operation of the SMS analysis process 1604. One embodiment uses the estimated spectral peaks generated by the SMS analysis process 1604 as synthesis parameters. Estimated spectral peaks are approximations of the original spectra; therefore, the re-synthesis process generates only an approximation of the original audio data 1702 and not the original data 1602 itself.

FIG. 18 illustrates a feature extraction process 1800 to obtain an audio feature envelopes dataset 1802. Feature envelopes can be computed from the analyzed dataset 1606 or directly from the captured audio data 1602 or manually assigned using a graphical interface for example.

Feature envelopes are successions of feature envelope frames (or feature envelope exemplars). The values in the feature envelope frames (or feature envelope exemplars, or feature vectors) can be computed from analyzed dataset frames 1900 or 2002 from the audio slices by the feature extraction process 1800. For instance one exemplar can be computed every 10 ms of audio. Features envelopes extracted according to one embodiment include pitch, loudness, and brightness. Algorithms and formulas to compute these feature envelopes are known in the art.

According to one embodiment, pitch is computed for each frame at analysis time by the SMS analyzer using the spectral frames 1900. The pitch feature envelope is present in the SDIF (Sound Description Interchange Format) file 1606. Alternatively the pitch can be computed using one of the many pitch estimation algorithm commonly used in the art either in the frequency domain or in the time domain using the original data 1602. Many other features envelopes can be extracted and used. Other examples of standard audio features are described for instance in the MPEG-7 standard specification. Alternative characteristics related to audio signals may be similarly employed.

FIG. 19 shows an analyzed dataset parameter frame 1900 representing spectral peaks amplitudes and frequencies. FIG. 20 shows an analyzed dataset parameter frame representing a stochastic noise envelope (or breakpoint function) approximation 2002 of a residual spectrum frame. Noise envelopes frequencies can be fixed and correspond to critical bands for instance or they can be estimated. These frames 1900, 2002 or their amplitudes are examples of analyzed dataset exemplars.

Figure 21:
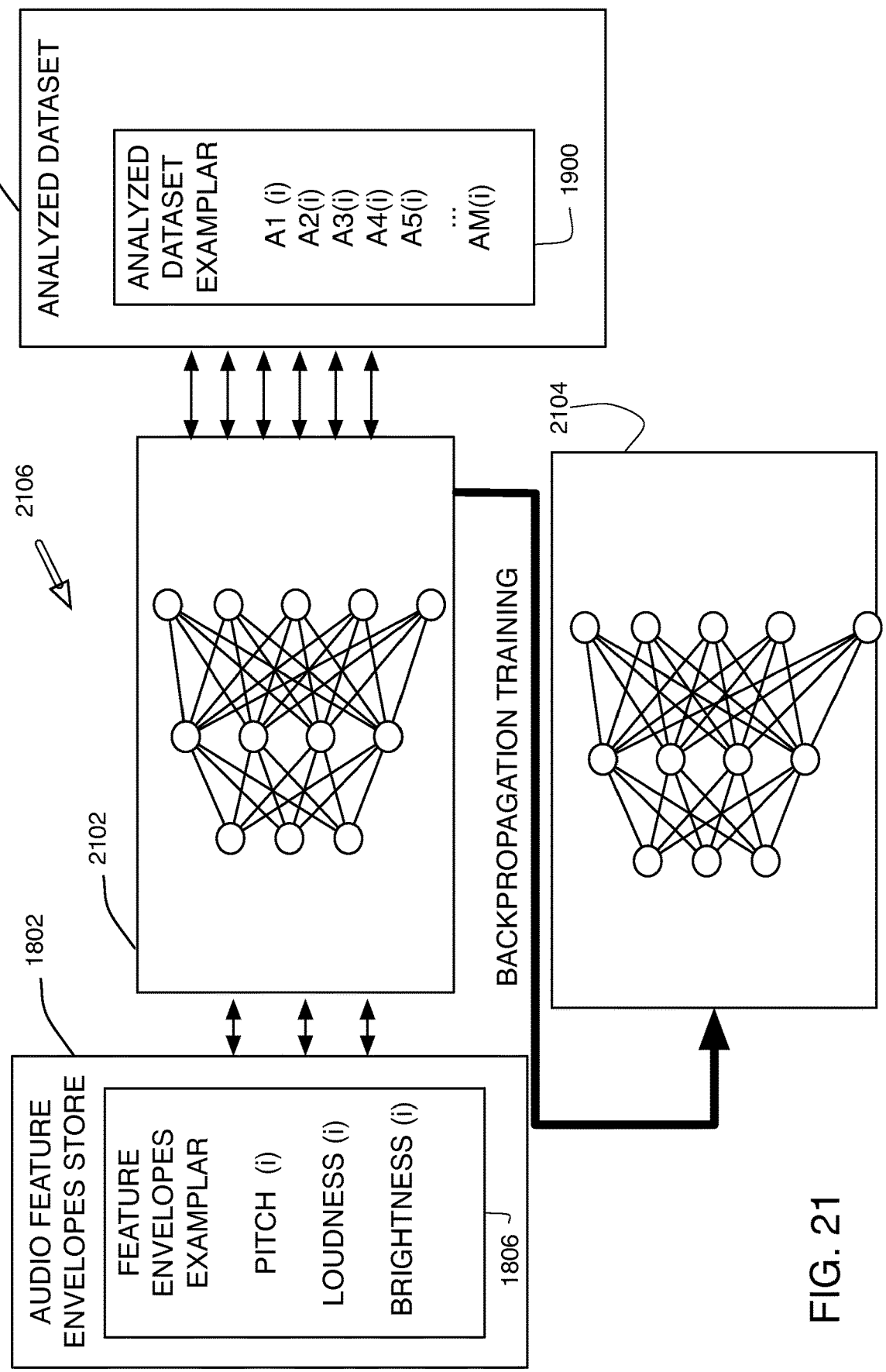
FIG. 21 is an example of the process of building a function mapper between extracted feature envelopes and synthesis parameters, where the function mapper is a multilayer perceptron neural network (MLP).

FIG. 21 shows an example embodiment related to building or training a function mapper between extracted feature envelopes 1802 (e.g., as in FIG. 18) and analyzed dataset 1606. In accordance with one embodiment, the function mapper is a Multilayer Perceptron (MLP) neural network 2102 and the training process includes adjusting the MLP's internal parameters (weights and biases) according to a well-known backprogpagation algorithm.

As illustrated in FIG. 21, the MLP is trained to map between feature envelope exemplars 1806 from the audio feature envelopes store (or dataset) 1802 and corresponding analyzed dataset exemplars 1900 from the analyzed dataset 1606. The dataset exemplars 1900 may include the amplitudes (or magnitudes) of the spectral peaks. Exemplars may also include other spectral information such as frequencies for example, and an MLP could be trained on the frequency trajectories to provide the frequencies information needed at synthesis time and thus model sounds that are not purely harmonic. An MLP could also be trained on the noise spectral envelopes to model noise like sounding sounds such as wind or breaths.

According to one embodiment, during the training stage, each feature exemplar 1806 is successively presented at the input of the MLP and each corresponding analyzed dataset exemplar (or analysis frame) 1900 is presented at the output of the MLP as the desired outputs to be learned. According to one embodiment the MLP is trained according to a well-known backpropagation algorithm.

Figure 23:
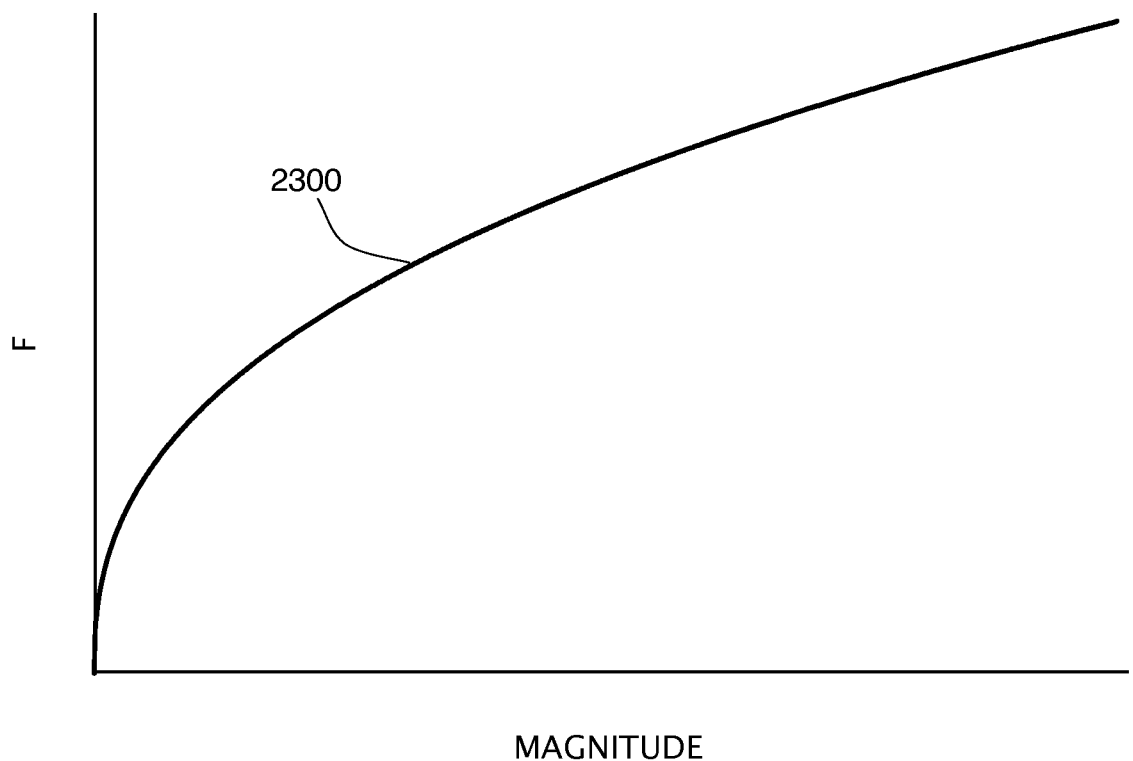
FIG. 23 is an example of a magnitude dependent weighting error function used for function mapper training.

At this training (or design) stage a magnitude weighting (or normalizing) function such as 2300 in FIG. 23 can be applied to the analyzed dataset 1606 or feature envelopes 1802 or both during learning to ensure that all parts of the data are given an equivalent weight (e.g., values of same order of magnitude) at the outputs of the function mapper during training time. The exact form of the function is not critical. When such a function is used at training stage as a normalization function, the inverse function is then applied at synthesis stage to the outputs (or inputs or both) of the function mapper. The magnitude weighting function can also be used as an error function during training instead of the common least mean squared error function.

Using a magnitude dependent weighting function ensures that the lower magnitudes parameters are weighted significantly in order to be properly learned. In some operational settings, using a frequency dependent function may result in an undesired "buzzing sound effect" in parts of the sound where the overall loudness is much lower than the rest of the sound (for instance in ending parts of notes) because not all frequencies in these low loudness parts will be given significant weighting and thus won't be learned properly by the network.

According to one embodiment the architecture of the MLP is characterized as having one input per extracted feature envelope to control and one output per parameter to control in an analyzed dataset frame. In one specific embodiment, for example, in the case where the number of partials peaks to be controlled is 100 and the number of feature envelopes is 3, the network has 100 outputs, 3 inputs, one hidden layer of 100 neurons and is fully connected. Other architectures are also suitable. For example, the number of hidden layer or number or hidden neurons can vary, or the MLP can be fully or partially connected. Additionally, shunting units may be added to shunt the outputs to zero if the amplitude is below a certain threshold.

At the end of the training process shown in FIG. 21, a trained MLP neural network 2104 is obtained with its parameters (e.g., weights, biases) fitted to the training data. Some examples of other function mappers that could be used instead of standard MLP neural networks include Time Delay Neural Networks and Support Vector Machines.

Figure 22:
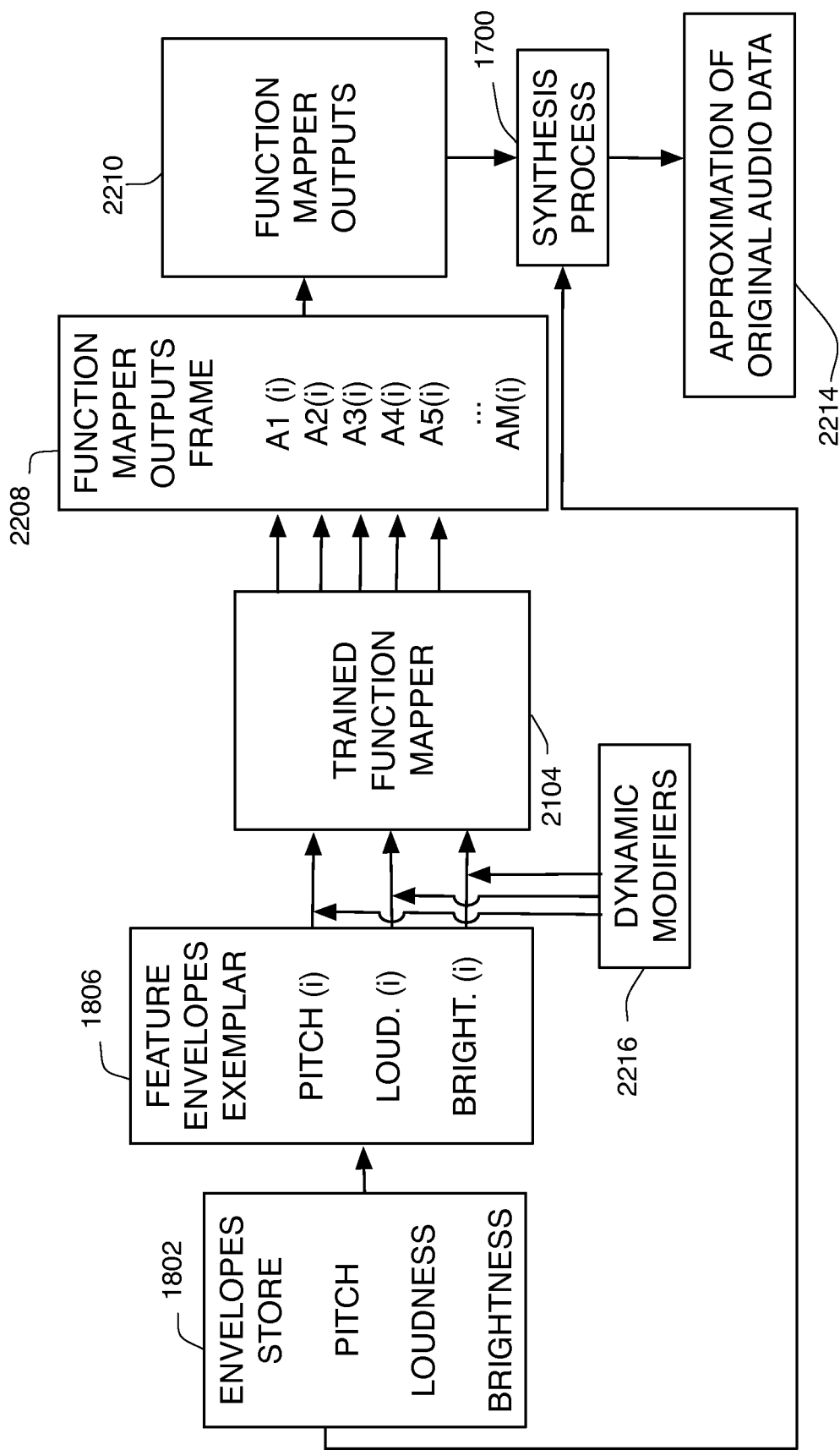
FIG. 22 is an example of the process of feeding feature envelopes to a trained function mapper to obtain an approximation of the original audio data.

FIG. 22 shows an example embodiment of the process of feeding feature envelopes 1802 to a trained function mapper 2104 to obtain an approximation of the original audio data 2214. According to one embodiment original exemplars are presented, one exemplar frame 1806 at a time, to the inputs of the trained function mapper 2104. The trained function mapper outputs one output frame 2208 at a time. For a given original input exemplar 1806, the values of an output frame 2208 are approximations of the original amplitudes $A_i$ in the original exemplar 1900. Each output frame 2208 is presented to the synthesis process 1700 to produce one frame of audio 2214 that is an approximation of a corresponding portion of the original audio data 1602. Dynamic modifiers 2216 can be applied to modify exemplars independently as is shown FIG. 8, which shows a modified feature envelope store 802 and an independently modified value 806 in a feature envelope.

According to one embodiment the function mapper's outputs represent only a subset of the parameters needed for synthesis, namely the spectral peaks amplitudes $A_i$. In that case the frequencies can be reconstructed using the pitch information from the input exemplars 1806 assuming the frequencies are harmonics of the pitch for instance. Therefore, in that case, the pitch information from the currently processed exemplar 1806 from the feature envelopes store 1802 is fed to the synthesis process 1700 in order to reconstruct the harmonic frequencies for each output frame. Alternatively, as discussed above, the MLP or a second MLP could also be trained on the frequency trajectories.

According to one embodiment the synthesis process includes a pre-processing stage (or synthesis parameters reconstructive stage) where the frequencies are computed from the pitch information assuming harmonic frequencies and the phases are computed from frame to frame assuming linear phases and the phases for the first frame are randomly generated.

As all original feature exemplars 1806 are presented to the trained function mapper 2104, an approximation of the original audio is produced. The synthesis process 1700 can be controlled to run at the same time rate than the analysis as in a standard SMS analysis/synthesis method.

FIG. 23 shows an example of a perceptually appropriate weighting function 2300 used for training. It depends on magnitude to ensure that low magnitudes are given an appropriate weighting regardless of the frequency. Also this weighting function is general as it can be applied to a wide variety of fields and not only to audio.

Figure 24:
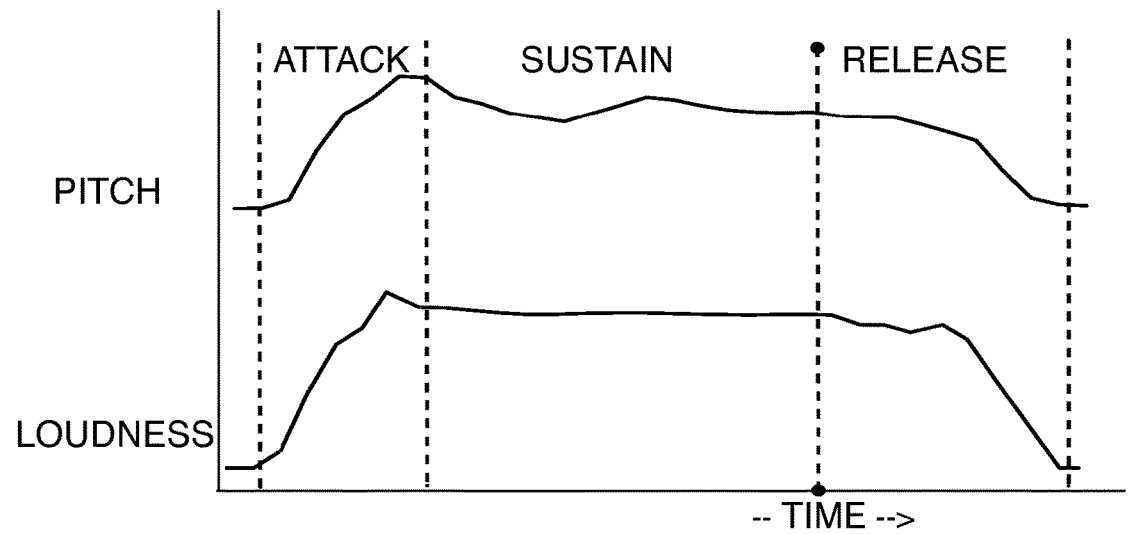
FIG. 24 is an example of a categorized feature envelopes set resulting from a segmentation and categorization process.

FIG. 24 is an example of a categorized audio feature envelopes set resulting from a segmentation and categorization process, where the categories include "Attack," "Sustain," and "Release." The segmentation and categorization process (or annotation process) consists in manually or automatically finding or assigning boundaries to the feature envelopes and or the original dataset so as to identify segments (or regions) and in categorizing segments (or regions) of the envelope feature set and/or of the original dataset. Such segmentation and categorization can be achieved manually using a graphical editor or automatically using some techniques known in the field.

Figure 25:
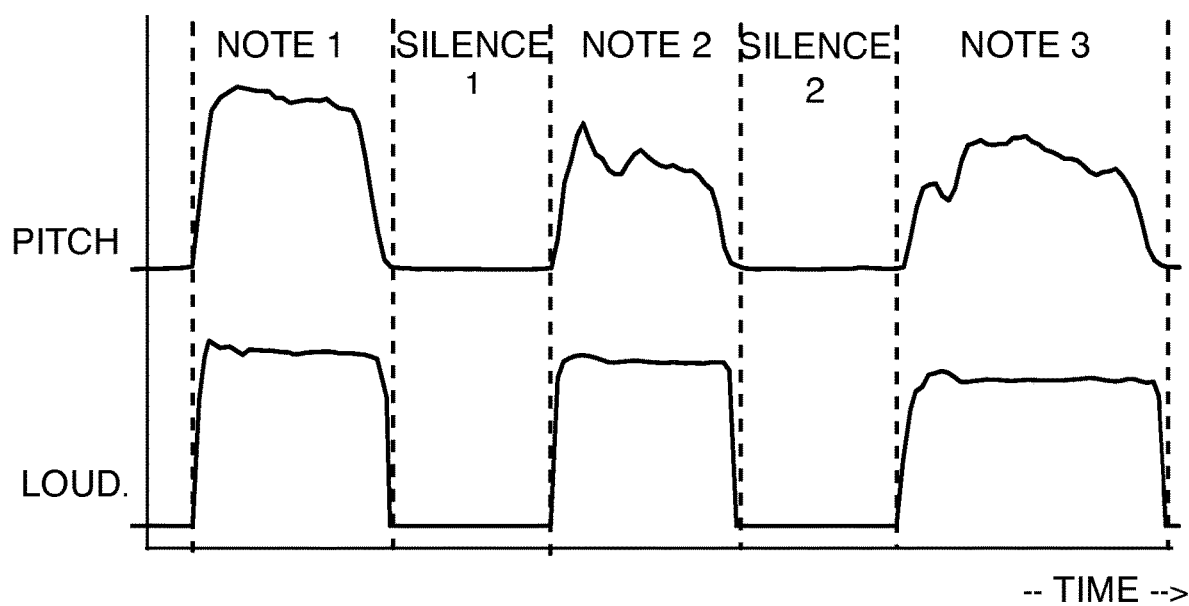
FIG. 25 is an example of a categorized feature envelopes set resulting from a segmentation and categorization process at a higher scale than FIG. 24.

FIG. 25 is an example of a categorized feature envelopes set resulting from a segmentation and categorization process at a higher scale than FIG. 24. In FIG. 25 the categories include "Note" and "Silence" (e.g., "Note 1," "Silence 1", "Note 2," Silence 2," and "Note 3.")

Figure 26:
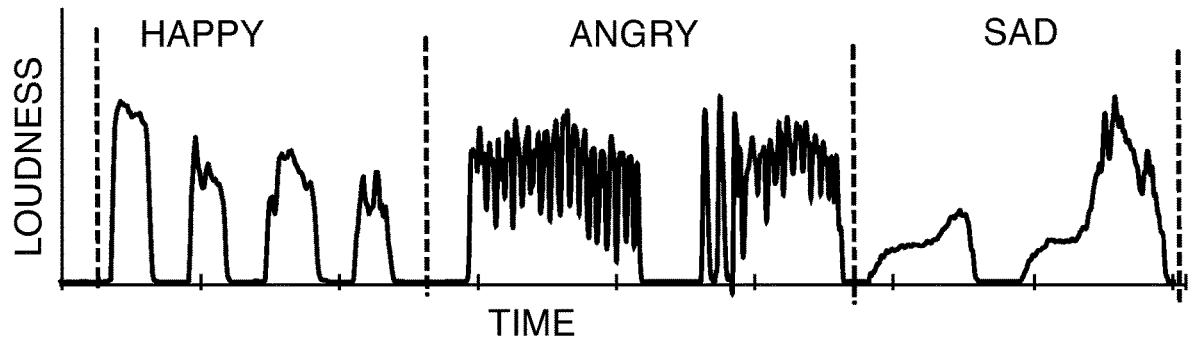
FIG. 26 is an example of a categorized feature envelopes set resulting from a segmentation and categorization process at a higher scale than FIG. 25.

FIG. 26 is an example of categorized feature envelopes set resulting from a segmentation and categorization process at a higher scale than FIG. 25. In FIG. 26 the categories include "Happy," Angry," and "Sad."

Figure 27:
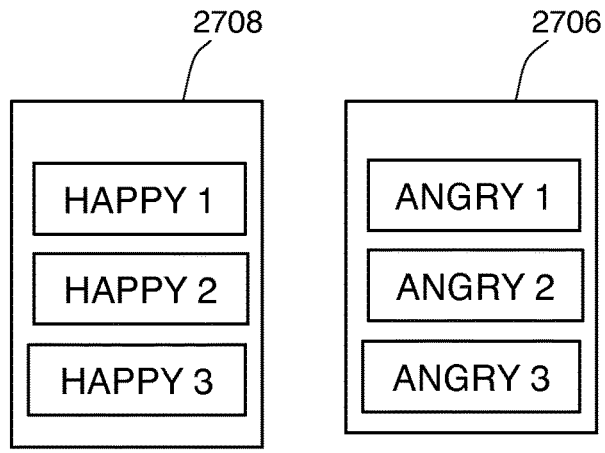
FIG. 27 is an example of collections of categorized feature sets with the same characteristics.

FIG. 27 is an example of showing that collections of categorized feature sets with the same characteristic, that can be used for generating full audio characters. In FIG. 27 a first set 2706 of characteristics relates to "Angry," and the second set 2708 of characteristics relates to "Happy."

Figure 28:
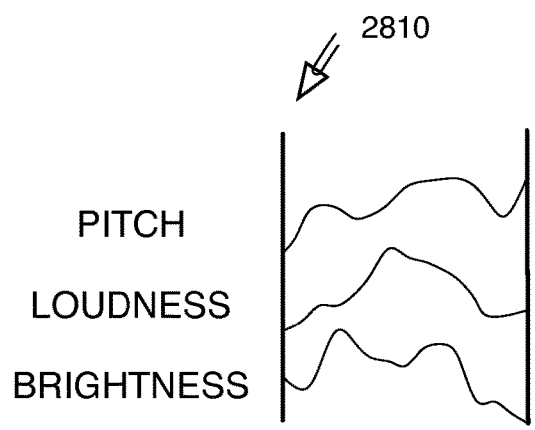
FIG. 28 is an example of a feature envelope segment.

FIG. 28 is an example of a feature envelope segment 2810 including features envelopes for "Pitch," "Loudness," and "Brightness."

Figure 29:
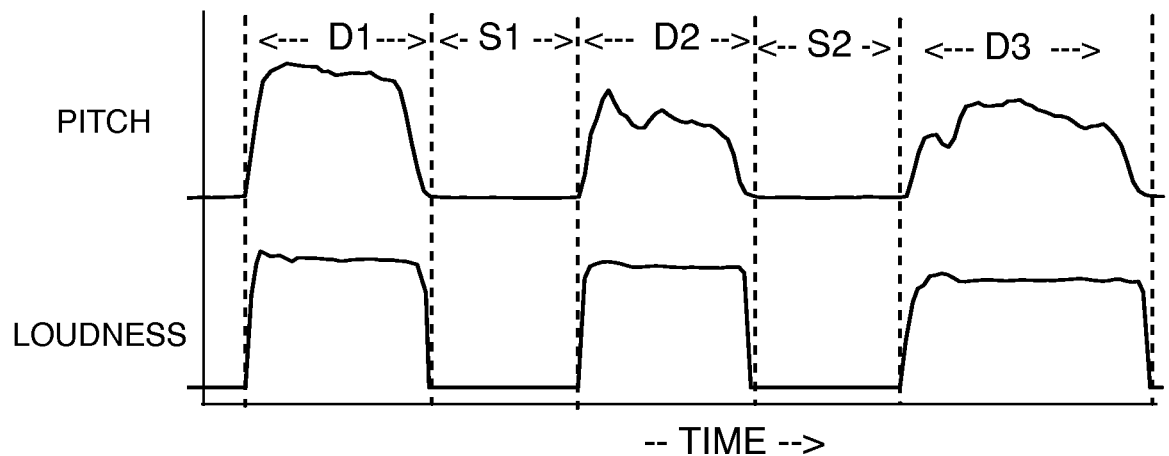
FIG. 29 shows an example of timing information.

FIG. 29 is an example of timing information that can be extracted from the extracted feature set or from the original audio dataset. D1 is the duration of segment #1, 51 is the duration of silence #1, D2 is the duration of segment #2, and so forth. Thus, statistical information about durations can be extracted at analysis time and used at synthesis time. For example, one can extract statistical distributions of durations from a collection (or pool) of categorized feature sets 2708 to generate envelopes that have the same statistical distribution of durations than the collection of categorized feature sets 2708.

Figure 30:
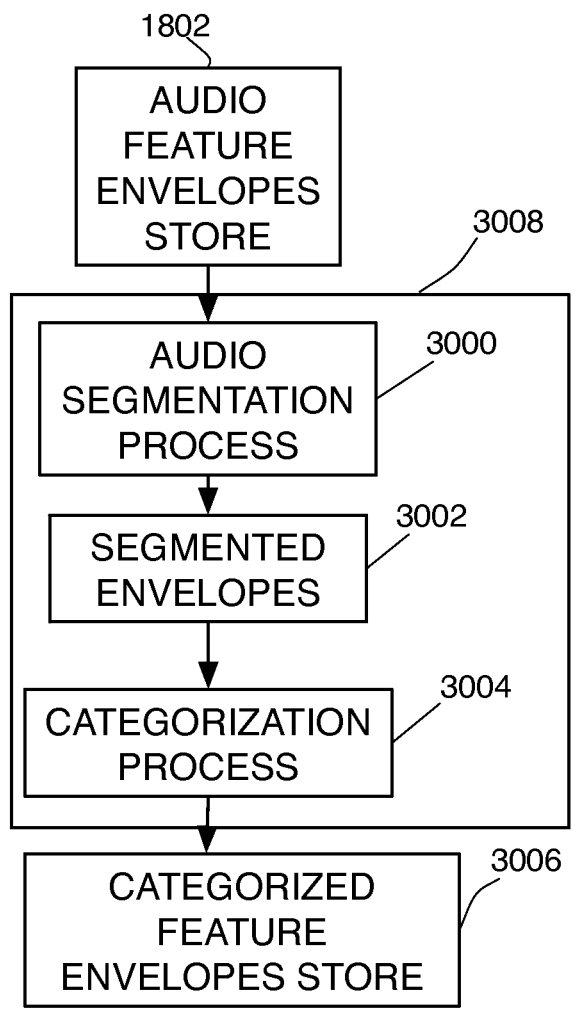
FIG. 30 is a block diagram illustrating a process of segmenting and categorizing feature envelopes.

FIG. 30 is a block diagram illustrating a process 3008 of segmenting and categorizing feature envelopes according to an example embodiment. The audio segmentation process 3000 includes manually or automatically finding or assigning boundaries to the feature envelopes or to the original dataset so as to identify audio segments (or regions) to produce segmented envelopes 3002. Segmentation can be performed at different scales. In the case where the original audio is a musical phrase of one instrument for instance, segmentation can be performed at the note level where one note would correspond to one segment, or a sub-note level where attack, sustain and release for instance would be segments, or at the phrase level where groups of notes would be one segment. Automatic segmentation algorithms are common in the field. Segmentation at many different levels can be performed on the same dataset.

The categorization process 3004 includes automatically or manually assigning categories or labels to different audio regions or audio segments. Categories can be integers or names corresponding to specific characteristic of the segment. The results of the segmentation/categorization process 3008 include timing information such as beginning/ending time of the segment, and one or more labels to assign one or more categories to the segment. This information can be stored together with the corresponding feature envelope in a categorized feature envelopes store 3006.

Figure 31:
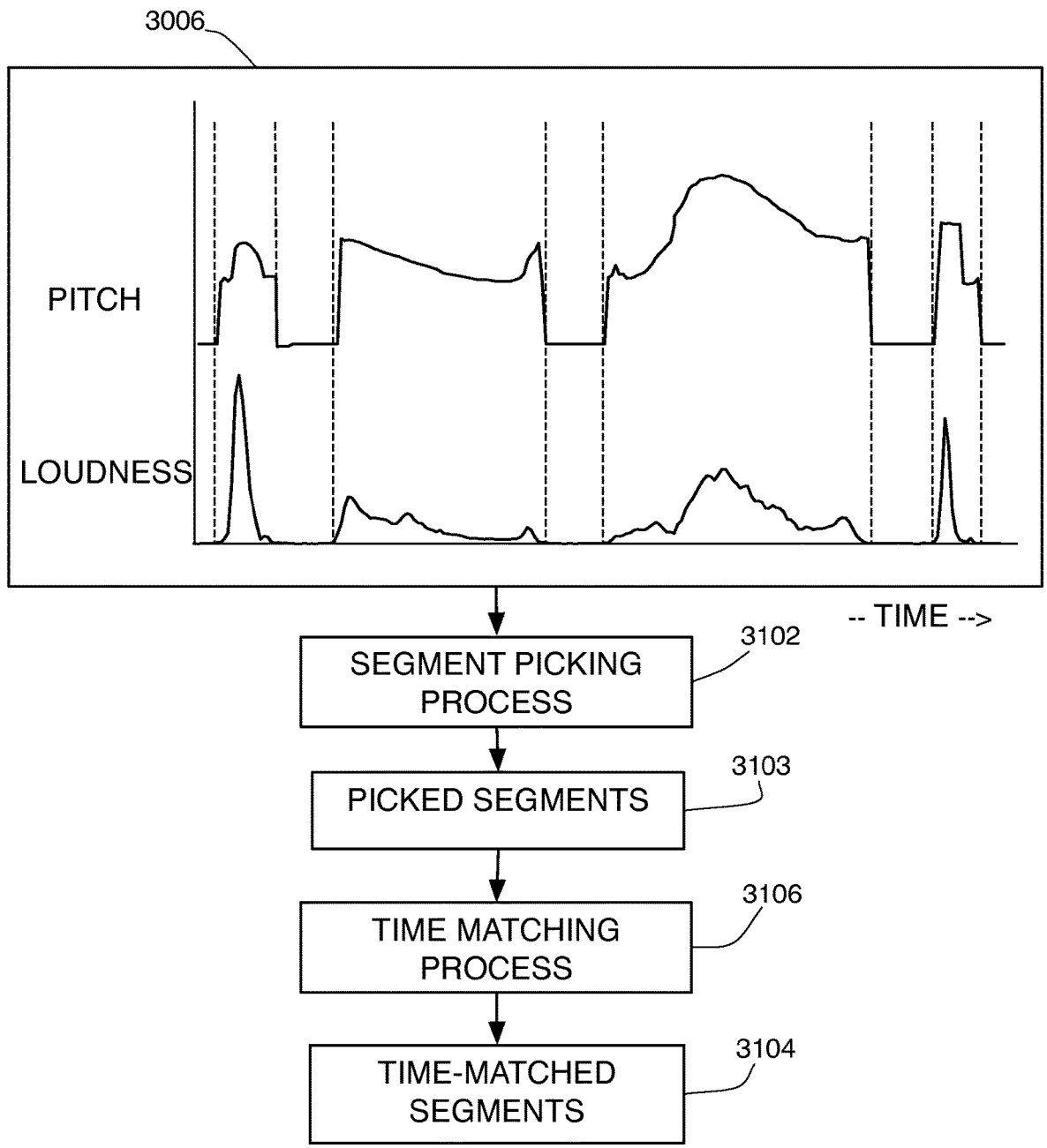
FIG. 31 illustrates a segment picking process and a segment time matching process.

FIG. 31 illustrates a segment picking process 3102 to obtain picked segments 3103 and a segment time matching process 3106 to obtain time-matched segments 3104. The segment picking process 3102 includes picking one or more segment from a dataset including one or more categorized feature envelopes 3006 (FIG. 30). This segment picking process 3102 can be random, manual or can follow certain rules which can be designed at design time, such as: "pick the first segment of one data set and the first segment of a second dataset, then pick the second segment of the first dataset and the second segment of the second dataset etc." As another example a rule could be "pick segments that fit a predetermined statistic distribution."

Figure 32:
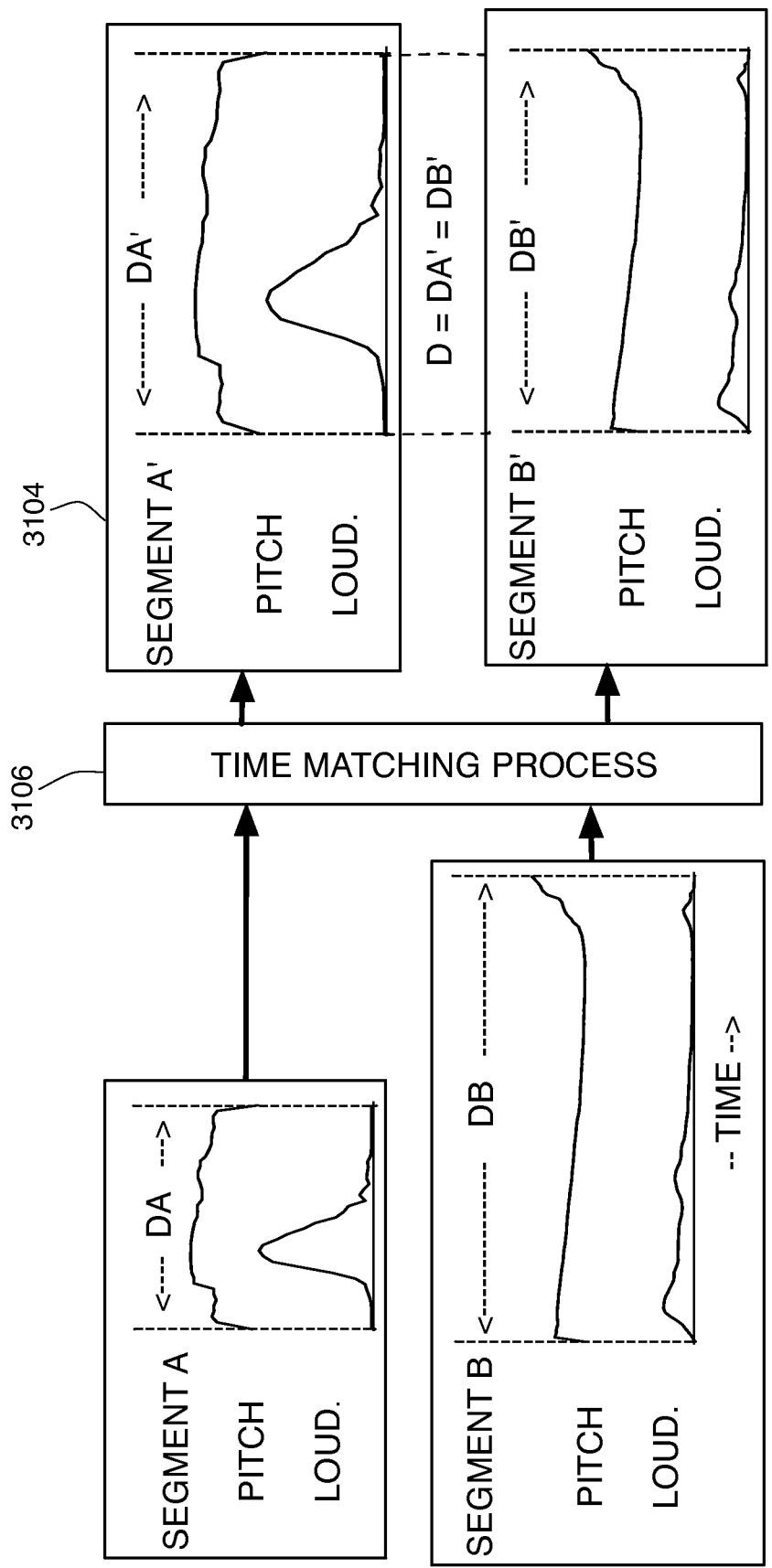
FIG. 32 further illustrates a segment time matching process.

The time-matching process 3106 is described further with reference to FIG. 32. FIG. 32 illustrates a feature envelope segment time matching process 3106 between two segments A and B according to an example embodiment. Segment A has duration DA and segment B has duration DB. A new desired duration D is picked. For example, D can be DA or DB or a linear or non-linear combination of DA and DB or an arbitrary value. The values of feature envelopes of segment A are interpolated to become a new segment A' of duration DA'=D. The values of feature envelopes of segments B are interpolated to become a new segment B' of duration DB'=D.

Figure 33:
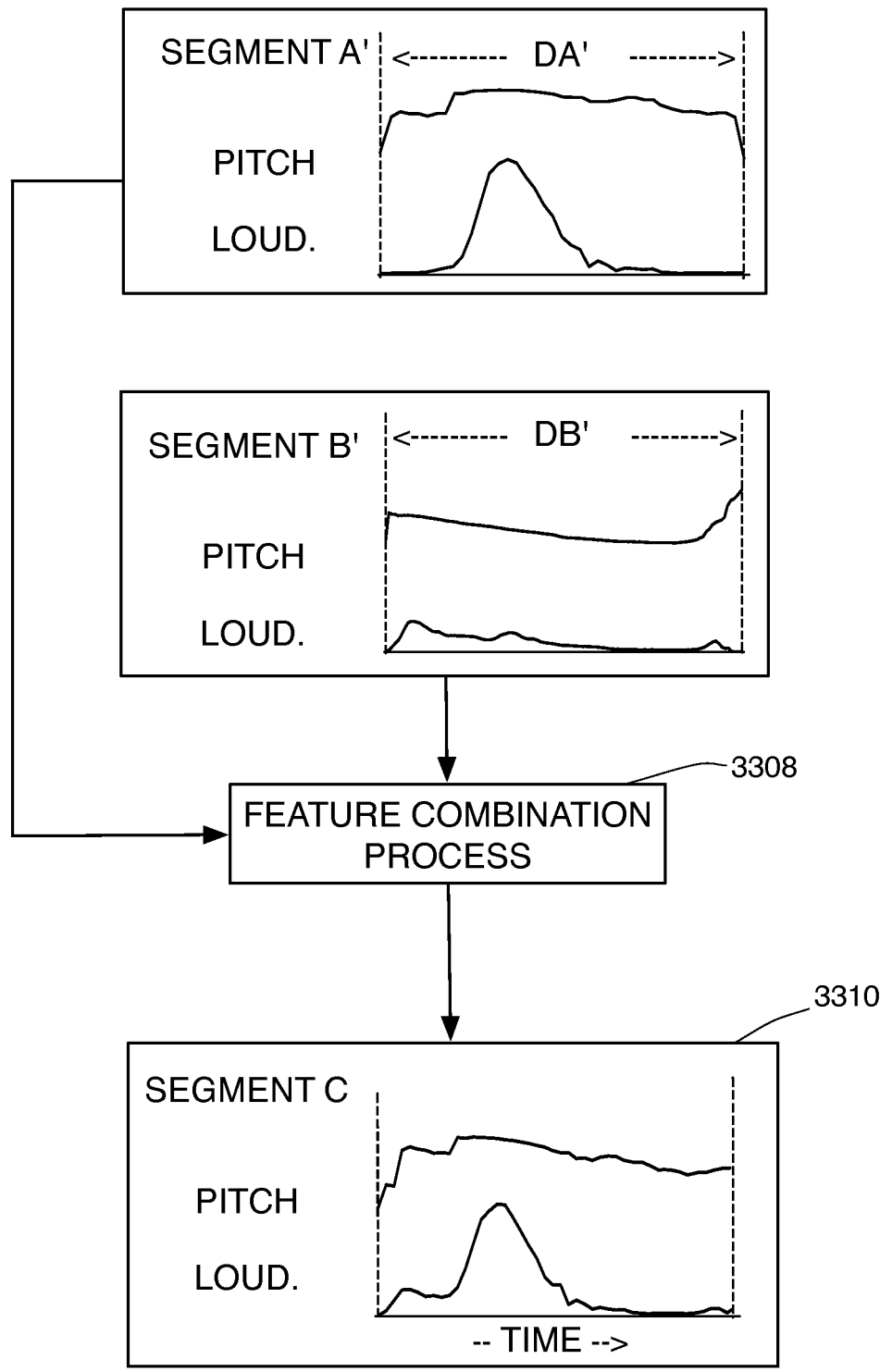
FIG. 33 is an example of a two-segment linear combination process.

FIG. 33 is an example of feature combination process 3308 of two time-matched feature envelope segments A' and B' to obtain a combined feature envelopes segment 3310 according to an example embodiment. In this example the combination process consists in a linearly combining each corresponding feature envelopes from the different segments. Pitch of segment A' is linearly added to pitch of segment B' and loudness of segment A' is linearly added to loudness of segment B'. The feature combination process 3308 can also be for instance non-linear and across different feature (Pitch of A' combined with loudness of B' for instance). Also although only two segments are added in the figure, feature combination process can be applied to more than two segments. In this example, the coefficients (or parameters) of the linear combination can be normalized or constrained to have their sum equals to 1 for instance to ensure that the combined segment's energy is not out of bounds.

One advantage of feature combination processes is that, to some degree, the natural correlations are preserved because a succession of several naturally correlated exemplars is used to modify a succession of several other naturally correlated exemplars. Succession can relate to time, space (e.g., adjacent) or any dimension relevant to the application and object or process modeled. According to one embodiment, many naturally correlated exemplars are modified at a time using many other exemplars which themselves are naturally correlated. Therefore, the modified segment inherits natural correlations from each original segment and thus is more likely to be perceptually natural.

Three more detailed audio embodiments are discussed below. Each embodiment includes two stages: a training stage and a synthesis stage. The combination of two or more segments occurs at the function mapper's input level for the first embodiment, at the function mapper's body level for the second embodiment, and at the function mapper's output level for the third embodiment.

Example Audio Embodiment #1

Figure 34:
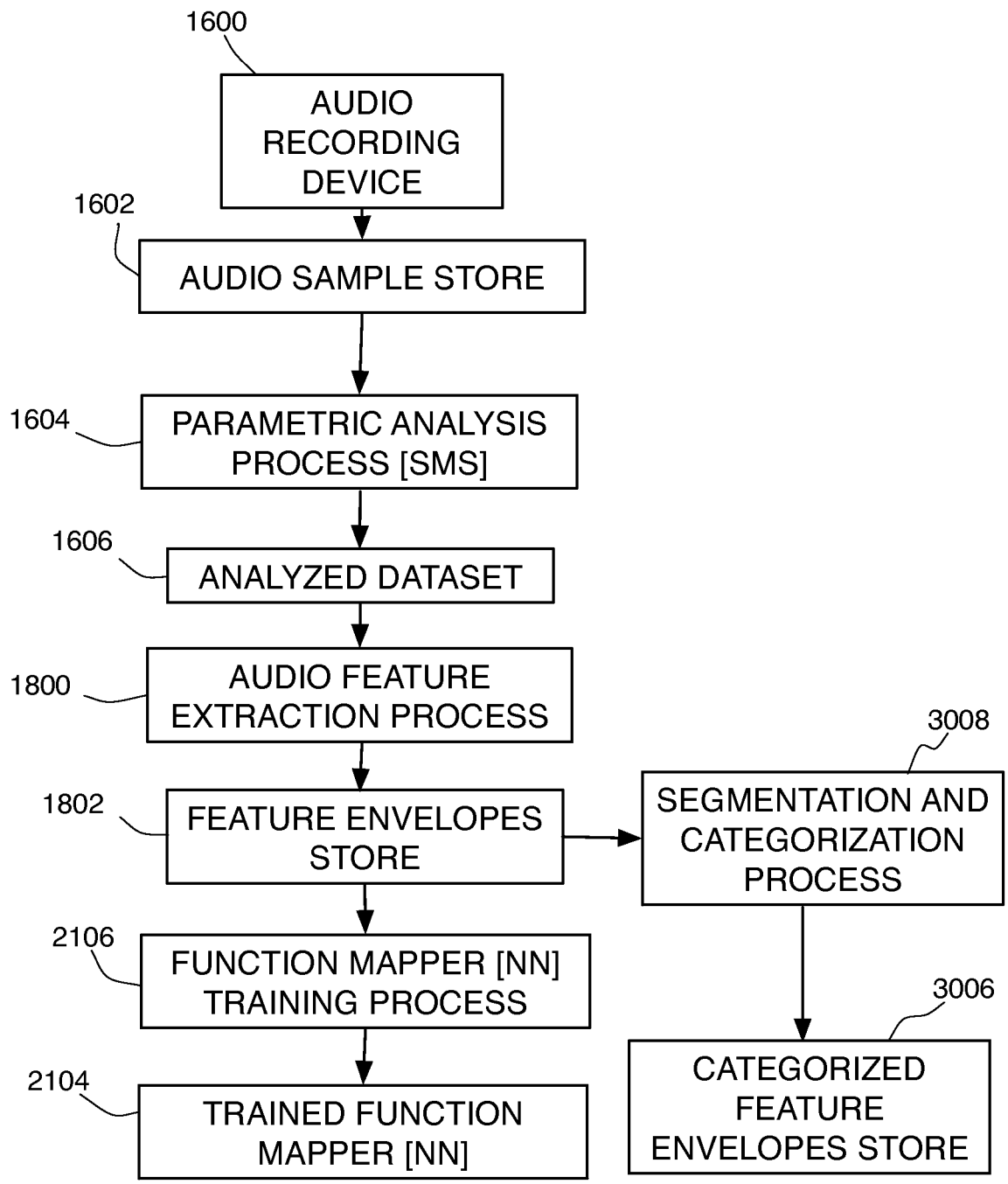
FIG. 34 illustrates the training stage of audio embodiment #1: combination of two or more segments at the FM (Function Mapper) input level.

FIG. 34 illustrates the training stage of audio embodiment #1 including a combination of two or more segments at the function mapper's input level. First, two or more sounds (e.g., two babies crying) are recorded are captured audio data with a capturing or recording device 1600 and joined in a single audio sample store 1602 (e.g., as a Waveform Audio File Format (WAV) file). Next perform parametric SMS analysis 1604 of the WAV file to obtain an analyzed dataset 1606 of all the sounds. Next perform audio feature extraction 1800 on all sounds to extract pitch and loudness envelopes for instance. Next perform segmentation and categorization process 3008 on all envelope feature sets to obtain categorized (or labeled, or annotated) feature envelopes store 3006. Categorization here can consist in assigning one value for silence regions, and a different value for non-silent regions. Automatic silence detection algorithms are common in the field and can be used here.

Next train a Neural Network MLP 2102 (FIG. 21) on all datasets, to map extracted feature exemplars 1806 (FIG. 18) to corresponding analyzed dataset exemplars 1900 according to training process 2106 (FIG. 21) where the outputs exemplars are spectral peaks amplitudes of spectral peaks 1900 (FIG. 19). Other embodiments can include peaks frequencies or breakpoint values of noise spectral envelopes 2002 (FIG. 20). The training process typically uses a magnitude dependent weighting or normalizing function 2300 (FIG. 23) to give equivalent weights (e.g., weights of same order of magnitude) to each value of the analyzed dataset exemplars.

A trained MLP neural network (function mapper) 2104 (FIG. 24) is then obtained together with a categorized feature envelopes 3006 (FIG. 30) store.

Figure 35:
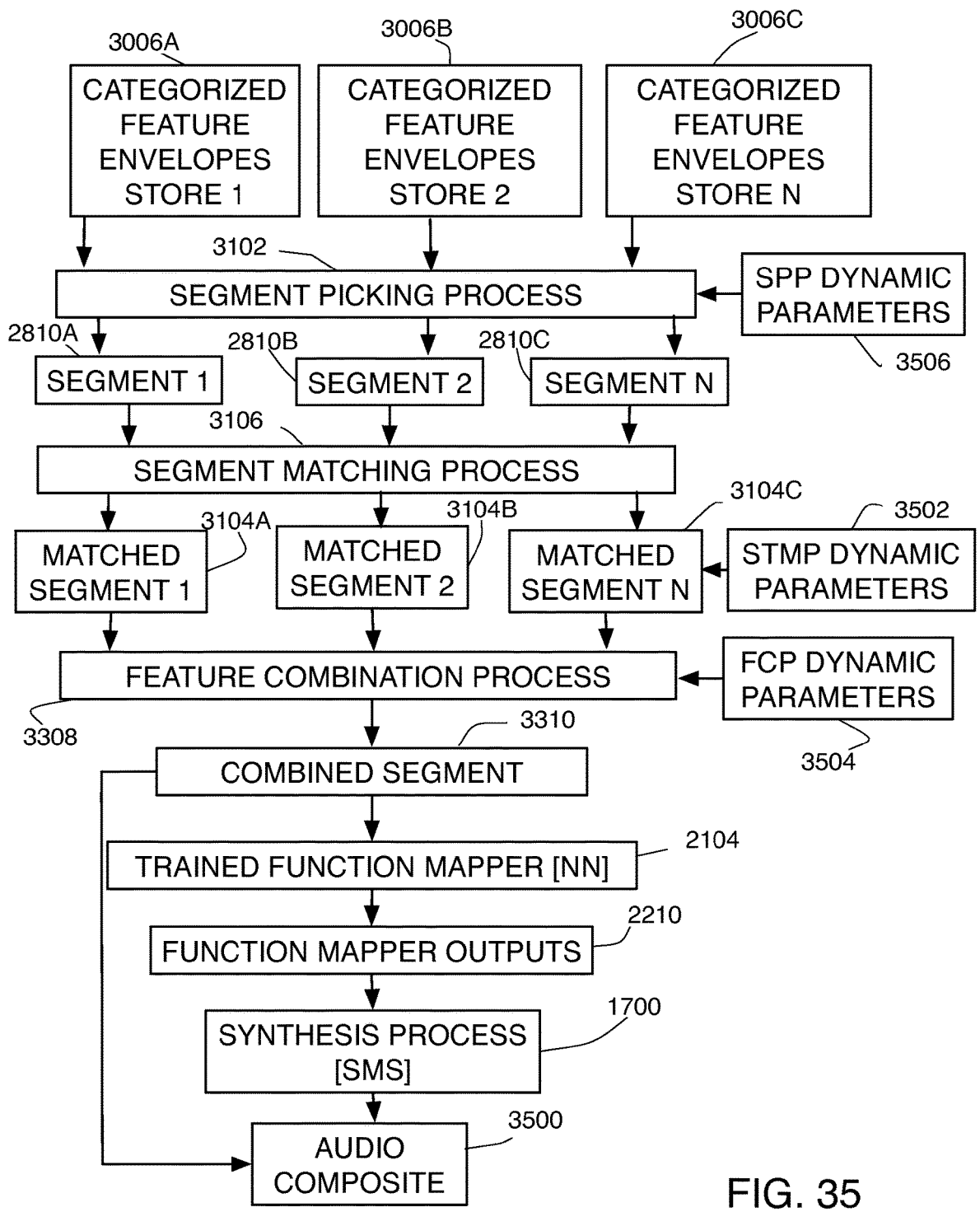
FIG. 35 illustrates the synthesis stage of audio embodiment #1: combination of two or more segments at the FM input level.

FIG. 35 illustrates the synthesis stage of audio embodiment #1, similarly as in FIG. 12, for a combination of two or more segments at the function mapper's input level. First, perform segment picking 3102 (FIG. 31) to pick two or more segments from feature envelopes stores 3006A, 3006B, 3006C (e.g., as in 3006 of FIG. 30). Segment picking 3102 may be controlled using segment picking parameters (SPP) 3506. Next, perform segment time-matching process 3106 (FIG. 31) to obtain time-matched segments 3104A, 3104B, 3104C. Segment matching may be controlled using segment time matching parameters (STMP). Next, apply a feature combination process 3308 (FIG. 33) to the time-matched segments 3104A, 3104B, 3104C to obtain a combined feature envelopes segment 3310. Feature combination process 3308 may be controlled using feature combination parameters (FCP) 3504. Next feed the combined feature envelope segment 3310 to the trained function mapper 2104 (FIG. 21). Next feed the function mapper's outputs 2210 (FIG. 22) to synthesis process SMS 1700 (FIG. 17).

According to one embodiment the synthesis process 1700 includes a pre-processing stage where the frequencies are computed from the pitch information assuming harmonic frequencies and where the phases are computed from frame to frame assuming linear phases as common in the field. Phases for the first frame can be randomly generated. Next, feed the combined feature envelopes segment 3310 pitch information to synthesis process 1700 to compute frequencies. Finally, obtain a perceptually natural audio composite of two or more segments 3500. For instance, in the case where the original segments are two or more different segments from different baby-crying sounds segments, the composite could sound like a new baby-crying sound that inherits some perceptual properties from the two or more original segments. Note that in audio embodiment #3 segments are also combined at the input level of the function mapper (e.g., as in audio embodiment #1) as well as at its output level.

Example Audio Embodiment #2

Figure 36:
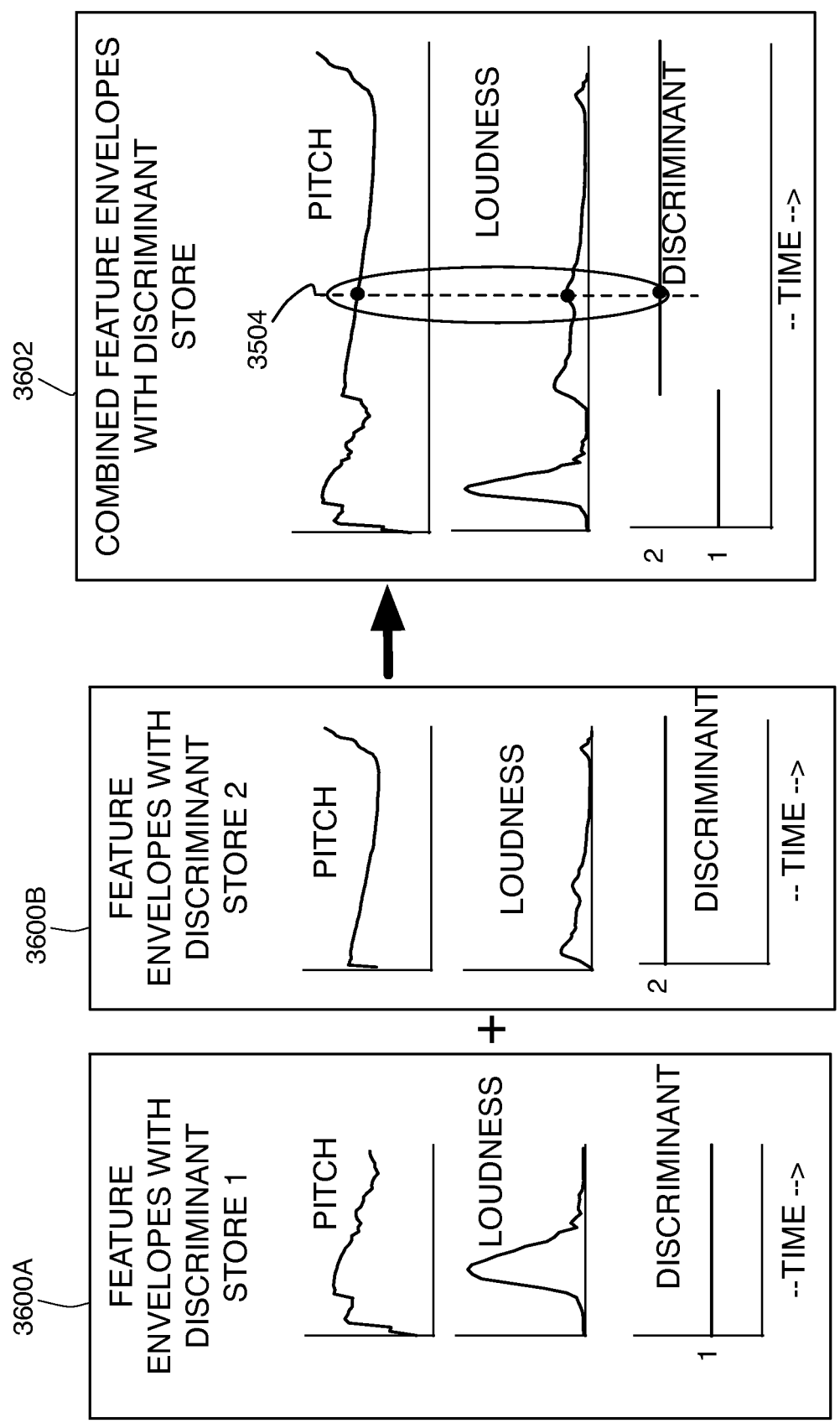
FIG. 36 illustrates a combination of envelope features in the same training set.

FIG. 36 illustrates the training stage of audio embodiment #2 including a combination of two or more segments at the function mapper's body level. In FIG. 36 feature envelopes from two different audio segments 3600A, 3600B are combined (or joined) using a discriminant input to provide combined feature envelopes with one or more discriminants 3602. Discriminants can be manually assigned using a graphical editor for instance. Alternatively, some features can be used as natural discriminant. For example, formants 1 and 2 can serve to perceptually discriminate between two vowels. Therefore formant envelopes extracted automatically according to techniques known in the field can also be used as discriminants. In the example illustrated in FIG. 36, the discriminant value is used as an "inverse classifier" value to generate data patterns.

Figure 37:
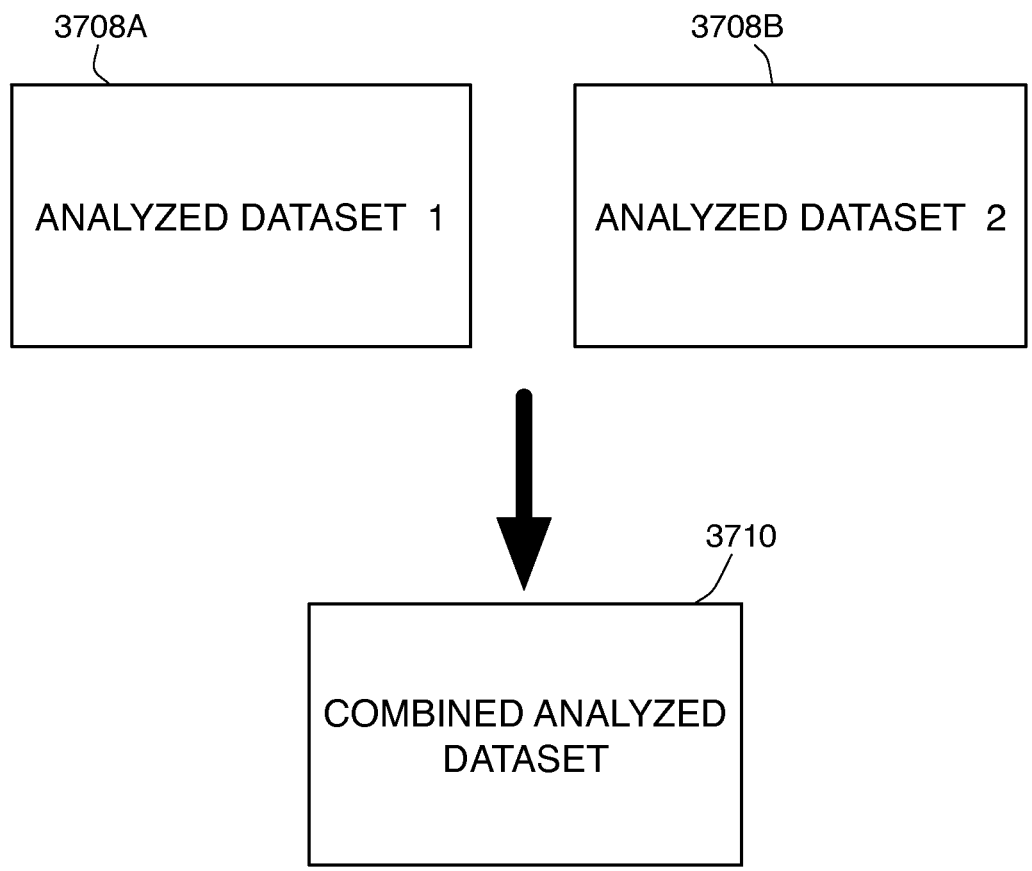
FIG. 37 illustrates a combination of analyzed datasets in the same training set.

FIG. 37 illustrates a combination of analyzed datasets in the same training set. According to one embodiment, the analyzed dataset exemplars 3708A, 3708B are combined successively in time so that each analyzed dataset exemplar matches the corresponding feature envelopes exemplar in time in a combined analyzed data set 3710.

Figure 38:
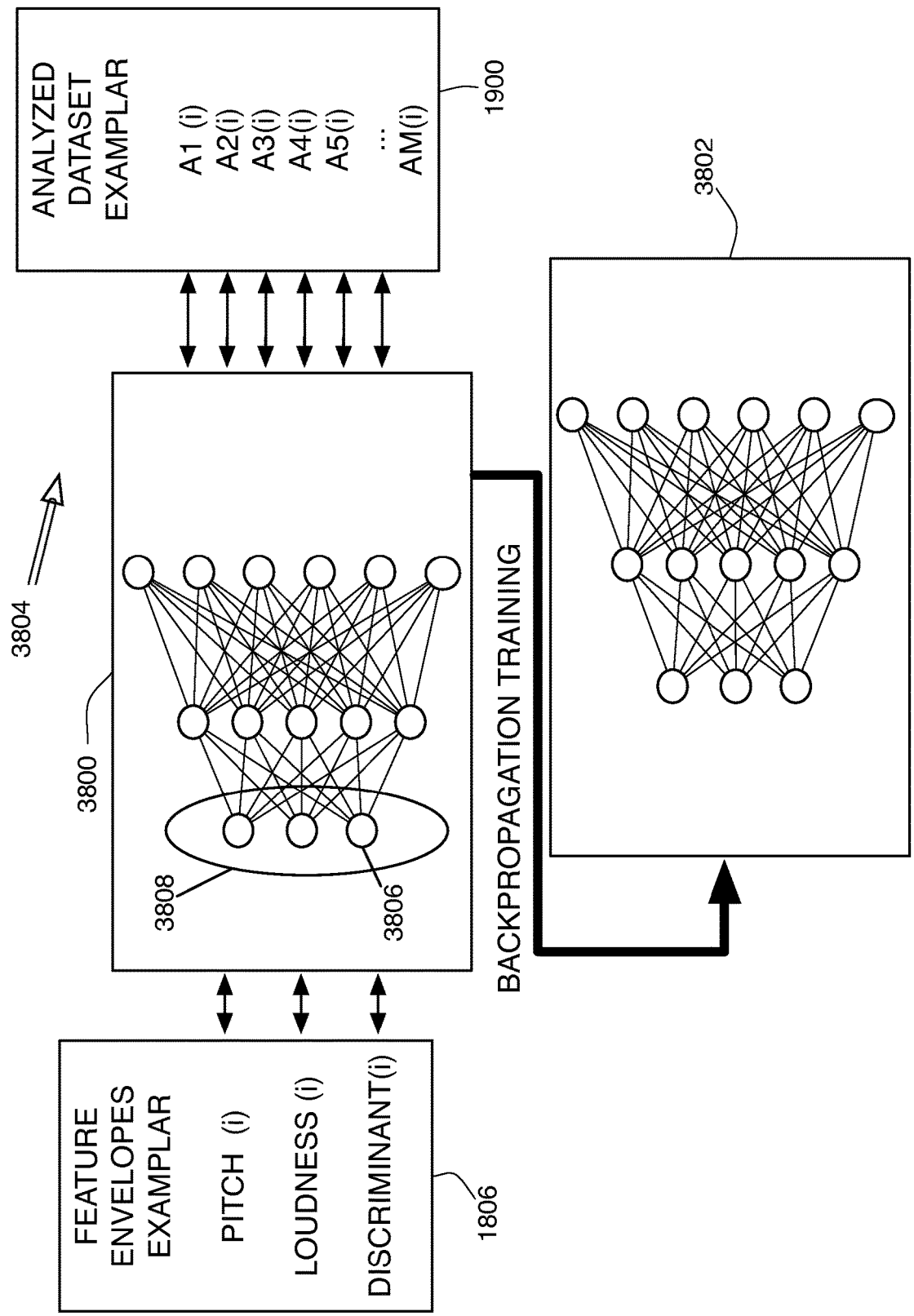
FIG. 38 is an illustration of a function mapper with discriminant inputs, and its training process.

FIG. 38 is an illustration of a function mapper 3800 with inputs 3808 including one discriminant input 3806. During the backpropagation training with discriminant input process 3804, the two segments are presented to the neural network 3800 for learning. The inputs 3808 of the neural network are presented with feature envelope exemplars 1806, and the outputs are presented with analysed dataset exemplars 1900. During training, the discriminant input informs the function mapper of what type (or category) of segment it is currently learning. This process is an example of combination of two or more segments at the function mapper's body level. The neural network actually learns properties from both segments and the resulting trained MLP with discriminant input 3802 is able to discriminate and interpolate between them at synthesis time.

Figure 39:
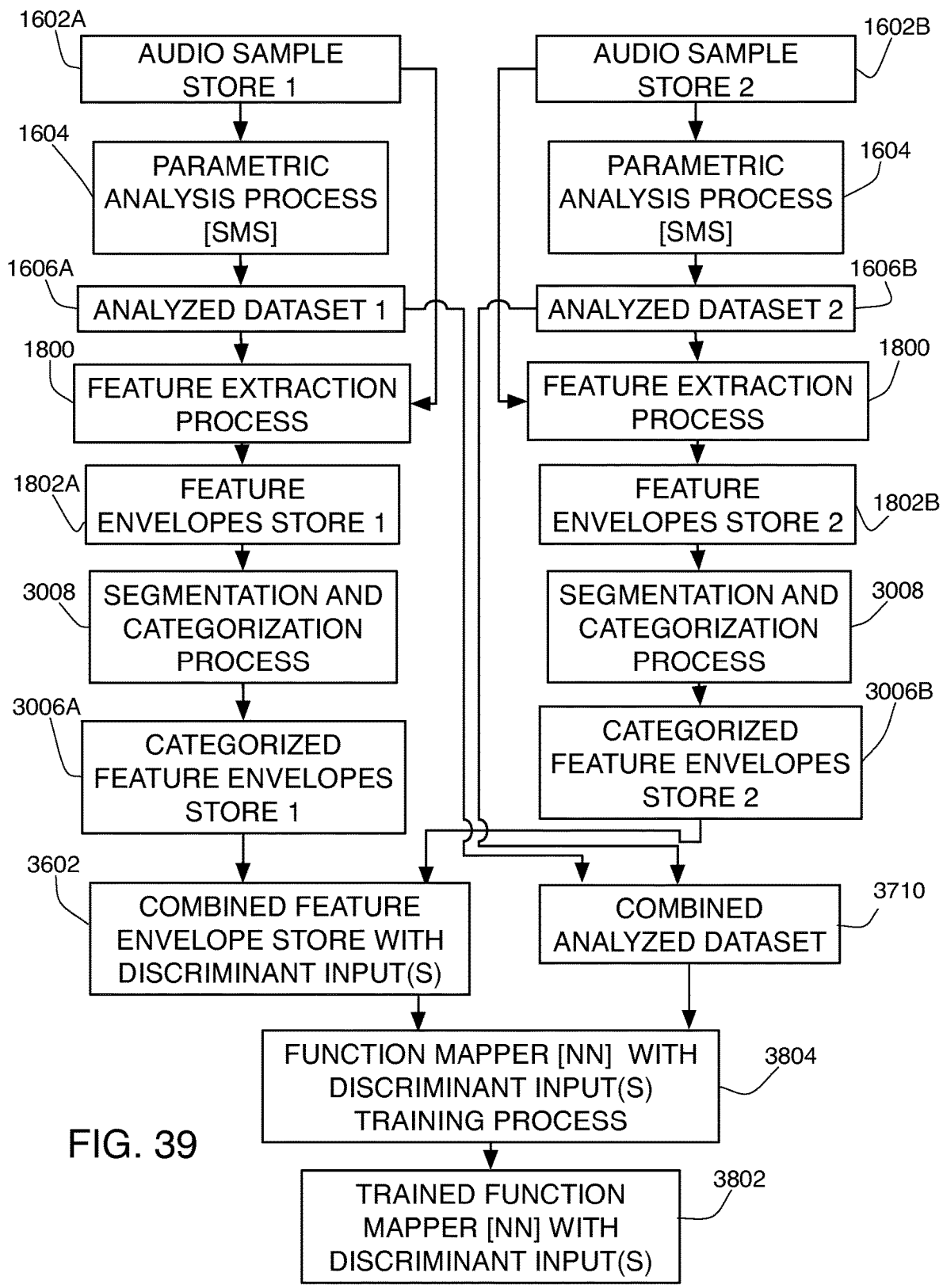
FIG. 39 illustrates the training stage of audio embodiment #2: combination of two or more segments at the FM's body level using discriminant inputs.

FIG. 39 illustrates the training stage of audio embodiment #2: for a combination of two or more segments at the function mapper's body level. First, record two or more sounds (e.g., audio sample stores 1602A, 1602B). For example, these sounds may include a melody of a voice singing the vowel "O" and a melody of a voice singing the vowel "A". Then perform audio SMS parametric analysis 1604 (FIG. 16) to obtain two or more analyzed datasets 1606A, 1606B. Then perform audio feature extraction 1800 (FIG. 18) on all sounds to extract pitch and loudness envelopes for example to obtain two or more feature envelopes stores 1802A, 1802B. Then perform segmentation and categorization process 3008 on all envelope feature sets to obtain two or more feature envelopes with discriminant inputs 3006A, 3006B. Categorization here can be done by manually assigning two or more constant values. For instance the value "1" for the "A" melody for store 1 and the value "2" for the "O" melody. Then add a discriminant envelope corresponding to these discriminant values to obtain a combined feature envelope store with discriminant input 3602 (FIG. 36).

Then train a function mapper with a discriminant input such as an MLP neural network 3800 (FIG. 38) according to backpropagation training process 3804 (FIG. 38) where the outputs exemplars are spectral peaks amplitudes. The categories "1" and "2" can be used as discriminant input envelopes for performing a training process 3804 on the function mapper to map between combined feature envelope store 3602 and combined analyzed dataset 3710 (FIG. 37) as to obtain a trained function mapper 3802 (FIG. 38) with discriminant input.

Figure 40:
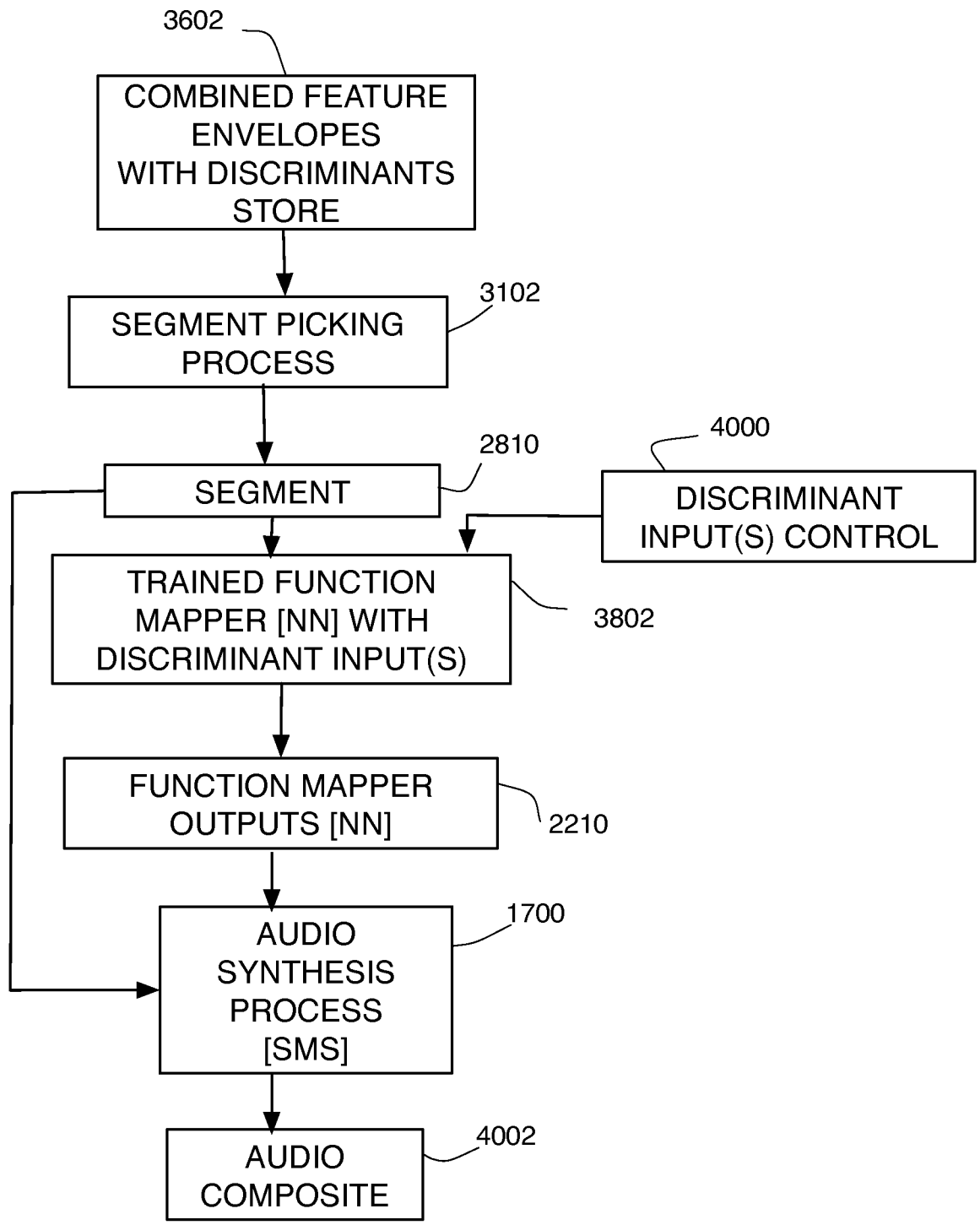
FIG. 40 illustrates the synthesis stage of audio embodiment #2: combination of two or more segments at the FM's body level using discriminant inputs.

FIG. 40 illustrates the synthesis stage of embodiment #2 including a combination of two or more segments at the function mapper's body level. With reference to the training stage discussed above with reference to FIG. 38, the trained function mapper 3802 with inputs including one or more discriminants is assumed to have learned both sounds segments (i.e., the melody in "A" and the melody in "O"). The trained function mapper 3802 is now able to interpolate between "O" and "A." Next, apply a segment picking process 3102 (FIG. 31) to determine (or pick) one of the segments in the combined feature envelope store 3602. For instance pick a segment 2810 (FIG. 28) where the voice is singing the melody with the vowel "A."

Next in FIG. 40 feed the extracted feature envelope from the segment singing the vowel "A" to the trained function mapper 3802 (FIG. 38) with one or more discriminant inputs. Then smoothly changing the discriminant input value from 1 to 2 will then alter the function mapper outputs 2210 (FIG. 22) to smoothly change parameters corresponding to singing "O" instead of "A" while preserving the other characteristics of the sound. Changing the discriminant input's value continuously between 1 and 2 and back to 1 will alter the melody in "A" to be sung in "O" and back to "A" progressively as the melody is playing. Using the same method one can create composites from the voice of one singer to another singer by using a discriminant that categorizes voice 1 and voice 2 where singer 1 and 2 are not the same for instance.

Next in FIG. 40 feed the function mapper's outputs 2210 to synthesis process SMS 1700 (FIG. 17). Next feed segment 2810's pitch information to synthesis process 1700 to compute frequencies. Finally in FIG. 40 obtain the audio composite (or hybrid) 4002.

Example Audio Embodiment #3

Figure 41:
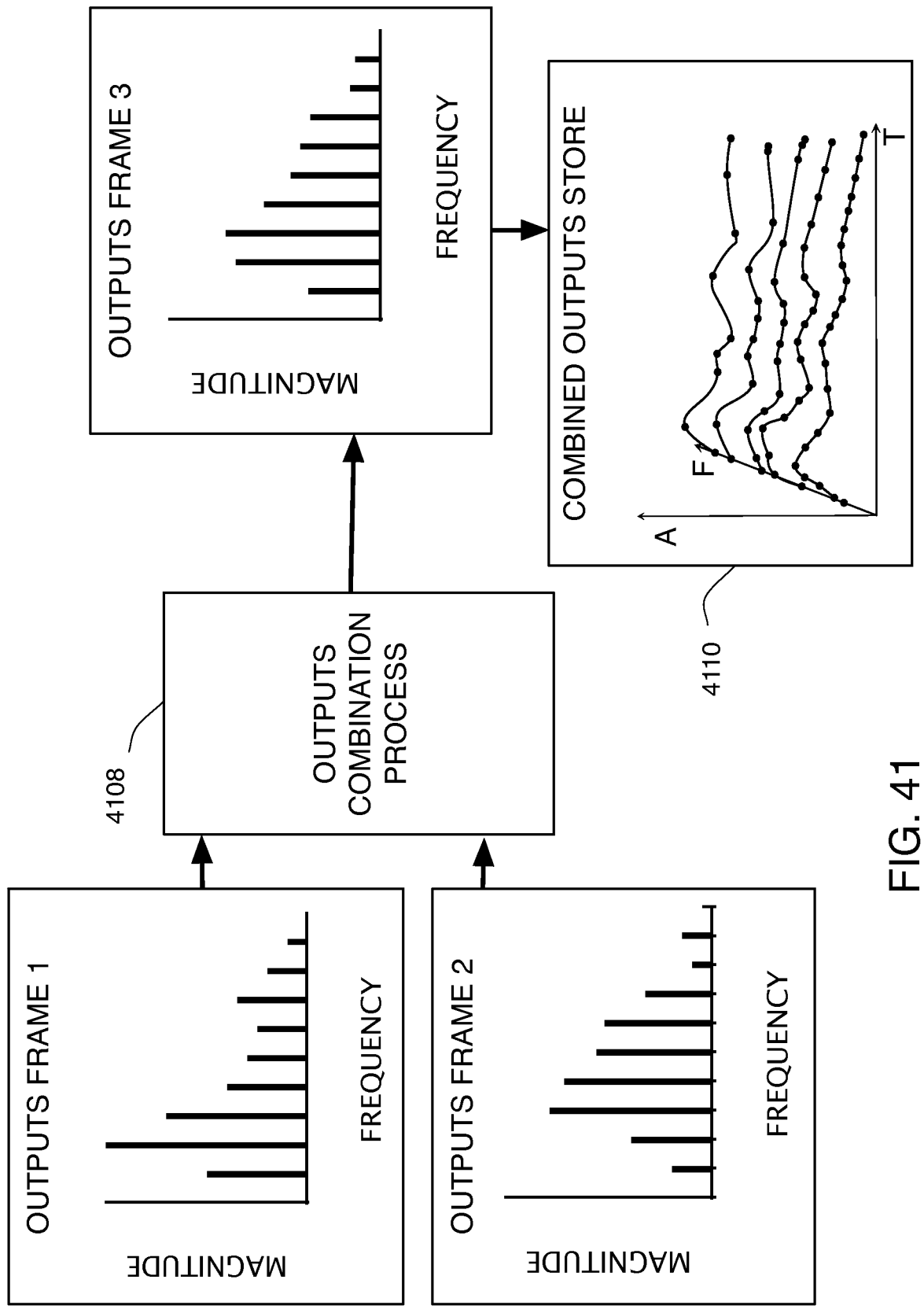
FIG. 41 shows an example of function mapper output frame combination process.

FIG. 41 is an illustration of an outputs combination process 4108 combining two outputs frames (spectral peaks frames) linearly. If w1 and w2 are the weighting coefficients of the linear combination, w1 can be set to 0.5 and w2 can be set to 0.5 for instance. Other types of output combinations could, for example, include combining two spectral peak frames using the formants of one frame to reshape the first frame (cross-synthesis). Combination processes can occur on subparts of output frames. For example, combinations can be performed on only half of the peaks or on a selection of peaks. Combined output frames can be stored in a combine outputs store 4110.

Figure 42:
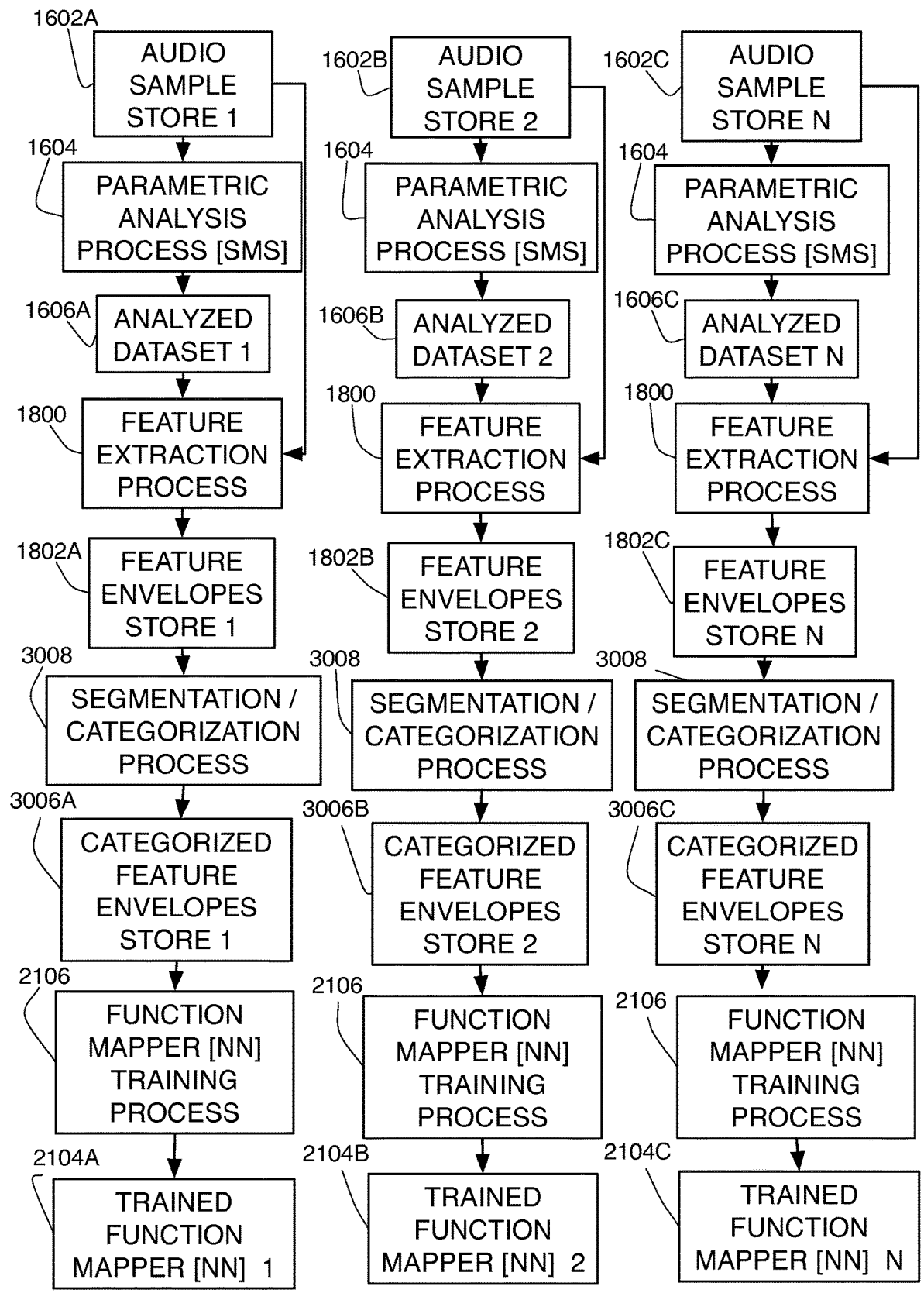
FIG. 42 illustrates the training stage of embodiment #3: combination of two or more segments at the FM's outputs level.

FIG. 42 illustrates the training stage of audio embodiment #3 including the combination of two or more segments at the function mapper's output level. First, record two or more sounds 1602A, 1602B, 1602C (e.g., a cow mooing, a saxophone phrase). Next perform parametric analysis 1604 (FIG. 16) to obtain two or more analyzed datasets 1606A, 1606B, 1606C. Next perform feature extraction 1800 (FIG. 18) on all sounds to extract pitch and loudness envelopes for instance and obtain feature envelope stores 1802A, 1802B, 1802C. Next perform segmentation/categorization process 3008 (FIG. 30) on each envelope feature sets to obtain two or more categorized feature envelopes (or envelopes with regions) stores 3006A, 3006B, 3006C. Categorization (or discrimination) here can consist in manually or automatically assigning one value for silence region, and a different value for non-silent region. For simplicity we will assume here that each feature envelope store has only one non-silent segment. Automatic silence detection common in the field can be used here.

Next in FIG. 42 perform a function mapper training process 2106 (FIG. 21) for each dataset. A different Neural Network MLP function mapper 2102 is assigned to each different categorized feature envelopes store 3006A, 3006B, 3006C, to map each extracted feature exemplar 1806 to each corresponding analyzed dataset exemplar 1900 according to the training process 2106 where the outputs exemplars are spectral peaks amplitudes and obtain a trained function mapper neural network 2104A, 2104B, 2104C for each dataset. The training process may use a magnitude-dependent weighting or normalizing function 2300 to give equivalent weights to each value of the analyzed dataset exemplars. The process of assigning different datasets to different Neural Networks can be referred to as a discrimination process.

Figure 43:
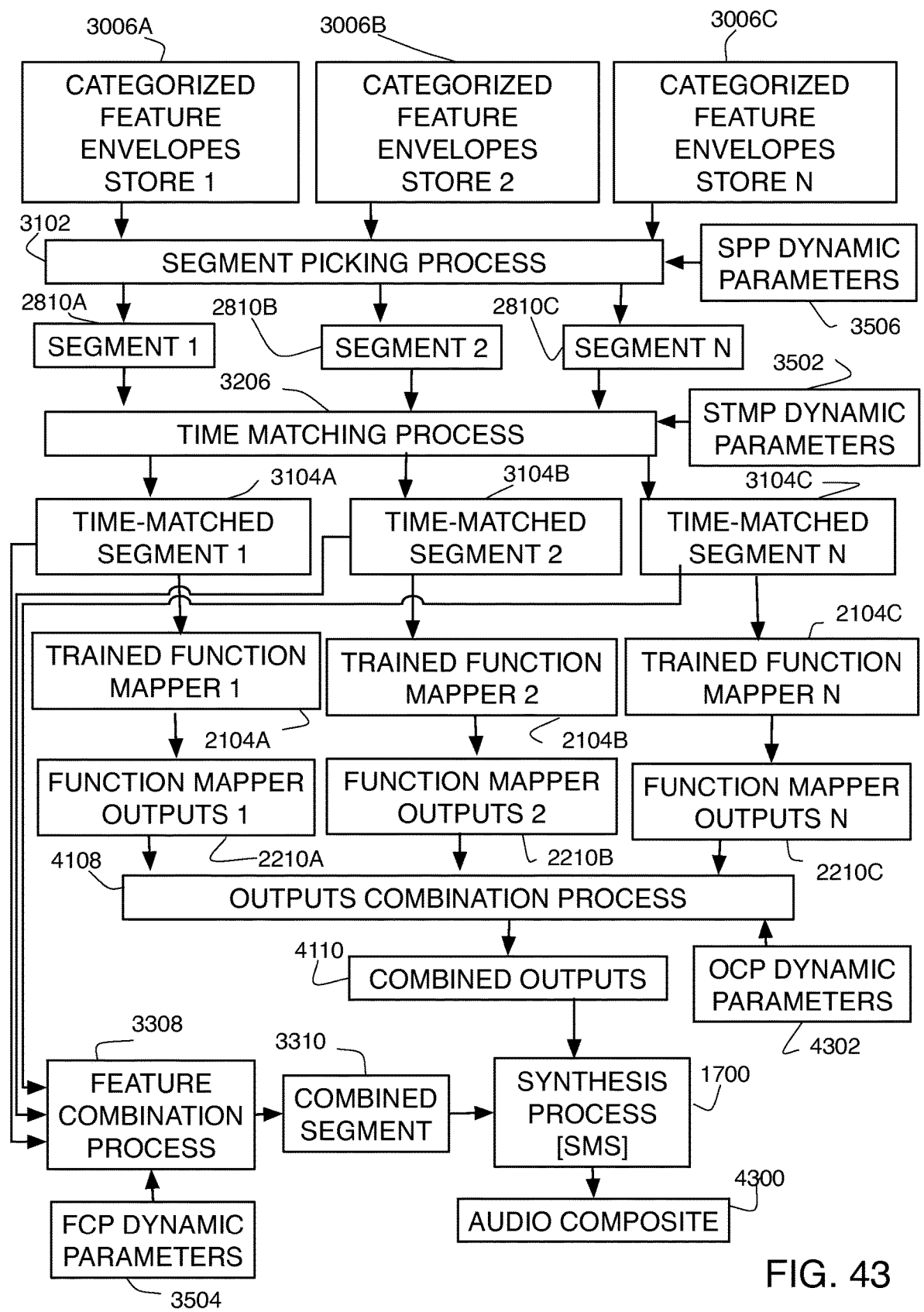
FIG. 43 illustrates the synthesis stage of embodiment #3: combination of two or more segments at the FM's outputs level.

FIG. 43 illustrates the synthesis stage of embodiment #3, similarly as in FIG. 15, including a combination of two or more segments at the function mapper's output level. First, perform a segment picking process 3102 (FIG. 31) to determine (or pick) a segment in each feature envelope store. Segment picking process 3102 may be controlled using Segment Picking Parameters (SPP) 3506. Next perform a time matching process 3106 to all picked segments. Time matching process 3106 may be controlled using Segment Time Matching Parameters (STMP) 3204. Next feed time matched feature envelopes segments 3104A, 3104B, 3104C to trained function mappers 2104A, 2104B, 2104C in parallel. Next perform output combination process 4108 (FIG. 41), where this process may be controlled using outputs combination process parameters (OCP) 4302. Next feed combined outputs 4110 to synthesis process 1700 (FIG. 17). Next get pitch envelopes from each feature envelope store and perform feature combination process 3308 (FIG. 33), where this process may be controlled using feature combination process parameters (FCP) 3504. Next feed the combined feature envelopes segments 3310 pitch information to synthesis process 1700 (FIG. 17) to compute frequencies as harmonics of the combined pitch. Random phases are generated for the first frame and subsequent phases can be computed from frame to frame as is common in the field (for example, assuming linear phases). Spectral peaks amplitudes are given from the outputs of the MLP with a proper de-normalization. It should be noted that the feature combination process (FCP) dynamic parameters 3504 can match the outputs combination process (OCP) dynamic parameters 4302.

Finally in FIG. 43 obtain an audio composite 4300. For instance in the case where the original segments are a segment from a cow mooing and a segment a saxophone phrase, the composite could sound like "cow that has swallowed a saxophone." Note that in audio embodiment #3 segments are also combined at input levels (e.g., as in audio embodiment #1).

The audio embodiments presented above enable feeding the segments into the trained function mappers one exemplar at a time while still taking the full segments information such as duration, into account. Furthermore, each process in the chain (i.e., the MLP neural network, the SMS synthesizer etc) can be implemented to work in real-time. Therefore every time a feature envelope exemplar is presented at the input of the chain at synthesis stage, one frame of audio is output at the output. As a result, full segments do not have to be processed before audio is output. The feature combination process 3308 (FIG. 33) and output combination process 4108 can be performed one exemplar at a time and the combination parameters can be computed or changed in real-time. Since a typical SMS frame rate is of the order of 10-30 ms these changes can happen every 10-30 ms and therefore the changes in the sound can occur in real-time or quasi real-time, making the audio-composite dynamic (e.g., changeable in real-time).

The above-described systems each have a relatively low computational footprint, can run in real time, and can be dynamically modified from one exemplar to the next. For example the feature combination parameters 3504 the segment picking parameters (SPP) 3506, the outputs combination process (OCP) parameters 4302, and the segment time matching parameters (STMP) 3502 in FIG. 35 can be dynamically changed. Discriminant input control parameters 4000 in audio embodiment #2 can be dynamically changed as well.

In the audio embodiments presented above, the function mappers have been trained on the magnitudes of spectral peaks only for simplicity but other additional embodiments may train the function mappers on other general parametric representations or on other parts of parametric representations. For example, other embodiments may train the function mappers on the spectral peaks frequency trajectories and/or on the non-deterministic part of the sound as well in order to model sounds that are not purely harmonic such as wind-like sounds. It should be noted that other parametric analysis technique than SMS, and other spectral representations other than short time Fourier transforms can be chosen instead. For example, percussive sounds can be modeled using decaying exponential functions for instance. It should be noted that data from other applications fields such as body motion or image texture can be modeled as well to produce composites movements or composite textures.

Example Body Motion Embodiment

Figure 45:
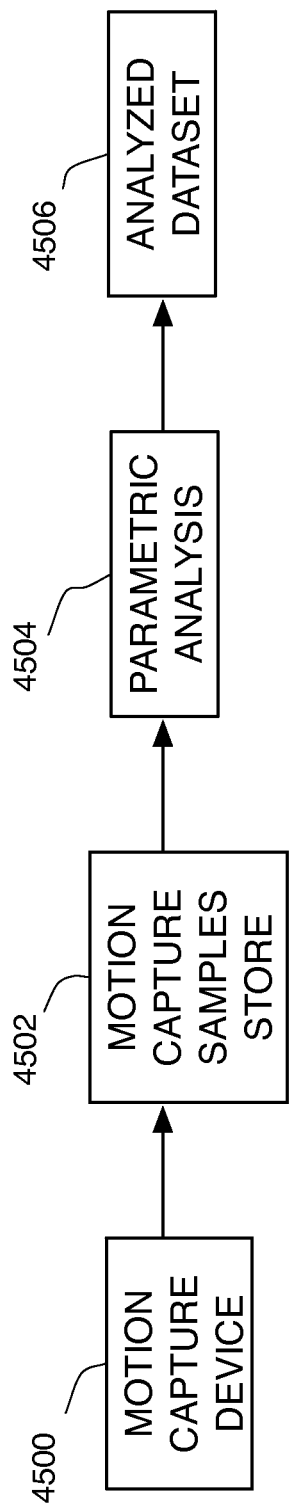
FIG. 45 is a block diagram illustrating a parametric analysis process of captured body motion samples to obtain an analyzed dataset according to an example embodiment.
Figure 46:
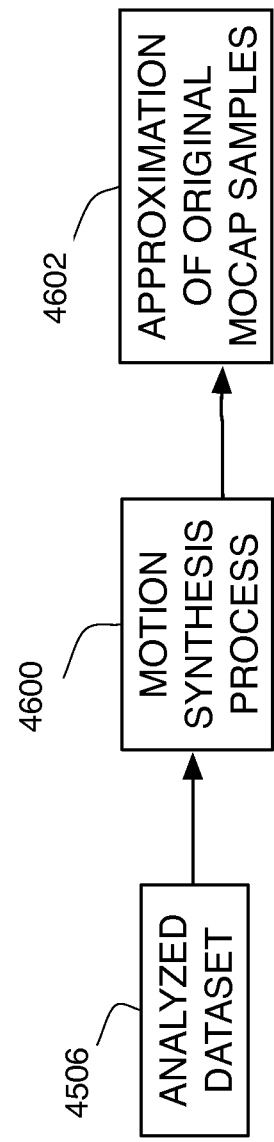
FIG. 46 is a block diagram illustrating a body motion re-synthesis process from the analyzed dataset according to an example embodiment.
Figure 47:
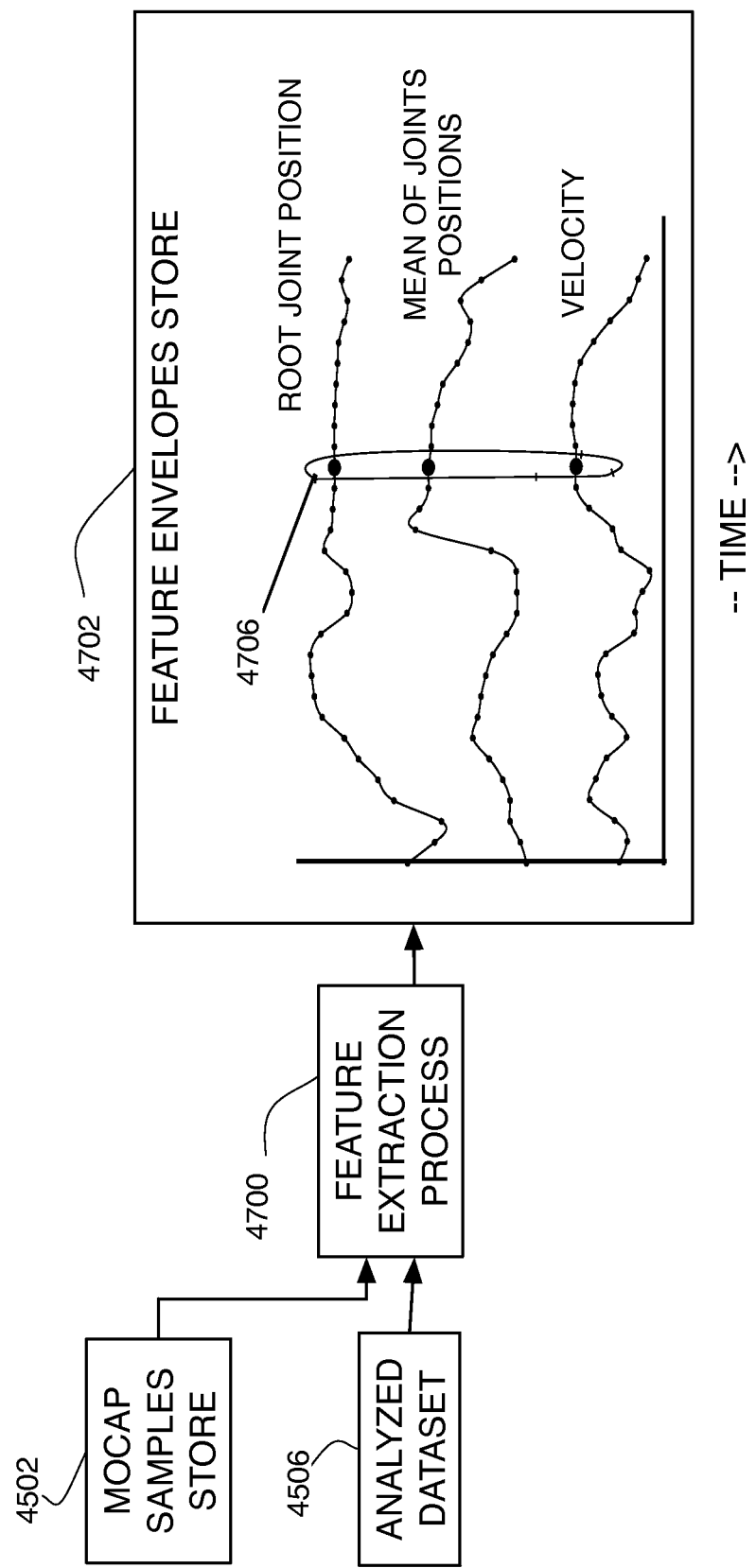
FIG. 47 is a block diagram illustrating a feature extraction process, feature envelopes dataset and feature exemplars according to an example embodiment.

FIGS. 45, 46 and 47 present an embodiment directed to body motion application in correspondence to FIGS. 1, 2 and 3 described above for generally applicable embodiments.

FIG. 45 illustrates a parametric analysis process performed on body motion captured data from a body motion data sample store 4502 to obtain an analyzed dataset (or analysis-synthesis dataset) 4506. Such samples can be captured for instance by using a body motion capture device 4500 that includes motion sensors and by using body motion capture (or MOCAP) techniques well known in the art, or by any other mean such as the output of another body motion synthesis process for instance.

The body motion samples are then passed to a parametric analysis process 4504. In accordance with one embodiment, the parametric representation of the data is a standard skeleton model whose parameters include root joint position and joint orientations relative to their parent. In some operational settings, a typical number of parameters may be seventeen (17) joints, but this can vary depending on the degree of realism chosen. In accordance with this embodiment, the values captured by the MOCAP device 4500 may be the actual parameters needed for the re-synthesis process 4600. Therefore, in this embodiment the parametric analysis process 4504 may simply consist in acquiring parameters such as root joint position and joints relative rotations (or orientations) from the Motion capture sample store 4502.

The captured data and analysis-synthesis data are typically organized in timed frames. We may define a motion as a continuous function $M(t)=\{p(t), q_1(t), \ldots, q_k(t)\}$ that is regularly sampled into frames $M(t_1), \ldots, M(t_n)$. Here p is the position of the root with respect to the origin and $q_j$ is the orientation (or rotation) of the jth joint with respect to its parent (or, for the root, with respect to the global coordinate system).

FIG. 46 illustrates a re-synthesis process performed by using the analyzed dataset (or analysis-synthesis dataset) 4506. The analyzed dataset 4506 is fed frame by frame to a motion synthesis process 4600 to generate an approximation of the original MOCAP samples 4602. One embodiment uses the root joint position and the joints relative rotations as parameters to feed to a body motion synthesis process 4600 which may include a standard skeleton software representation of a character generated as is common in the field of computer graphics.

FIG. 47 illustrates a feature extraction process 4700 to obtain a feature envelopes dataset 4702. According to one embodiment, feature extracted may include mean of joint positions, global velocity and root joint position.

Figure 48:
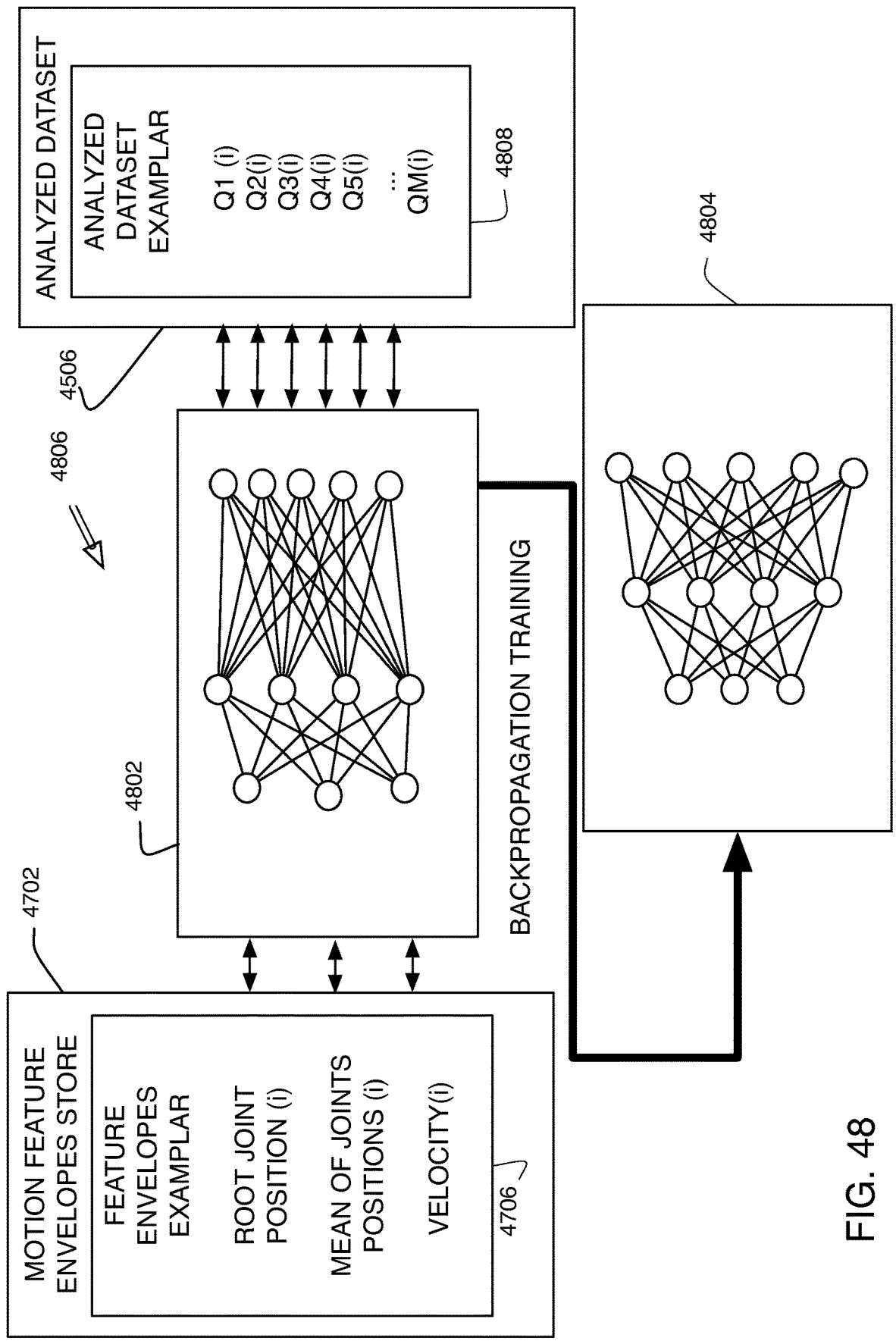
FIG. 48 is an example embodiment for the process of building a function mapper between extracted feature envelopes and synthesis parameters, where the function mapper is a multilayer perceptron neural network (MLP).

FIG. 48 shows a training process 4806 for an example embodiment related to building or training a function mapper between extracted feature envelopes 4702 and analyzed dataset 4506 (e.g. as in FIG. 45). In accordance with one embodiment, the function mapper is a Multilayer Perceptron (MLP) neural network 4802 and the training process includes adjusting the MLP's internal parameters (weights and biases) according to a well-known backpropagation algorithm.

As illustrated in FIG. 48, the MLP is trained to map between feature envelope exemplars 4706 from the feature envelopes store 4702 and corresponding analyzed dataset exemplars 4808 from the analyzed dataset 4506. The dataset exemplars 4808 may include the orientations (or rotations) $q_j$ of the jth joint with respect to its parent.

According to one embodiment, during the training stage, each feature exemplar 4706 is successively presented at the input of the MLP and each corresponding analyzed dataset exemplar (or analysis frame) 4808 is presented at the output of the MLP as the desired outputs to be learned. According to one embodiment, the MLP is trained according to a well-known backpropagation algorithm.

At this training (or design) stage a magnitude weighting (or normalizing) function can be applied to the analyzed dataset 4506 or feature envelopes 4702 or both during learning to ensure that all parts of the data are given an equivalent weight (e.g., values of same order of magnitude) at the outputs of the function mapper during training time.

According to one embodiment the architecture of the MLP is characterized as having one input per extracted feature envelope to control and one output per parameter to control in an analyzed dataset frame. In one specific embodiment, for example, in the case where the number of joints orientations to be controlled is sixteen (16) and the number of feature envelopes is three (3), the network has sixteen (16) outputs, three (3) inputs, one hidden layer of sixteen (16) neurons and is fully connected. Other architectures are also suitable. For example, the number of hidden layer or number or hidden neurons can vary, or the MLP can be fully or partially connected. Additionally, shunting units may be added to shunt the outputs to zero if the magnitude of the parameter to control is below a certain threshold.

At the end of the training process shown in FIG. 48, a trained MLP neural network 4804 is obtained with its parameters (e.g., weights, biases) fitted to the training data. Some examples of other function mappers that could be used instead of standard MLP neural networks include Time Delay Neural Networks and Support Vector Machines.

Figure 49:
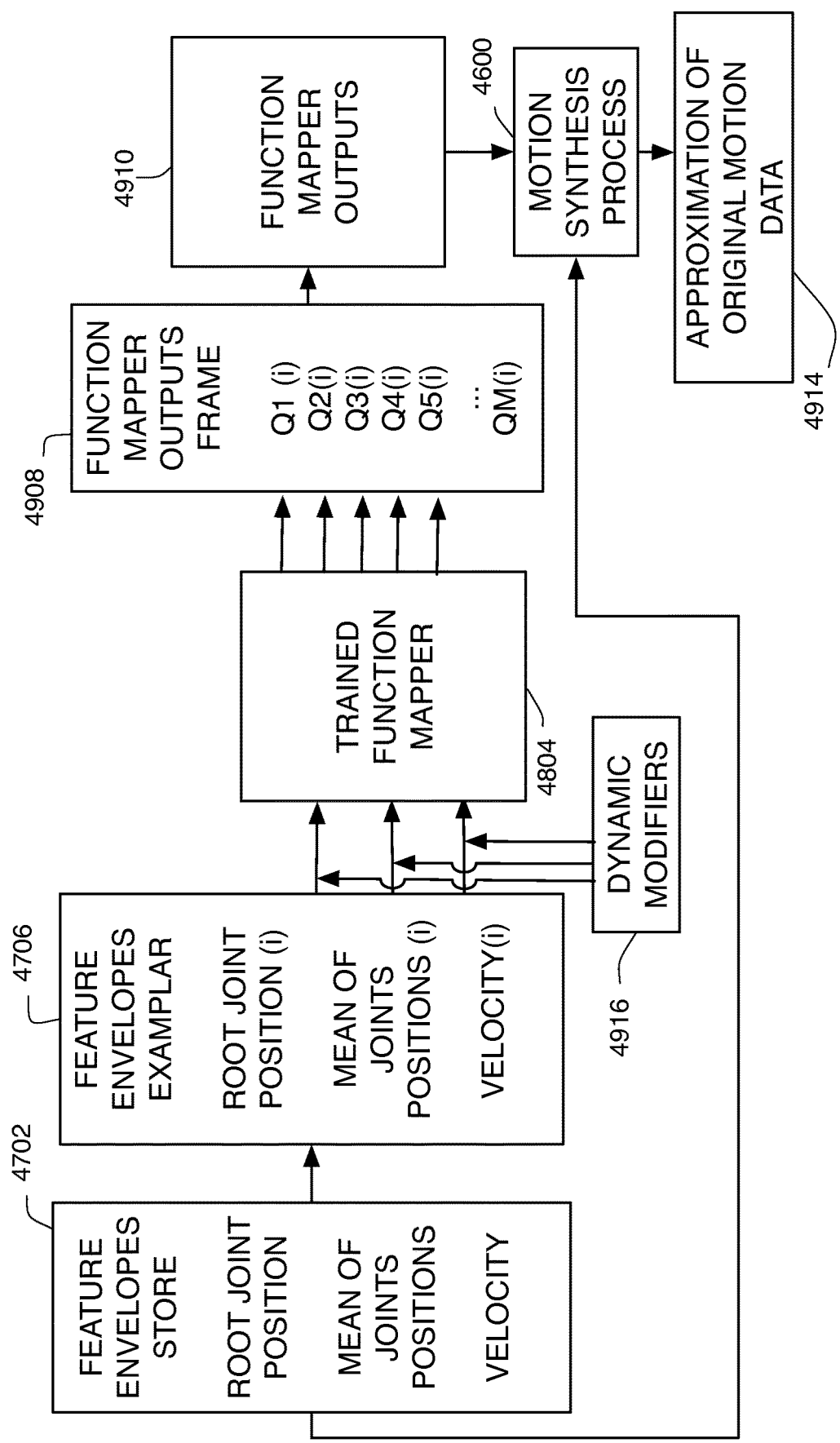
FIG. 49 is an example embodiment for of the process of feeding feature envelopes to a trained function mapper to obtain an approximation of the original body motion data.

FIG. 49 shows an example embodiment of the process of feeding feature envelopes 4702 to a trained function mapper 4804 to obtain an approximation of the original motion data 4914. According to one embodiment original exemplars are presented, one exemplar frame 4706 at a time, to the inputs of the trained function mapper 4804. The trained function mapper outputs one output frame 4908 at a time. For a given original input exemplar 4706, the values of an output frame 4908 are approximations of the original amplitudes $q_i$ in the original exemplar 4808. Each output frame 4908 is presented to the motion synthesis process 4600 to produce one frame of motion (or posture) 4914 that is an approximation of a corresponding portion of the original motion capture data 4502. Dynamic modifiers 4916 can be applied to modify exemplars independently as is shown FIG. 8, which shows a modified feature envelope store 802 and an independently modified value 806 in a feature envelope.

As all original feature exemplars 4706 are presented to the trained function mapper 4804, an approximation of the original motion is produced. The synthesis process 4600 can be controlled to run at the same time rate than the original sampling rate of the motion at the motion capture stage.

In accordance with some embodiments, captured motion data can be manually or automatically segmented into time segments relating to different motions or to different sequences of motions.

Figure 50:
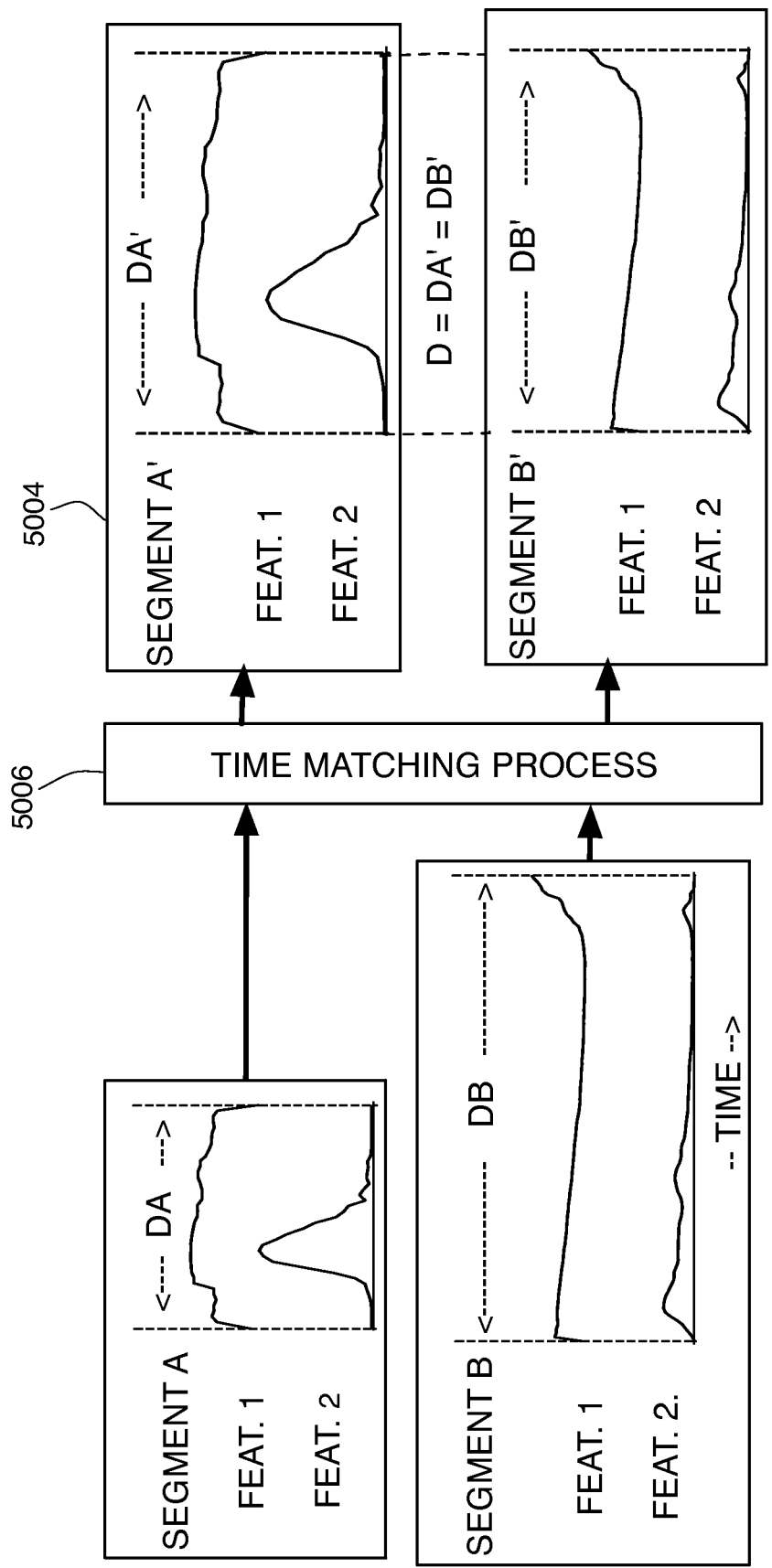
FIG. 50 further illustrates a body-motion segment time-matching process according to an example embodiment.

FIG. 50 illustrates a time matching process between two motion segments to obtain time-matched segments 5004. In accordance with some embodiments, two or more different motion segments may be time stretched according to time in a segment time-matching process 5006. The time-matching process may consist in interpolating or extrapolating the values of the perceptual feature envelopes 4702 with respect to time and in interpolating or extrapolating the analysed dataset (or analysis-synthesis dataset) 4506 with respect to time to produce two modified motion segments that have same duration.

In accordance with some embodiments, two or more different motion segments may be picked in a segment picking process and combined at the input level of a trained function mapper 4804, or at the body level or at the outputs level. An example of body motion embodiment that combines two or more motion segments at the output level of multiple function mappers is given below.

Figure 51:
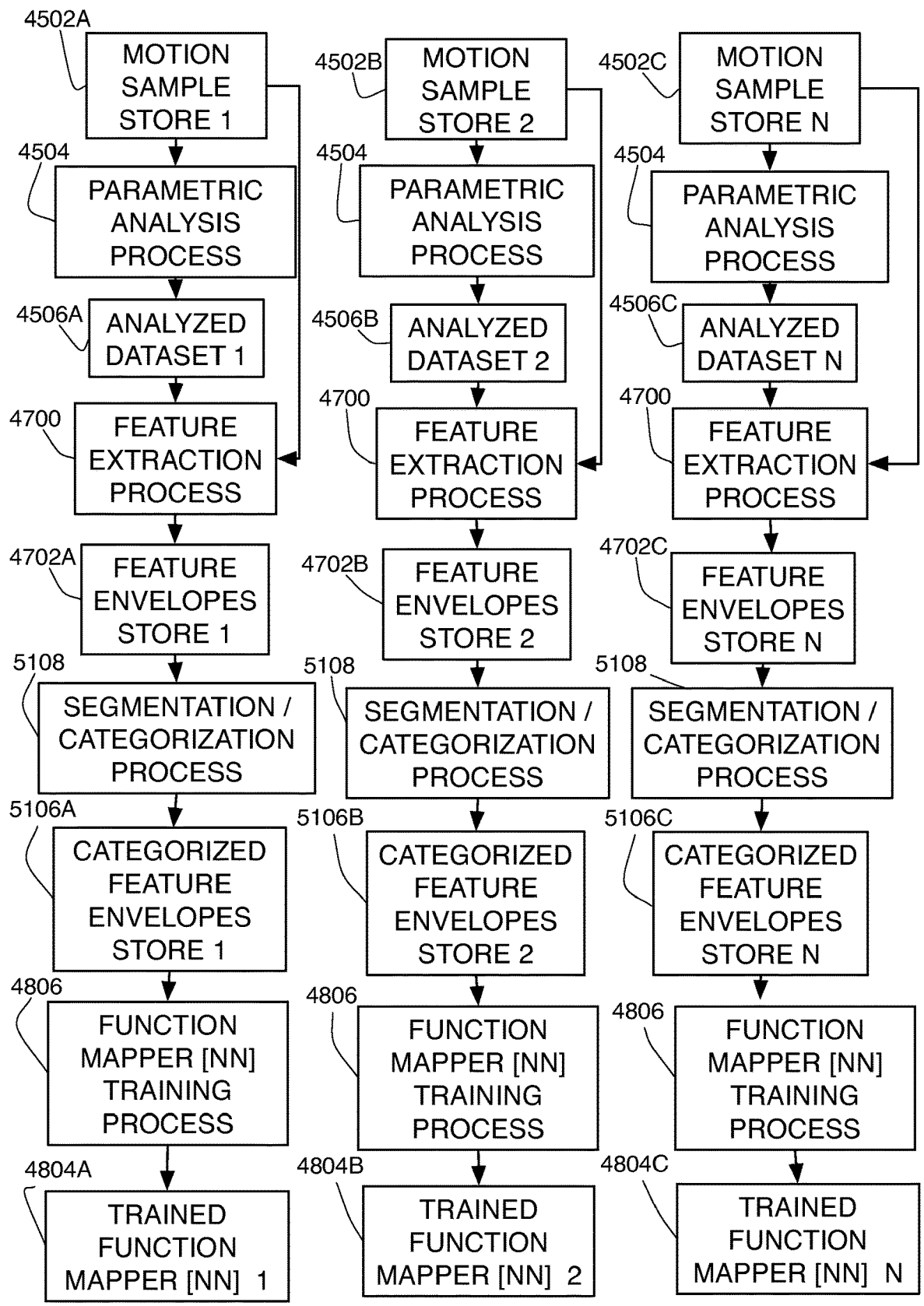
FIG. 51 illustrates the training stage of a body-motion embodiment where the combination of two or more segments occur at the FM's outputs level.

FIG. 51 illustrates the training stage of body motion embodiment that combines two or more motion segments at the output level of multiple function mappers. First, in accordance with this embodiment, capture two or more body motions 4502A, 4502B, 4502C (e.g., two or more different punches). Next perform parametric analysis 4504 to obtain two or more analyzed datasets 4506A, 4506B, 4506C. Next perform feature extraction 4700 on all captured motions to extract feature envelopes in feature envelope stores 4702A, 4702B, 4702C. Next perform a segmentation/categorization process 5108 on all envelope feature sets to obtain two or more categorized feature envelopes with stores 5106A 5106B, 5106C.

Next in accordance with the embodiment of FIG. 51, train a different Neural Network MLP according to training process 4806 with a different function mapper 4802 (FIG. 48) on each different dataset, to map each extracted feature exemplar 4706 (FIG. 47) to each corresponding analyzed dataset exemplar 4808 (FIG. 48) according to training process 4806 and obtain a trained function mapper neural network 4804A, 4804B, 4804C for each dataset. The training process may use a magnitude-dependent weighting or normalizing function to give equivalent weights to each value of the analyzed dataset exemplars.

Figure 52:
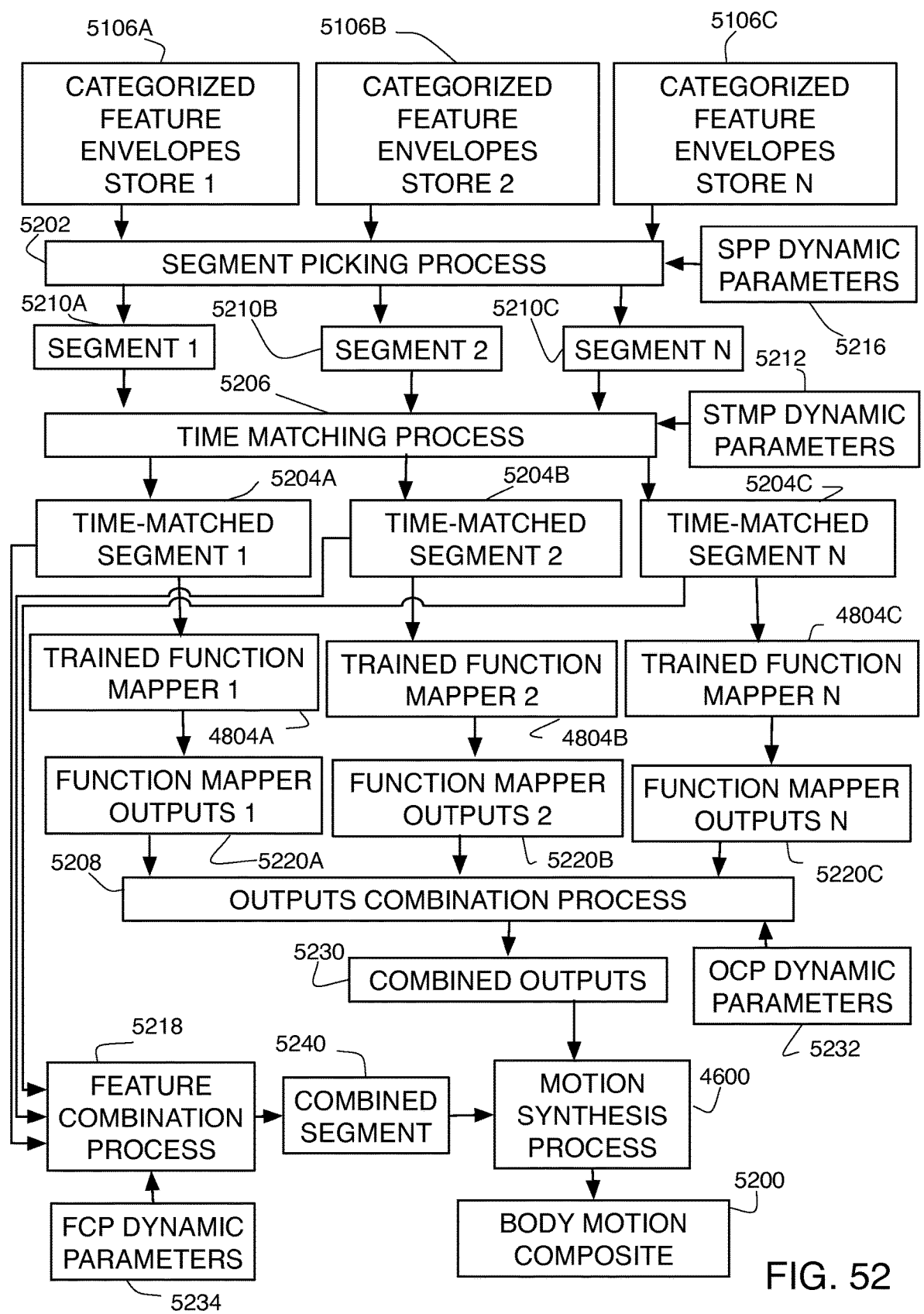
FIG. 52 illustrates the training stage of a body-motion embodiment where the combination of two or more segments occur at the FM's outputs level.

FIG. 52 illustrates the synthesis stage of a body motion embodiment, similarly as in FIG. 15, that combines two or more motion segments at the output level of multiple function mappers. First, in accordance with this embodiment, pick a segment in each of feature envelope stores 5106A, 5106B, 5106C in a segment picking process 5202. Segment picking process 5202 may be controlled using Segment Picking Parameters (SPP) 5216. Next perform a time matching process 5206 between all picked segments 5210A, 5210B, 5210C. Time matching process 5206 may be controlled using segment time matching parameters (STMP) 5212. Next feed time matched feature envelopes segments 5204A, 5204B, 5204C to trained function mappers 4804A, 4804B, 4804C in parallel. Next perform output combination process 5208. Output combination process 5208 may be controlled using output combination parameters (OCP) 5232. Next feed combined outputs 5230 to synthesis process 4600. Next get envelopes from time-matched segments 5204A, 5204B, 5204C and perform feature combination process 5218, where this process may be controlled using feature combination process parameters (FCP) 5234. Next feed the combined feature envelopes segments 5240 to the synthesis process 4600 in order to provide additional synthesis parameters as needed.

Finally in accordance with the embodiment of FIG. 52, obtain a body motion composite 5200. For instance in the case where the original segments are two different captured punch motions, the composite could be a hybrid punch that has some characteristics of the first punch and some characteristics of the second punch. In accordance with some embodiments, the different values within an output frame may be weighted differently before or during the outputs combination process 5208 in order to give less importance to some joints and more importance to other joints.

While the embodiment described above is applied to body motion, it should be clear that data captured from other motions such as facial animation could be used instead to obtain facial animation dynamically controllable composites.

Additional Embodiments

Additional embodiments correspond to systems and related computer programs that carry out the above-described methods. For example, a modular apparatus may include specific modules to support training and synthesis stages as discussed above (e.g., a training module and a synthesis module). In this case the apparatus includes at least one computer system (e.g., as in FIG. 44) to perform software and hardware operations for modules that carry out aspects of the above-described methods (e.g., FIGS. 12-15).

Figure 44:
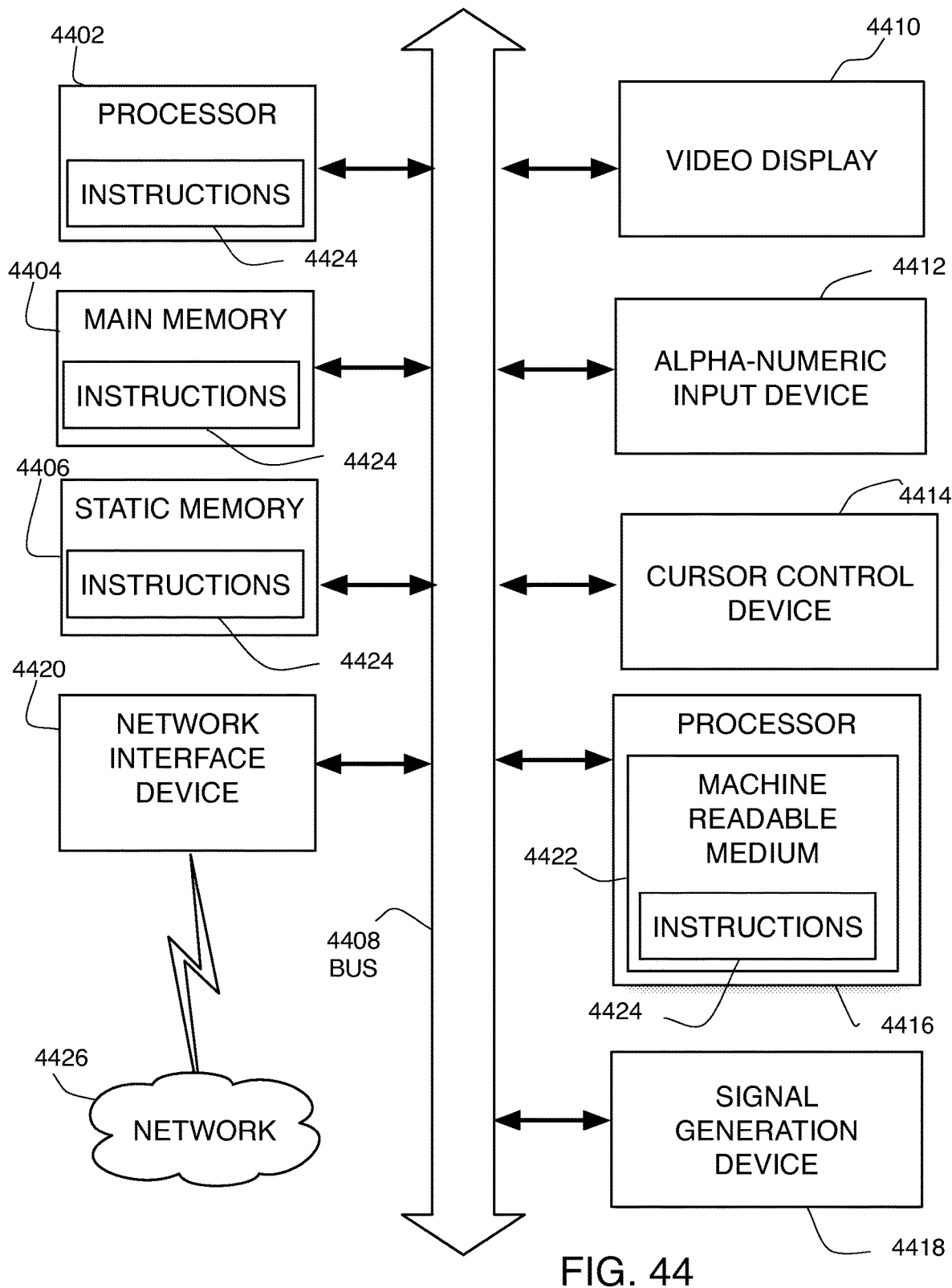
FIG. 44 is a block diagram that shows a computer processing system within which a set of instructions for causing the computer to perform any one of the methodologies discussed herein may be executed.

FIG. 44 shows a machine in the example form of a computer system 4400 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4400 includes a processor 4402 (e.g., a central processing unit (CPU), a graphics processing unit (GPU) or both), a main memory 4404 and a static memory 4406, which communicate with each other via a bus 4408. The computer system 4400 may further include a video display unit 4410 (e.g., a liquid crystal display (LCD) or a cathode ray tube (CRT)). The computer system 4400 also includes an alphanumeric input device 4412 (e.g., a keyboard), a user interface (UI) cursor control device 4414 (e.g., a mouse), a disk drive unit 4416, a signal generation device 4418 (e.g., a speaker) and a network interface device 4420.

In some contexts, a computer-readable medium may be described as a machine-readable medium. The disk drive unit 4416 includes a machine-readable medium 4422 on which is stored one or more sets of data structures and instructions 4424 (e.g., software) embodying or utilizing any one or more of the methodologies or functions described herein. The instructions 4424 may also reside, completely or at least partially, within the static memory 4406, within the main memory 4404, or within the processor 4402 during execution thereof by the computer system 4400, with the static memory 4406, the main memory 4404 and the processor 4402 also constituting machine-readable media.

While the machine-readable medium 4422 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 4424. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 4424 may further be transmitted or received over a communications network 4426 using a transmission medium. The instructions 4424 may be transmitted using the network interface device 4420 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

CONCLUSION

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method for remotely generating synthesis parameters based on captured data, the method comprising:

performing a parametric analysis process on the captured data, wherein the parametric analysis process fits the captured data to one or more predetermined general parametric representation of the data, each predetermined general parametric representation capable of representing a plurality of different captured data and corresponding to a set of one or more parameters to be estimated from the captured data, thus obtaining one or more analyzed datasets, wherein the one or more analyzed datasets correspond to parameters of the predetermined general parametric representation estimated from the captured data in the parametric analysis process;

extracting one or more feature envelopes from the captured data, the one or more feature envelopes set corresponding to one or more characteristics of the captured data;

training one or more function mappers, to map between the one or more feature envelopes set that are extracted from the captured data and the one or more analyzed dataset, wherein each function mapper has interpolation and extrapolation capabilities and includes parameters used to fit to training data in a training process, and wherein the training process includes presenting feature envelope exemplars at the inputs of the one or more function mappers and presenting corresponding analyzed dataset exemplars at the outputs of the one or more function mappers and wherein a number of inputs of each function mapper is different than its number of outputs; and generating synthesis parameters for a synthesizer corresponding to the one or more predetermined general parametric representation, by remotely feeding the one or more extracted feature envelopes to the inputs of the corresponding function mappers in a client-server architecture in a synthesis process at synthesis time, the outputs of the function mapper being used as synthesis parameters to drive a synthesis process, wherein the synthesis process corresponds to the one or more predetermined general parametric representation and generates an approximation or modification of at least a portion of the captured data.

2. The method of claim 1, wherein the captured data corresponds to perceptual data, and the characteristics of the captured data correspond to perceptual characteristics.

3. The method of claim 1, wherein the captured data is audio and the one or more feature envelope sets that are extracted from the data segments of the captured data are based on at least one of pitch, loudness or brightness.

4. The method of claim 1, wherein the captured data is audio and the one or more corresponding parametric representations of the captured data include values for spectral peaks.

5. The method of claim 1 , wherein the one or more function mappers include at least one neural network that is trained adaptively in the training process for the one or more function mappers.

6. The method of claim 1, wherein remotely controlling the features envelopes includes transmitting feature envelopes over a data network to be fed to the function mapper.

7. The method of claim 1 , wherein remotely controlling the features envelopes includes transmitting parameters that modify the original envelopes fed to the function mapper.

8. The method of claim 1, wherein the client-server architecture includes a smartphone and a computer.

9. The method in claim 1, wherein the client-server architecture includes a first computer program module that includes a graphical user interface and a second computer program module that includes a game engine.

10. The method of claim 1, wherein the captured data is body-motion data and the one or more feature envelope sets that are extracted from the data segments of the captured data are based on at least one of position, rotation angle, or velocity for one or more body joints or for one or more end effectors.

11. The method of claim 1, wherein the captured data is body motion data and the one or more parametric representations of the captured data include at least one of position, rotation angle, or velocity for one or more body joints or for one or more end effectors.

12. The method of claim 1, wherein the captured data is texture data and the one or more characteristics of the captured data are based on neighboring pixel intensity values for a given location.

13. The method of claim 1, wherein the captured data is texture data and the one or more corresponding parametric representations of the captured data include pixel intensity values for a given location.

14. The method of claim 1 , wherein the one or more function mappers are trained by using a magnitude-based weighting in an error function for a training process for the one or more function mappers.

15. The method of claim 1, further comprising remotely transmitting the parameters used to fit to training data.

16. The method of claim 1, wherein the one or more function mappers includes at least a neural network, and the parameters used to fit to training data include weights and bias of the neural network.

17. The method of claim 1, further comprising: modifying one or more of the one or more feature envelopes; and regenerating the synthesis parameters in real-time based upon the modified one or more feature envelopes.

18. An apparatus for remotely generating synthesis parameters based on captured data, the apparatus including at least one computer that performs operations for computer-implemented modules comprising:
 a parametric analyzer for performing a parametric analysis process on the captured data, wherein the parametric analysis process fits the captured data to one or more predetermined general parametric representation of the data, each predetermined general parametric representation capable of representing a plurality of different captured data and corresponding to a set of one or more parameters to be estimated from the captured data, thus obtaining one or more analyzed datasets, wherein the one or more analyzed datasets correspond to parameters of the predetermined general parametric representation estimated from the captured data in the parametric analysis process;
 a feature envelope extractor for extracting one or more feature envelopes set from the captured data, the one or more feature envelopes corresponding to one or more characteristics of the captured data;
 a training module for training one or more function mappers, to map between the one or more feature envelopes set that are extracted from the captured data and the one or more analyzed dataset, wherein each function mapper has interpolation and extrapolation capabilities and includes parameters used to fit to training data in a training process, and wherein the training process includes presenting feature envelope exemplars at the inputs of the one or more function mappers and presenting corresponding analyzed dataset exemplars at the outputs of the one or more function mappers and wherein a number of inputs of each function mapper is different than its number of outputs; and
 a synthesis module for generating synthesis parameters for a synthesizer corresponding to the one or more predetermined general parametric representation, by remotely feeding the one or more extracted feature envelopes to the inputs of the corresponding function mappers in a client- server architecture in a synthesis process at synthesis time, the outputs of the function mapper being used as synthesis parameters to drive a synthesis process, wherein the synthesis process corresponds to the one or more predetermined general parametric representation and generates an approximation or modification of at least a portion of the captured data.

19. A non-transitory computer-readable medium that stores a computer program for remotely generating synthesis parameters based on captured data, the computer program including instructions that, when executed by a computer, cause the computer to perform operations comprising:
 performing a parametric analysis process on the captured data, wherein the parametric analysis process fits the captured data to one or more predetermined general parametric representation of the data, each predetermined general parametric representation capable of representing a plurality of different captured data and corresponding to a set of one or more parameters to be estimated from the captured data, thus obtaining one or more analyzed datasets, wherein the one or more analyzed datasets correspond to parameters of the predetermined general parametric representation estimated from the captured data in the parametric analysis process;
 extracting one or more feature envelopes set from the captured data, the one or more feature envelopes corresponding to one or more characteristics of the captured data;
 training one or more function mappers, to map between the one or more feature envelopes set that are extracted from the captured data and the one or more analyzed dataset, wherein each function mapper has interpolation and extrapolation capabilities and includes parameters used to fit to training data in a training process, and wherein the training process includes presenting feature envelope exemplars at the inputs of the one or more function mappers and presenting corresponding analyzed dataset exemplars at the outputs of the one or more function mappers and wherein a number of inputs of each function mapper is different than its number of outputs; and
 generating synthesis parameters for a synthesizer corresponding to the one or more predetermined general parametric representation, by remotely feeding the one or more extracted feature envelopes to the inputs of the corresponding function mappers in a client-server architecture in a synthesis process at synthesis time, the outputs of the function mapper being used as synthesis parameters to drive a synthesis process, wherein the synthesis process corresponds to the one or more predetermined general parametric representation and generates an approximation or modification of at least a portion of the captured data.

* * * * *